(12) United States Patent
Shrivastava et al.

(10) Patent No.: US 10,481,459 B2
(45) Date of Patent: Nov. 19, 2019

(54) CONTROL METHODS AND SYSTEMS FOR NETWORKS OF OPTICALLY SWITCHABLE WINDOWS DURING REDUCED POWER AVAILABILITY

(71) Applicant: View, Inc., Milpitas, CA (US)

(72) Inventors: Dhairya Shrivastava, Los Altos, CA (US); Rao Mulpuri, Saratoga, CA (US); Stephen Clark Brown, San Mateo, CA (US)

(73) Assignee: View, Inc., Milpitas, CA (US)

( * ) Notice: Subject to any disclaimer, the term of this patent is extended or adjusted under 35 U.S.C. 154(b) by 0 days.

(21) Appl. No.: 15/320,725

(22) PCT Filed: Jun. 30, 2015

(86) PCT No.: PCT/US2015/038667
§ 371 (c)(1),
(2) Date: Dec. 20, 2016

(87) PCT Pub. No.: WO2016/004109
PCT Pub. Date: Jan. 7, 2016

(65) Prior Publication Data
US 2017/0212400 A1  Jul. 27, 2017

Related U.S. Application Data

(60) Provisional application No. 62/019,325, filed on Jun. 30, 2014.

(51) Int. Cl.
*G05B 13/00* (2006.01)
*G02F 1/163* (2006.01)
(Continued)

(52) U.S. Cl.
CPC ............... *G02F 1/163* (2013.01); *E06B 9/24* (2013.01); *E06B 2009/247* (2013.01);
(Continued)

(58) Field of Classification Search
CPC ..................................................... G05B 15/02
(Continued)

(56) References Cited

U.S. PATENT DOCUMENTS 4,129,861 A   12/1978  Giglia
5,384,653 A    1/1995  Benson et al.
(Continued)

FOREIGN PATENT DOCUMENTS

CN   103649826 A    3/2014
CN   205743507 U   11/2016
(Continued)

OTHER PUBLICATIONS

U.S. Final Office Action dated Jan. 27, 2014 in U.S. Appl. No. 13/479,137.
(Continued)

*Primary Examiner* — Suresh Suryawanshi
(74) *Attorney, Agent, or Firm* — Weaver Austin Villeneuve & Sampson LLP; Brian D. Griedel

(57) ABSTRACT

Certain embodiments are directed to control methods, window controllers, and uninterruptible power supplies for determining tinting instructions for optically switchable windows to reduce power usage at a site during a reduced power event. In some cases, reduced power operations are initiated by a window controller upon receipt of a trigger signal from an uninterruptible power supply sent when it detects a power loss. In some cases, tinting instructions are based on the remaining charge left on the uninterruptible power supply. In some cases, reduced power operations are delayed for a period of time.

49 Claims, 15 Drawing Sheets

(51) Int. Cl.
*E06B 9/24* (2006.01)
*E06B 9/68* (2006.01)

(52) U.S. Cl.
CPC ............. *E06B 2009/2417* (2013.01); *E06B 2009/2464* (2013.01); *E06B 2009/6818* (2013.01)

(58) Field of Classification Search
USPC .................................................. 700/275
See application file for complete search history.

(56) References Cited

U.S. PATENT DOCUMENTS

| | | | |
|---|---|---|---|
| 5,416,617 | A | 5/1995 | Loiseaux et al. |
| 5,579,149 | A | 11/1996 | Moret et al. |
| 6,039,390 | A | 3/2000 | Agrawal et al. |
| 6,055,089 | A | 4/2000 | Schulz et al. |
| 6,262,831 | B1* | 7/2001 | Bauer ............... B60R 1/088 359/264 |
| 6,407,847 | B1 | 6/2002 | Poll et al. |
| 6,707,590 | B1 | 3/2004 | Bartsch |
| 6,795,226 | B2 | 9/2004 | Agrawal et al. |
| 6,897,936 | B1 | 5/2005 | Li et al. |
| 6,965,813 | B2 | 11/2005 | Granqvist et al. |
| 7,133,181 | B2 | 11/2006 | Greer |
| 7,684,105 | B2 | 3/2010 | Lamontagne et al. |
| 7,941,245 | B1* | 5/2011 | Popat ............... E06B 9/68 135/155 |
| 8,004,739 | B2 | 8/2011 | Letocart |
| 8,213,074 | B1 | 7/2012 | Shrivastava et al. |
| 8,254,013 | B2 | 8/2012 | Mehtani et al. |
| 8,270,059 | B2 | 9/2012 | Friedman et al. |
| 8,300,298 | B2 | 10/2012 | Wang et al. |
| 8,526,094 | B2 | 9/2013 | Letocart |
| 8,705,162 | B2* | 4/2014 | Brown ............... E06B 9/24 359/275 |
| 8,764,950 | B2 | 7/2014 | Wang et al. |
| 8,764,951 | B2 | 7/2014 | Wang et al. |
| 8,843,238 | B2* | 9/2014 | Wenzel ............. G05D 23/1923 700/277 |
| 8,976,440 | B2 | 3/2015 | Berland et al. |
| 9,016,630 | B2 | 4/2015 | Mitchell et al. |
| 9,081,246 | B2 | 7/2015 | Rozbicki |
| 9,128,346 | B2 | 9/2015 | Shrivastava et al. |
| 9,170,008 | B2 | 10/2015 | Reul et al. |
| 9,250,494 | B2 | 2/2016 | Podbelski et al. |
| 9,300,581 | B1 | 3/2016 | Hui et al. |
| 9,442,338 | B2 | 9/2016 | Uhm et al. |
| 9,442,341 | B2 | 9/2016 | Shrivastava et al. |
| 9,454,055 | B2 | 9/2016 | Brown et al. |
| 9,470,947 | B2 | 10/2016 | Nagel et al. |
| 9,546,515 | B2 | 1/2017 | Hall et al. |
| 9,677,327 | B1 | 6/2017 | Nagel et al. |
| 9,690,174 | B2 | 6/2017 | Wang |
| 9,709,869 | B2 | 7/2017 | Baumann et al. |
| 9,740,074 | B2 | 8/2017 | Agrawal et al. |
| 9,778,533 | B2 | 10/2017 | Bertolini |
| 9,946,138 | B2 | 4/2018 | Shrivastava et al. |
| 10,001,691 | B2 | 6/2018 | Shrivastava et al. |
| 10,137,764 | B2 | 11/2018 | Driscoll et al. |
| 10,268,098 | B2 | 4/2019 | Shrivastava et al. |
| 10,303,035 | B2 | 5/2019 | Brown et al. |
| 10,387,221 | B2 | 8/2019 | Shrivastava et al. |
| 10,409,652 | B2 | 9/2019 | Shrivastava et al. |
| 2002/0027504 | A1 | 3/2002 | Davis et al. |
| 2002/0149829 | A1 | 10/2002 | Mochizuka et al. |
| 2003/0227663 | A1 | 12/2003 | Agrawal et al. |
| 2004/0215520 | A1 | 10/2004 | Butler et al. |
| 2005/0270620 | A1 | 12/2005 | Bauer et al. |
| 2005/0270621 | A1 | 12/2005 | Bauer et al. |
| 2006/0018000 | A1 | 1/2006 | Greer |
| 2006/0107616 | A1 | 5/2006 | Ratti et al. |
| 2006/0279527 | A1 | 12/2006 | Zehner et al. |
| 2007/0053053 | A1 | 3/2007 | Moskowitz |
| 2007/0285759 | A1 | 12/2007 | Ash et al. |
| 2008/0043316 | A2 | 2/2008 | Moskowitz |
| 2008/0144158 | A1 | 6/2008 | Stavaeus et al. |
| 2008/0186562 | A2 | 8/2008 | Moskowitz |
| 2008/0211682 | A1* | 9/2008 | Hyland ............... H02J 9/062 340/635 |
| 2009/0271042 | A1 | 10/2009 | Voysey |
| 2009/0323160 | A1 | 12/2009 | Egerton et al. |
| 2010/0039410 | A1 | 2/2010 | Becker et al. |
| 2010/0188057 | A1 | 7/2010 | Tarng |
| 2010/0228854 | A1 | 9/2010 | Morrison et al. |
| 2010/0243427 | A1 | 9/2010 | Kozlowski et al. |
| 2010/0274366 | A1 | 10/2010 | Fata et al. |
| 2010/0315693 | A1 | 12/2010 | Lam et al. |
| 2011/0071685 | A1 | 3/2011 | Huneycutt et al. |
| 2011/0097081 | A1 | 4/2011 | Gupta et al. |
| 2011/0148218 | A1 | 6/2011 | Rozbicki |
| 2011/0164317 | A1 | 7/2011 | Verghol et al. |
| 2012/0026573 | A1 | 2/2012 | Collins et al. |
| 2012/0033287 | A1 | 2/2012 | Friedman et al. |
| 2012/0062975 | A1 | 3/2012 | Mehtani et al. |
| 2012/0086363 | A1 | 4/2012 | Golding et al. |
| 2012/0188627 | A1 | 7/2012 | Chen et al. |
| 2012/0190386 | A1 | 7/2012 | Anderson |
| 2012/0194895 | A1 | 8/2012 | Podbelski et al. |
| 2012/0235493 | A1 | 9/2012 | Kiuchi et al. |
| 2012/0259583 | A1 | 10/2012 | Noboa et al. |
| 2012/0275008 | A1 | 11/2012 | Pradhan et al. |
| 2012/0293855 | A1 | 11/2012 | Shrivastava et al. |
| 2013/0060370 | A1 | 3/2013 | Li et al. |
| 2013/0085614 | A1 | 4/2013 | Wenzel et al. |
| 2013/0085615 | A1 | 4/2013 | Barker |
| 2013/0085616 | A1* | 4/2013 | Wenzel ............... G05F 1/66 700/278 |
| 2013/0131869 | A1 | 5/2013 | Majewski et al. |
| 2013/0157493 | A1 | 6/2013 | Brown |
| 2013/0196600 | A1 | 8/2013 | Capers et al. |
| 2013/0241299 | A1 | 9/2013 | Snyker et al. |
| 2013/0271812 | A1 | 10/2013 | Brown et al. |
| 2013/0271813 | A1 | 10/2013 | Brown |
| 2013/0271814 | A1 | 10/2013 | Brown |
| 2013/0278989 | A1 | 10/2013 | Lam et al. |
| 2013/0335802 | A1 | 12/2013 | Kim et al. |
| 2014/0156097 | A1 | 6/2014 | Nesler et al. |
| 2014/0160550 | A1 | 6/2014 | Brown et al. |
| 2014/0170863 | A1 | 6/2014 | Brown |
| 2014/0236323 | A1 | 8/2014 | Brown et al. |
| 2014/0268287 | A1 | 9/2014 | Brown et al. |
| 2014/0303788 | A1 | 10/2014 | Sanders et al. |
| 2014/0330538 | A1 | 11/2014 | Conklin et al. |
| 2014/0347190 | A1 | 11/2014 | Grimm |
| 2014/0349497 | A1 | 11/2014 | Brown et al. |
| 2014/0368899 | A1 | 12/2014 | Greer |
| 2015/0023661 | A1 | 1/2015 | Borkenhagen et al. |
| 2015/0060648 | A1 | 3/2015 | Brown et al. |
| 2015/0098121 | A1 | 4/2015 | Turnbull et al. |
| 2015/0103389 | A1 | 4/2015 | Klawuhn et al. |
| 2015/0116811 | A1 | 4/2015 | Shrivastava et al. |
| 2015/0120297 | A1 | 4/2015 | Meruva |
| 2015/0003822 | A1 | 6/2015 | Fukada et al. |
| 2015/0160525 | A1 | 6/2015 | Shi |
| 2015/0219975 | A1 | 8/2015 | Phillips et al. |
| 2015/0378230 | A1 | 12/2015 | Gudmunson et al. |
| 2015/0378231 | A1 | 12/2015 | Greer et al. |
| 2016/0054633 | A1 | 2/2016 | Brown et al. |
| 2016/0054634 | A1 | 2/2016 | Brown et al. |
| 2016/0070151 | A1 | 3/2016 | Shrivastava et al. |
| 2016/0109778 | A1 | 4/2016 | Shrivastava et al. |
| 2016/0124283 | A1 | 5/2016 | Brown et al. |
| 2016/0154290 | A1 | 6/2016 | Brown et al. |
| 2016/0202589 | A1 | 7/2016 | Nagel et al. |
| 2017/0052753 | A1 | 2/2017 | Paolini, Jr. |
| 2017/0075183 | A1 | 3/2017 | Brown |
| 2017/0075323 | A1 | 3/2017 | Shrivastava et al. |
| 2017/0097259 | A1 | 4/2017 | Brown et al. |
| 2017/0122802 | A1 | 5/2017 | Brown et al. |
| 2017/0131610 | A1 | 5/2017 | Brown et al. |
| 2017/0139301 | A1 | 5/2017 | Messere et al. |
| 2017/0146884 | A1 | 5/2017 | Vigano et al. |

(56) References Cited

U.S. PATENT DOCUMENTS

| | | | |
|---|---|---|---|
| 2017/0197494 | A1 | 7/2017 | Li |
| 2017/0200424 | A1 | 7/2017 | Xu et al. |
| 2017/0253801 | A1 | 9/2017 | Bae et al. |
| 2017/0279930 | A1 | 9/2017 | Zhang |
| 2017/0285432 | A1 | 10/2017 | Shrivastava et al. |
| 2017/0285433 | A1 | 10/2017 | Shrivastava et al. |
| 2017/0347129 | A1 | 11/2017 | Levi et al. |
| 2017/0364395 | A1 | 12/2017 | Shrivastava et al. |
| 2018/0090992 | A1 | 3/2018 | Shrivastava et al. |
| 2018/0129172 | A1 | 5/2018 | Shrivastava et al. |
| 2018/0144712 | A1 | 5/2018 | Threlkel et al. |
| 2018/0187478 | A1 | 7/2018 | Vigano et al. |
| 2018/0188627 | A1 | 7/2018 | Vigano et al. |
| 2018/0189117 | A1 | 7/2018 | Shrivastava et al. |
| 2018/0267380 | A1 | 9/2018 | Shrivastava et al. |
| 2018/0284555 | A1 | 10/2018 | Klawuhn et al. |
| 2019/0155122 | A1 | 5/2019 | Brown et al. |
| 2019/0235451 | A1 | 8/2019 | Shrivastava et al. |
| 2019/0271895 | A1 | 9/2019 | Shrivastava et al. |

FOREIGN PATENT DOCUMENTS

| | | | |
|---|---|---|---|
| DE | 102014220818 A1 | | 4/2016 |
| EP | 2357544 | | 8/2011 |
| EP | 2648086 A2 | | 10/2013 |
| EP | 2764998 A1 | | 8/2014 |
| EP | 3015915 A1 | | 5/2016 |
| EP | 3352053 A1 | | 7/2018 |
| KR | 10-2012-0045915 | | 5/2012 |
| KR | 10-2014-0004175 A | | 1/2014 |
| KR | 10-1346862 B | | 1/2014 |
| KR | 10-1799323 B1 | | 11/2017 |
| RU | 104808 U1 | | 5/2011 |
| TW | 200532346 A | | 10/2005 |
| WO | WO2017/059362 | | 4/2007 |
| WO | WO2012/079159 | | 6/2012 |
| WO | WO2013/155467 | | 10/2013 |
| WO | WO2013/177575 A1 | | 11/2013 |
| WO | WO2014/082092 | | 5/2014 |
| WO | WO2014/121809 | | 8/2014 |
| WO | WO2014/209812 | | 12/2014 |
| WO | WO2015/051262 A1 | | 4/2015 |
| WO | WO 2015/134789 | | 9/2015 |
| WO | WO2015/171886 | | 11/2015 |
| WO | WO2016/004109 | | 1/2016 |
| WO | WO2016/085964 | | 6/2016 |
| WO | WO2016/094445 | | 6/2016 |
| WO | WO2016/183059 A1 | | 11/2016 |
| WO | WO2017/007841 | | 1/2017 |
| WO | WO2017/007841 A1 | | 1/2017 |
| WO | WO2017/007942 | | 1/2017 |
| WO | WO2017/075059 | | 5/2017 |
| WO | WO2018/019473 A1 | | 2/2018 |
| WO | WO2018/112095 | | 6/2018 |
| WO | WO2018/152249 A1 | | 8/2018 |
| WO | WO2018/200702 A1 | | 11/2018 |
| WO | WO2018/200740 A1 | | 11/2018 |
| WO | WO2018/200752 A1 | | 11/2018 |

OTHER PUBLICATIONS

U.S. Final Office Action dated Feb. 26, 2015 in U.S. Appl. No. 13/479,137.
U.S. Notice of Allowance dated May 14, 2015 in U.S. Appl. No. 13/479,137.
U.S. Notice of Allowance (supplemental) dated Jun. 12, 2015 in U.S. Appl. No. 13/479,137.
U.S. Office Action dated Sep. 23, 2013 in U.S. Appl. No. 13/479,137.
U.S. Office Action dated Jul. 3, 2014 in U.S. Appl. No. 13/479,137.
U.S. Final Office Action dated Sep. 19, 2016 in U.S. Appl. No. 14/887,178.
U.S. Final Office Action dated Mar. 17, 2017 in U.S. Appl. No. 14/887,178.
U.S. Office Action dated Mar. 25, 2016 in U.S. Appl. No. 14/887,178.
U.S. Office Action dated Oct. 23, 2017 in U.S. Appl. No. 14/887,178.
Preliminary Amendment dated Jan. 18, 2017 in U.S. Appl. No. 15/123,069.
U.S. Office Action dated Sep. 11, 2017 in U.S. Appl. No. 14/951,410.
International Preliminary Report on Patentability dated Jun. 8, 2017 in PCT/US2015/062480.
International Search Report and Written Opinion dated Feb. 15, 2016 in PCT/US2015/062480.
EP Extended Search Report dated Jun. 19, 2017 in EP Application No. 15758538.1.
International Search Report and Written Opinion dated May 29, 2015 in Application No. PCT/US2015/019031.
International Preliminary Report on Patentability dated Sep. 15, 2016 in Application No. PCT/US2015/019031.
International Preliminary Report on Patentability dated Jun. 22, 2017 in PCT Application No. PCT/US15/64555.
International Search Report and Written Opinion dated Oct. 16, 2015 in PCT Application No. PCT/US15/64555.
National Aeronautics & Space Administration, "Cloud Remote Sensing and Modeling," (undated) [http://atmospheres.gsfc.nasa.gov/climate/index.php?section=134].
Kipp & Zonen, "Solar Radiation" (undated) [http://www.kippzonen.com/Knowledge-Center/Theoretical-info/Solar-Radiation].
Duchon, Claude E. et al., "Estimating Cloud Type from Pyranometer Observations," Journal of Applied Meteorology, vol. 38, Jan. 1999, pp. 132-141.
"SageGlass Unplugged™—wireless dynamic glass", 2014, 2 pages.
"Ossia Wireless Charging", screenshot and picture of Cota device, accessed Apr. 20, 2015, 1 page.
"SageGlass Mobile App" screenshot, accessed Aug. 28, 2015, 1 page.
"Sage Product Highlights" screenshot, accessed Aug. 28, 2015, 1 page.
"SageGlass Unplugged" screenshot, accessed Aug. 28, 2015, 1 page.
U.S. Appl. No. 15/534,175, filed Jun. 8, 2017, Shrivastava et al.
International Search Report and Written Opinion dated Oct. 16, 2015, in PCT Application No.
International Search Report and Written Opinion dated Oct. 4, 2016, in PCT Application No. PCT/US16/41176.
International Preliminary Report on Patentbility dated Jan. 12, 2017, in PCT Application No. PCT/US15/38667.
APC by Schneider Electric, Smart-UPS 120V Product Brochure, 2013, 8 pp.
U.S. Office Action dated Feb. 7, 2019 in U.S. Appl. No. 15/623,237.
U.S. Office Action dated Feb. 7, 2019 in U.S. Appl. No. 15/691,468.
U.S. Final Office Action dated Jan. 31, 2019 in U.S. Appl. No. 15/534,175.
U.S. Notice of Allowance dated Apr. 17, 2019 in U.S. Appl. No. 15/534,175.
U.S. Office Action dated May 14, 2019 in U.S. Appl. No. 15/534,175.
U.S. Notice of Allowance dated Apr. 17, 2019 in U.S. Appl. No. 15/910,936.
CN Office Action dated Mar. 19, 2019 in CN Application No. 201580070776.3.
CN Office Action dated Feb. 2, 2019 in CN Application No. 201580015979.2.
International Preliminary Report on Patentability dated Apr. 18, 2019 in PCT Application No. PCT/US17/54120.
International Search Report and Written Opinion (ISA/KR) dated Jan. 9, 2018 in PCT Application No. PCT/US17/54120.
Taiwanese Office Action dated May 13, 2019 in TW Application No. 104139217.
EP Examination Report dated Mar. 4, 2019 in EP Application No. 15814233.1.
U.S. Appl. No. 16/338,403, filed Mar. 29, 2019, Shrivastava et al.
U.S. Preliminary Amendment dated Apr. 17, 2019 in U.S. Appl. No. 16/254,434.
U.S. Office Action dated Sep. 4, 2018 in U.S. Appl. No. 15/320,725.
EP Extended Search Report dated Feb. 15, 2018 in EP Application No. 15814233.1.

(56) References Cited

OTHER PUBLICATIONS

International Search Report and Written Opinion (ISA/KR) dated May 23, 2018 in PCT Application No. PCT/US2018/018241.
Vinci Construction Datasheet for "Horizon-Solar Connected Window", Dec. 2016 (2 pp).
U.S. Notice of Allowance dated Mar. 9, 2018 in U.S. Appl. No. 14/887,178.
U.S. Office Action dated Jul. 24, 2018 in U.S. Appl. No. 15/978,029.
U.S. Notice of Allowance dated Dec. 13, 2018 in U.S. Appl. No. 15/978,029.
U.S. Office Action dated Apr. 27, 2018 in U.S. Appl. No. 15/123,069.
U.S. Notice of Allowance dated Nov. 28, 2018 in U.S. Appl. No. 15/123,069.
U.S. Office Action dated Jul. 6, 2018 in U.S. Appl. No. 15/534,175.
U.S. Office Action dated Aug. 7, 2018 in U.S. Appl. No. 15/910,936.
U.S. Notice of Allowance dated Dec. 14, 2018 in U.S. Appl. No. 15/910,936.
U.S. Final Office Action dated Mar. 15, 2018 in U.S. Appl. No. 14/951,410.
U.S. Notice of Allowance dated Oct. 22, 2018 in U.S. Appl. No. 14/951,410.
International Search Report and Written Opinion dated Nov. 16, 2018 in PCT Application No. PCT/US2018/029460.
International Search Report and Written Opinion dated Oct. 15, 2018 in PCT Application No. PCT/US2018/029406.
CN Office Action dated Aug. 28, 2018 in CN Application No. 201580070776.3.
EP Extended Search Report dated Nov. 8, 2018 in EP Application No. 15863112.7.
EP Office Action dated Aug. 21, 2018 in EP Application No. 15758538.1.
EP Extended Search Report dated Jun. 5, 2018 in EP Application No. 15868003.3.
RU Office Action dated Sep. 24, 2018 in RU Application No. 2016139012.
Taiwanese Office Action dated Dec. 12, 2018 in TW Application No. 107129150.
EP Office Action dated Mar. 4, 2019 in EP Application No. 15814233.1.
U.S. Appl. No. 16/253,971, filed Jan. 22, 2019, Brown et al.
U.S. Appl. No. 16/254,434, filed Jan. 22, 2019, Brown et al.
U.S. Preliminary Amendment filed Dec. 22, 2017 in U.S. Appl. No. 15/739,562.
U.S. Office Action dated Aug. 22, 2019 in U.S. Appl. No. 16/298,776.
U.S. Office Action dated Aug. 21, 2019 in U.S. Appl. No. 16/508,099.
U.S. Office Action dated Jul. 25, 2019 in U.S. Appl. No. 16/253,971.
U.S. Notice of Allowance dated Jul. 17, 2019 in U.S. Appl. No. 15/123,069.
U.S. Notice of Allowance dated Jul. 25, 2019 in U.S. Appl. No. 15/534,175.
CN Office Action dated Aug. 16, 2019 in CN Application No. 201580015979.2.
Russian Office Action dated Jul. 10, 20019 in RU Application No. 2017123902.
U.S. Appl. No. 16/508,099, filed Jul. 10, 2019, Shrivastava et al.
U.S. Appl. No. 16/523,624, filed Jul. 26, 2019, Shrivastava et al.
U.S. Appl. No. 16/555,377, filed Aug. 29, 2019, Shrivastava et al.
International Search Report and Written Opinion dated Jul. 11, 2019 in PCT Application No. PCT/US2019/030467.

\* cited by examiner

CONTROL METHODS AND SYSTEMS FOR NETWORKS OF OPTICALLY SWITCHABLE WINDOWS DURING REDUCED POWER AVAILABILITY

CROSS-REFERENCE TO RELATED APPLICATION

This is a national stage under 35 U.S.C. § 371 to International Application Number PCT/US15/38667 (designating the United States), titled "CONTROL METHODS AND SYSTEMS FOR NETWORKS OF OPTICALLY SWITCHABLE WINDOWS DURING REDUCED POWER AVAILABILITY" and filed on Jun. 30, 2015, which claims priority to and benefit of U.S. Provisional Patent Application No. 62/019,325, titled "UNINTERRUPTABLE POWER SUPPLIES FOR NETWORKS OF OPTICALLY SWITCHABLE WINDOWS" and filed on Jun. 30, 2014; all of which are hereby incorporated by reference in their entirety and for all purposes.

FIELD OF INVENTION

This disclosure relates to methods and systems (e.g. window controllers) for controlling one or more networks of optically switchable windows while power resources are limited. In certain aspects, the methods and systems pertain to uninterruptable power supplies (UPSs) and controlling optically switchable windows powered by UPSs during reduced power conditions.

BACKGROUND

Electrochromic (EC) windows and other optically switchable windows typically need power to induce and maintain an optical change. In an EC window, for example, voltage/current must be applied to the transparent conductive sheets sandwiching an optically active layer to change the EC window from a bleached state to a tinted state. A small voltage/current may be needed to hold the EC window in the tinted state. The voltage/current is applied by bus bars electrically connected to the conductive sheets. The bus bars are electrically connected to a power source that supplies the power needed for the optical changes. Window controllers are used to adjust the power applied to the EC windows to control its optical changes.

Buildings equipped with EC windows do not typically have mechanical shades since that would be considered an unnecessary under normal circumstances. If a power outage were to occur in such a building, the window controller controlling the tinting levels of the EC windows could lose power along with the air conditioning (AC) and heating systems. Under these circumstances, power would not be available to tint any clear windows or clear any tinted windows. The EC windows would "float" (i.e. be released of applied voltage/current) and would eventually lose their tint due to current leakage. If conditions outside the EC windows are hot and sunny, solar radiation and its associated heat would be allowed to penetrate the rooms. If the AC is not working as well, the internal room temperatures could become uncomfortably warm for its occupants. On the other hand, if conditions are cold and sunny, since power is not available to clear the windows quickly, the windows would instead slowly lose their tint. During this time, the tinted windows would block the solar radiation and prevent harvesting of the solar energy to help heat the rooms where the heating systems may not be available. In this case, occupants may be subjected to uncomfortably cold temperatures. Moreover, during a power outage, the local window controllers at the EC windows may not have a working power supply and occupants could lose their ability to control their EC windows to make their rooms comfortable, for example, from glare. Although certain buildings are equipped with a backup power supply or an uninterruptable power supply (UPS) that automatically switches on in a power outage, their energy stores may be quickly depleted if the EC windows and other systems in the building continue to run under normal operation.

SUMMARY OF INVENTION

Certain aspects are directed to window controllers and window control methods that integrate feedback from one or more uninterruptable power supplies (UPSs) and/or other systems into tinting decisions for networks of optically switchable windows.

One embodiment is directed to a method of determining and/or implementing tint decisions for optically switchable windows at a site (e.g., a building) during a power interruption using feedback from a UPS. This method receives a signal from the uninterruptable power supply with charge remaining on the uninterruptable power supply. The signal is sent in response to detecting the power interruption. The method also determines tint decisions for the optically switchable windows based on the remaining charge left on the uninterruptable power supply.

One embodiment is directed to a master controller comprising a computer readable medium, a processor in communication with the computer readable medium (e.g., memory), and a communication interface in communication with the processor. The computer readable medium comprises control logic and zone data. The processor is configured to receive a signal from the uninterruptable power supply with charge remaining on the uninterruptable power supply. This signal is sent in response to detecting the power interruption. The processor is also configured to determine a tint decision for an optically switchable window based on the remaining charge left on the uninterruptable power supply. The communication interface is in communication with the processor to receive the tint decisions and in communication with a window controller electrically connected to an optically switchable window to apply voltage/current to the optically switchable window to implement the tint decision.

Certain embodiments are directed to methods of determining tinting instructions for optically switchable windows to reduce power usage at a site. In one embodiment, a method comprises (a) determining a reduced power event, (b) determining a current amount of power available at the site, (c) performing reduced power operations to determine new tinting instructions for the optically switchable windows based on the current amount of power available at the site, and (d) repeating (b) and (c) at intervals during a period of the reduced power event. In some cases, it is determined that the reduced power event has occurred upon receiving a notification signal sent from an uninterruptable power supply in response to detecting the power outage. In one case, the amount of power available at the site is based on the current charge remaining on the uninterruptible power supply.

Certain embodiments are directed to window controllers for determining tinting instructions for one or more optically switchable windows to reduce power usage at a site. In some cases, the window controller comprises a computer readable medium storing control logic and zone data, a processor in communication with the computer readable medium, and a communication interface in communication with the processor to receive the new tinting instructions and in communication with electrodes configured to apply power to the one or more optically switchable windows to implement the new tinting instructions. In these cases, the processor is configured to: (a) determine a reduced power event has occurred, (b) determine an amount of power available at the site, (c) perform reduced power operations to determine new tinting instructions for the optically switchable windows based on the amount of power available at the site, and (d) repeat (b) and (c) at intervals during a period of the reduced power event.

Certain embodiments are directed to systems of electrochromic windows with an integrated uninterruptable power supply. In some embodiments, the system comprises one or more networks of electrochromic window and a window controller communication network comprising one or more window controllers in communication with the integrated uninterruptable power supply and in communication with the one or more networks of electrochromic windows. In these embodiments, the integrated uninterruptable power supply detects a reduced power event and automatically provides power in response. Also, the one or more window controllers determine tinting instructions for the one or more networks of electrochromic windows to reduce power usage at the site upon receiving trigger signal sent from the integrated uninterruptable power supply upon detecting the reduced power event.

Certain embodiments are directed to uninterruptible power supplies for determining tinting instructions for one or more optically switchable windows at a site. The uninterruptible power supply comprising a power supply, a computer readable medium storing control logic and zone data, a processor in communication with the computer readable medium, and a communication interface in communication with the processor to receive the new tinting instructions and in communication with electrodes configured to apply power to the one or more optically switchable windows to implement the new tinting instructions. The processor is configured to (a) detect a power outage, (b) automatically provide power to the site upon detecting the power outage, (c) determine power available at the site, (d) perform reduced power operations to determine new tinting instructions for the one or more optically switchable windows based on the determined power available at the site, and (e) repeat (c) and (d) at intervals during the power outage. These and other features and advantages will be described in further detail below, with reference to the associated drawings.

BRIEF DESCRIPTION OF THE DRAWINGS

The following detailed description can be more fully understood when considered in conjunction with the drawings in which.

DETAILED DESCRIPTION

Figure 1A:
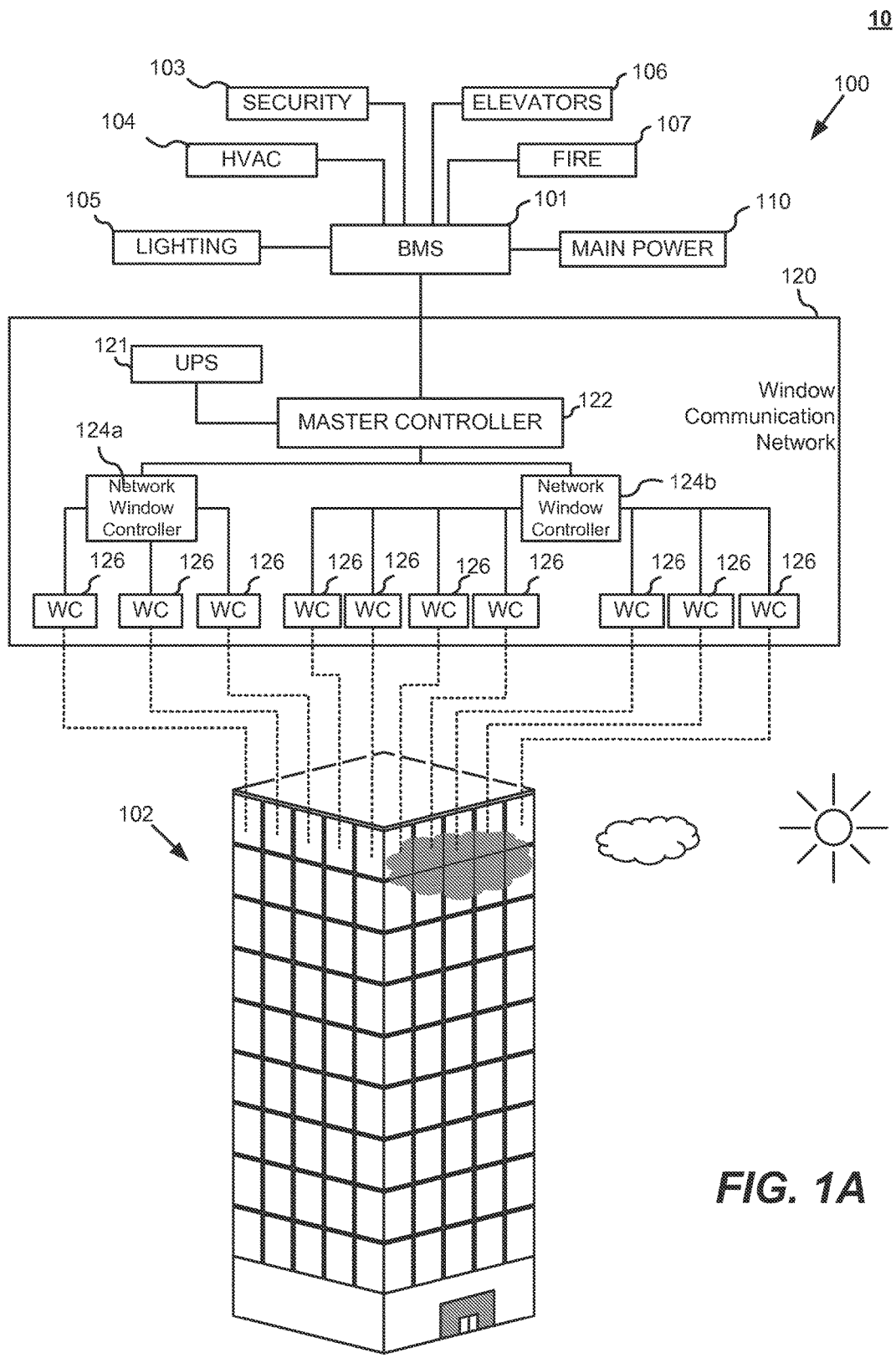
FIGS. 1A-1D are each diagrams of a system for controlling functions of one or more optically switchable windows of a site, according to an embodiment.

Certain aspects described herein are directed to window controllers and window control methods that use feedback received from one or more uninterruptable power supplies (UPSs) or other systems to make tinting decisions for one or more networks of optically switchable windows. These window controllers and their control methods use this feedback to maintain comfort and/or safety for occupants for the longest period of time possible while power resources are limited. Power may be limited, for example, during a full or partial power outage or during a demand response for energy savings measures. When power resources are limited, various reduced power operations may be used such as, for example, placing the windows and/or other systems in power conservation mode or controlled shut down mode. Although the control logic discussed herein is useful for any optically switchable windows, for simplicity it is described in certain examples in terms of electrochromic (EC) windows.

I. Window Controllers and Systems for Reduced Power Operations

A site, such as a building, may be equipped with a UPS (or multiple UPSs) that can detect a power reduction (e.g., power loss) and then automatically engage to provide nearly uninterrupted power to one or more systems at the site. When a UPS detects the power reduction, the UPS sends a trigger signal notifying the one or more systems that they are now running on the UPS. Generally, the UPS has limited energy resources (e.g., battery and/or fuel to power a generator for the UPS) which would be depleted more quickly if the systems were to continue in standard operating mode. Thus various embodiments described related to management of a limited supply of energy from a UPS. Although the UPS provides a trigger signal in many examples described herein, the disclosure is not so limited, it would be understood that other sources such as an operator of the window system may provide a trigger signal of reduced power and other information related to the limited power resources.

In some cases, a UPS may be dedicated to supplying power to a window system that controls and provides energy to one or more networks of EC windows or other optically switchable windows at the site. One embodiment is a network or system of EC windows with a dedicated UPS for that network or system of windows. This dedicated UPS may be in electrical communication with the window controller (e.g., a master controller and/or one or more network window controllers in communication with end/leaf window controllers) controlling the window system. In one case, the dedicated UPS is also physically located proximate to the window controller. Although certain embodiments described herein have a UPS that is dedicated to supplying energy to the window system, other embodiments may have a UPS that shares its resources with other systems at the site or may have one or more additional UPSs and/or other backup power sources that share their resources across systems at the site in the event of a power outage.

When a window controller (typically a master controller or network controller) controlling one or more networks of EC windows receives a trigger signal notifying it of limited power resources, the window controller enters into an intelligent power outage (IPO) mode. Control operations during the IPO mode are designed to extend the life of the limited power resources such as those available in a dedicated UPS while maximizing comfort and/or safety of the occupants. Generally, the window controller remains in IPO mode during the power reduction and returns to standard operating mode once the main power supply is restored. In certain cases, the UPS or other source may send a second signal notifying one or more systems at the site that the main power has resumed.

Once the window controller is in IPO mode, it uses logic implementing IPO operations to make and implement tinting decisions designed to increase (e.g., maximize) comfort and/or safety for occupants in the site while conserving energy to extend the life of the energy resources in the UPS. In many cases, tinting decisions made during IPO mode are based on feedback received from the UPS and/or other systems in the site. Feedback data may be transmitted, for example, by an internal real time clock (RTC), by external/internal sensors, by occupants or site manager e.g. sending override commands, by a Building Management System (BMS), etc. Some examples of feedback data that typically changes and are updated during a period of power reduction include current time, internal and external temperature readings, internal and external irradiance readings, motion detector readings, override values, charge remaining on the energy resources of the UPS (e.g., battery status) or other energy resources, actual and calculated energy usage one or more systems (e.g., window system) at the site, occupancy and energy usage at various zones, weather feed data, etc. For example, occupants may move during the power reduction to a particular floor to conserve energy resources and consequently occupancy and energy usage at the zones would change. In certain embodiments, the system may affirmatively instruct occupants to move to a selected zone or zones where EC window function may continue for maximum occupant comfort, while other zones have their power supply cut for conservation of energy remaining in the UPS system. Some examples of feedback that are typically static during a power reduction may include geographical location of the site, season, standard occupancy schedule table (standard occupancy within each zone at different times), zone locations at the site, orientation of windows, known duration of the outage, and the type of power reduction (e.g., full power outage, partial power outage, demand response, etc.).

In various aspects, tinting decisions are made based on safety and/or privacy concerns. For example, there may be safety concerns of vandalism or intruders entering the building during the power reduction. In one embodiment, the street level windows may be cleared or held in a clear state to allow visibility into the building by police or other emergency personnel outside the building to see whether intruders are present inside the building. In another embodiment, the street level windows (e.g., shop windows) may be transitioned to or held at a darkest tint state in order to block visibility through the windows from potential intruders outside the building. As another example, there may be certain windows with privacy concerns (e.g., an occupied restroom) during a power reduction. In one embodiment, the windows with privacy concerns may be transitioned to or held at a darkest tint state in order to block visibility through those windows from outside the building. Control logic therefore may override any manual or other occupant control to, e.g., clear or tint certain windows/zones for security and/or privacy concerns; it does not necessarily need to be street level windows.

In one aspect, the IPO logic comprises instructions for implementing IPO operations that make tinting decisions based on a known duration of a power outage, the currently available energy resources (e.g., on UPS), and the current and/or predicted future usage of power by one or more systems at the site. The IPO operations may use this information and other data to make its tinting decisions to help conserve energy to extend the life of the available energy resources and/or maximize comfort and/or safety to the occupants. For example, the IPO operations may use current and/or predicted future internal and/or external conditions. In one scenario, the IPO operations comprise control operations to increase tint of the EC windows on facades facing the sun under hot and sunny weather conditions. This increased tint blocks solar radiation to prevent glare and reduce heat load into the building to help keep temperatures at comfortable levels for its occupants in the event that power is unavailable or limited to the AC system. Under cold and sunny weather conditions, the IPO operations may comprise control operations to actively clear the EC windows to harvest sunshine and increase heat load from solar radiation into the building to help keep temperatures at comfortable levels for its occupants in the event that power is not available or is at reduced levels for heating and also to conserve energy resources. In another scenario, e.g. on a hot sunny day, the system may direct occupants to a shady side of the building and "sacrifice" other areas by cutting power to the EC windows and allow heat gain in those (now) unoccupied areas. Thus, the IPO system may use inputs such as weather conditions, solar position, number of occupants, available energy reserves and the like to direct occupant actions within a building. The IPO system may take occupant comfort as its highest priority in applying logic to power consumption patterns or, e.g. energy savings as the highest priority, or as another example occupant safety (e.g. building lighting may be out, and the EC windows bleached to provide light so that occupants do not get injured due to poor interior visibility), depending on the conditions at hand.

Under certain scenarios, the power reduction may be of known duration such as may occur in a demand response or other anticipated power outage flagged by a utility company providing electrical power to a site. In certain embodiments, a window controller in IPO mode may periodically receive feedback regarding the amount of power remaining on available energy resources (e.g., charge remaining in the energy resources of the UPS) and/or power currently being used by one or more systems at the site. In some cases, the value of the total current power usage at a site can be used to determine which systems (e.g., AC or heating) at the site have been shut down. For example, a high value of current power usage (i.e. greater than a predefined value) may indicate that AC is being used and a low value of current power usage (i.e. less than a predefined value) may indicate that the AC is not being used. In one case, the IPO operations determine the current energy being used by one or more EC windows based on their current tint state. In another case, the IPO operations determine the energy that will be used by the EC window during the known duration of the power outage based on the tinting decisions that would be made using standard tinting methods during a normal day. Based on feedback from the systems and the current energy usage by the EC windows, the IPO operations checks to see whether there is enough charge left at the available energy resources (e.g., of the UPS) to last the known duration. In this first case, if there is enough charge left to continue in standard operating mode for the entire known duration, the IPO operations may not change the tinting decisions and continue in standard operating mode allowing standard tinting methods to proceed making tinting decisions for the EC windows as would be used during a normal day. If there is not enough energy reserves left to continue in standard operating mode for the entire known duration, the IPO operations will make tinting decisions that maximize occupant comfort and/or safety for critical windows or critical zones while conserving energy to make the UPS last for the longest period of time. For the non-critical windows or zones, the IPO operations make tinting decisions (e.g., transition to a new tint level, float, hold a tint level, or combination thereof) based on whichever option uses the least amount of energy. In certain cases, the window controller may be notified in advance of an anticipated power reduction such as by receiving advance notice from the utility company. In these cases, the IPO operations can send tinting instructions before the outage commences and hold in anticipation of the power outage, for example, 1, 2, 3, 4, or 5 minutes before the power reduction begins.

In another scenario, there may be a power reduction of unknown duration such as an unexpected power outage. In this case, the window controller uses logic comprising instructions for implementing IPO operations that periodically re-evaluate tinting decisions based on feedback received from the UPS and/or other building systems during the period of power reduction. The IPO operations will make its tinting decisions that maximize occupancy comfort and/ or safety for critical windows or critical zones while conserving energy to make the available energy resources last the longest period of time. For the non-critical windows or zones, the IPO operations make tinting decisions (e.g., transition to a new tint level, float, hold a tint level, or combination thereof) based on whichever option uses the least amount of energy. The tinting decisions will be based on feedback from the UPS and/or other systems at the site such as current charge remaining on the available energy resources, actual and/or calculated power usage by systems at the site, and internal/external conditions at the site including weather forecast (e.g. weather data service feeds to the system), etc. In some cases, the difference between actual energy consumption and calculated energy consumption may be determined and tint decisions adjusted according to this assessment.

Tinting control decisions for an optically switchable window may include, for example, floating by powering off the optically switchable window, drifting by powering off and pulsing power to extend the time until the optically switchable window clears, holding a tint state, transitioning to a lower tint state (e.g., intermediate tint state), and transitioning to a higher tint state. The IPO operations may make tinting decisions to increase comfort for the occupants and reduce energy consumption by balancing the amount of energy needed to implement the tint decision with the amount of time that the tint level is maintained. The amount of energy needed to transition to a new tint level using a constant voltage/current is typically more than is needed to hold a tint state. Also, the amount of energy needed to transition from a bleached tint state to a colored tint state is typically more than is needed to transition between a bleached tint state and an intermediate tint state. When allowing a window to drift by pulsing power, the tint level may be maintained for an extended period of time without needing to hold power the entire time, which may reduce the overall energy consumption. Further, certain EC windows have extremely low leakage current and can remain in their tint state for extend periods without losing significant tinting. An example of a high efficiency window with low leakage current can be found in U.S. Pat. Nos. 8,300,298 and 8,764,951, titled "ELECTROCHROMIC DEVICES," which are hereby incorporated by reference in their entirety. In such scenarios, the UPS may pull all power from zones having these windows, and provide power only periodically or not at all, depending on heat load on those zones and anticipation of power returning at some defined time. For example, if the IPO system knows that the EC windows, currently tinted, in a zone with direct sun exposure will hold substantially all or a sufficiently high of their tint level for the next few hours, and the power outage is of limited duration and/or that the sun will move from that zone within a few hours; then the system may cut power to those windows in that zone as part of an overall power reserve management strategy.

Table 1 below provides examples of amounts of energy needed to proceed with certain tinting operations for 1000 square feet of EC lite, according to certain embodiments. 1000 square feet of EC lite corresponds to at least the amount of active area needed for about 20 insulated glass units (IGUs) where each IGU has a single EC lite with an active area of about 5 feet by 10 feet. The values in Table 1 below are for illustration purposes to show the relative values of certain tinting decisions. Other embodiments may have other values.

TABLE 1

| 1000 square feet of EC window pane | Tint Drive energy for 1 tint cycle (e.g., bleached to colored state) | Tint Hold Energy for 12 hours of tint hold | Clear Drive Energy for 1 clear cycle (e.g., colored to bleached state) | Total Energy for 1 tint cycle, 12 hour tint hold, and 1 clear cycle |
|---|---|---|---|---|
| Energy for 24 hours (Wh) | 17.08 | 33.60 | 8.58 | 59.26 |

In some embodiments, a window controller (e.g., a master controller) manages tinting decisions for one or more networks of EC windows in a building or other site based on information and energy resources from a UPS at the site. The window controller receives a trigger signal from the UPS notifying the window controller that it is now running off energy resources at the UPS. In response, the window controller enters into IPO mode using logic comprises instructions for performing IPO operations. The IPO operations include making tinting decisions (i.e. determining appropriate tint levels and sending control instructions to power EC windows to transition to the determined tint levels) for the EC windows based on feedback periodically received from the UPS and other sources. For example, the IPO operations may make tinting decisions based on internal and/or external conditions determined from internal and/or external sensor readings respectively or from weather forecast data. If certain IPO operations determine external conditions are "hot" and "sunny," the IPO operations may send control instructions to hold any tinted EC windows at their current tint levels to reduce glare and minimize heat from solar radiation to keep room temperatures at comfortable levels based on internal sensor readings. If not already tinted or tinted at a low level of tint, the IPO operations may send control instructions to increase tint of the EC windows. If the IPO operations determines external conditions are "cold" and "sunny," the IPO operations may send control instructions to hold any clear EC windows and clear or float any tinted windows to increase heat load entering the building to help keep room temperature at comfortable levels based on internal sensor readings. At night, the IPO operations may send control instructions to float all the EC windows except those which need to be tinted for security or privacy reasons. A determination of a "sunny" external condition may be based on irradiance readings from external light sensors above a predefined upper irradiance limit. A determination of a "cloudy" external condition may be based on determining that irradiance readings from external light sensors are below a predefined lower irradiance limit. A determination of a "hot" external condition may be based on a determination that temperature readings from external temperature sensors are above a predefined upper temperature limit (e.g., 80 degrees F.). A determination of a "cold" external condition may be based on a determination that temperature readings from external temperatures sensors are below a predefined lower temperature limit (e.g., 50 degrees F.). The IPO operations may include using a solar calculator to determine whether it is "nighttime" or "daytime" based on a current real time clock reading and geographical data about the site.

In certain embodiments, weather forecast feed data can be received over a communication network by the IPO operations to make tinting decisions in anticipation of future forecasted weather conditions. In these embodiments, the IPO operations can anticipate tinting decisions required in the future based on the weather forecast data and/or sensor and solar calculator data. For example, the IPO operations can implement tinting decisions that start transitioning the windows in advance so that transition is complete at the appropriate future time. In one example, the IPO logic may determine the reduced power event in the future and the tinting decisions required in the future based on at least the weather forecast data. In this case, the IPO operations can implement tint decisions in advance of the reduced power event to help extend the life of the UPS.

In certain aspects, a window controller makes tinting decisions for critical windows and zones primarily to maximize occupants comfort and/or safety in those critical areas and makes tinting decisions for non-critical windows and zones primarily to conserve energy. For example, tinting decisions for non-critical windows/zones may be based on whichever tinting decisions uses the least amount of energy. Some typical examples of tinting decisions for non-critical windows/zone may be floating by powering off, drifting by powering off and pulsing power, holding a tint state, transitioning to a lower tint state (e.g., intermediate tint state). The IPO operations may periodically determine which windows and/or zones are critical and/or non-critical during the period of power reduction using feedback from the UPS and/or other systems, and then the IPO operations make its tinting decisions according to these determinations.

In certain aspects, logic may comprise instructions for implementing IPO operations that determine whether zones or windows are critical and/or non-critical. Since whether zones or windows are critical or non-critical may change over time, certain embodiments pertain to IPO operations that periodically determine whether zones or windows are critical and/or non-critical. The IPO operations will make tinting decisions that maximize occupancy comfort and/or safety for the critical windows (windows determined to be critical) and that minimize energy consumption of the non-critical windows (windows determined to be non-critical). EC windows and zones of EC windows may be determined to be critical or non-critical based on various factors such as whether rooms with the windows are occupied, the level of need of the particular occupants, whether there are security or privacy concerns with the windows, whether tinting or non-tinting is of high importance for energy conservation, etc. For example, a critical zone may be a zone with windows in a hospital nursery or intensive care unit. As another example, a critical zone may be a zone with the most window surface area due to energy conservation. In another example, the IPO operations may determine that windows/zones facing the sun are critical and those facing away from the sun are non-critical. As another example, the IPO operations may determine that windows facing the sun and in rooms with occupants are critical and windows that may face the sun, but do not have occupants are not critical. As another example, the IPO operations may determine that a zone with occupants at the street level is a critical zone for security reasons and the windows may be tinted in this zone even during the nighttime.

In examples where windows in occupied rooms may be considered critical and windows in unoccupied rooms may be considered non-critical, there may be various ways for the system to determine whether the rooms are occupied to determine whether the rooms are critical or not. In one case, for example, certain rooms may be scheduled to be occupied at the time of the outage. In this case, the window controller may implement control logic that performs IPO operations that retrieve, for example, an occupancy lookup table with a schedule of the occupancy. In another case, certain rooms may be determined to be occupied by one or more motion sensors in the rooms. In this case, the IPO operations may receive a signal from the motion sensors indicating current occupants. In yet another case, there may be a scenario where a notification is sent to occupants of the building at the onset of the power outage to have them evacuate to certain areas of a building (e.g., shaded side of a building on a hot and sunny day). The notification may also be sent to the window controller. In response, certain IPO operations may determine that the evacuation areas of the building have become the critical zones and determine tint decisions for these critical zones that maximize comfort and/or safety for its occupants. These evacuation areas may change during the duration of the power reduction.

In certain aspects, the IPO operations may deem critical areas those with computer servers, i.e. where heat load reduction is critical. Thus in certain embodiments spaces with computer servers are given highest priority for reserve power for maintaining tint level to block solar heat load.

In certain aspects, the window controller may implement logic to perform IPO operations that make tinting decisions for certain windows based on whether there is a security concern. Depending on the type of security concern, windows may be tinted (or held at the current tint state) or powered to be clear. For example, occupants or the site manager may want certain windows tinted (or held at a tint level) during a power reduction to prevent rooms from being viewed from outside the building for security reasons. As another example, occupants or a site manager may want certain windows powered to clear at the onset of a power outage, for example, to allow intruders inside the building to be visible from outside for security purposes.

Without an IPO mode, during a power reduction, the window controller could lose power and occupants could lose their ability to enter override values to control the tint state of one or more EC windows in their rooms. For example, during intermittent power outages such as power glitches, the window controller could lose power and the EC windows would float and lose tint over a period of time. In this scenario, the occupants would no longer have the ability to tint their EC windows and would be subjected to glare on their workspaces during the power reduction. In certain embodiments, IPO operations can help protect occupants from this glare scenario and other uncomfortable conditions while power resources are limited and, in certain cases, allow occupants to control their EC windows. For example, the IPO operations may provide power to particular local (leaf/end) window controllers of critical EC windows in occupied rooms to allow occupants to send tint override commands to the EC windows during a power reduction. By powering window controllers of critical EC windows, occupants retain control of their local windows to be able to adjust them to their comfort during the power reduction. In another aspect, the IPO operations may receive override requests with override tinting decisions from occupants and others (e.g., site manager) during or before the power reduction. In certain embodiments, the IPO operations may limit the override capability to certain zones and/or certain users and ignore requests from others.

In certain aspects, the window controller (e.g., master controller, network window controller, or end/leaf window controller) makes tinting decisions for one or more networks of EC windows based on feedback received from a UPS and/or other systems. In the case of a power reduction, the UPS sends a trigger signal to the window controller with a notification that the window controller is now running off the UPS. The notification may also indicate which other systems may be running off the UPS. The window controller makes tint decisions to manage the one or more networks of EC windows at the site based one feedback from systems at the site such as internal and external sensor readings that are used to determine internal and external conditions at a site such as environmental conditions or occupancy. For example, if it is hot and sunny outside, the window controller may send control instructions to hold the EC windows in the tinted state if already tinted. If not already in tinted state, the window controller may send control instructions to apply power to transition the EC windows into the tinted state. As another example, if it is cold and sunny outside, the window controller holds the EC windows in the clear state if already clear. If not already in clear state, the window controller would send control instructions to go to clear state. In certain cases, the master controller will send control instructions to tint or clear only critical windows/zones. In the case of an anticipated power reduction flagged by a utility company, the window controller may determine the control instructions to tint or clear before the power reduction occurs in anticipation of the reduction. The window controller may then hold the tint states with the UPS. With periodic feedback on battery status (e.g., current charge available) from the UPS, the window controller may make tint decisions for other power conservation measures—such as keeping only critical zones tinted or cleared or controlled. A critical zone may be, for example, the zone with most glass or facing the sun at a certain time of the day or facing away from the sun at certain time of the day. Also, as discussed above, a critical zone designation may change over time. Non-critical zones may be held in a different state, changed to a different state and then float (powered off) or float if already in desired state. The window controller can also control the tint levels to harvest outside light in certain zones as needed or darken specific zones as needed for safety/privacy. All these instructions may be predefined in the window control system to trigger in the event of anticipated or unexpected power reduction.

In certain cases, an "uninterruptible power supply" or "UPS" refers to an apparatus that supplies power to one or more systems at a site when there is a power reduction such as a full or partial power outage or other interruption of the main power supply to the site. In many cases, the main power supply may be provided by a utility company. The UPS can provide near-instantaneous protection from any power interruption by automatically supplying power stored in its power source (e.g., battery) when it detects the power interruption. The UPS differs from a backup power generator in that the UPS can provide a nearly instantaneous response, whereas a backup power generator must be switched on. One or more UPSs may be physically located at the site. The one or more UPSs may be part of an EC window network and/or system as an integrated component.

A UPS comprises a processor (e.g., microprocessor) and a computer readable medium in electrical communication with the processor. In some embodiments, a UPS comprises the components the window controller 450 described with respect to FIG. 4. In these cases, the UPS can have the functionality of a window controller such as using the control logic described herein to make and implement tinting decisions to control one or more networks of optically switchable windows. In these cases, the UPS may function to control the windows and a separate window controller may not be required.

In certain embodiments described herein, a UPS is dedicated to supplying energy to a window system having one or more networks of optically switchable windows at a site. In other embodiments, a UPS, multiple UPSs, or a combination of UPS(s) and backup power source(s) may share their energy resources across systems at the site in the event of a power interruption. In the cases with a dedicated UPS to the window system, the UPS may be in electrical communication with the window controller (e.g. master controller) controlling and powering the EC windows. In these cases, the UPS may be physically located in proximity of the window controller. Some commercially-available UPSs have one or more serial/USB ports for wired connection to the master controller and other systems in the building. Some commercially-available UPSs are the size of a desktop computer. In certain commercially-available UPSs, the power source may be a battery that has a charge capacity capable of powering up to about 6000 $ft^2$ of EC windows for more than one hour during two optical transitions on peak power consumption. In a Smart UPS™ unit, version SMT3000, commercially available from Schneider Electric™, the Smart-UPS™ unit has a battery with a 500 Wh capacity, which may be capable of supporting 1000 square feet of EC lite for about 8 days with 2 cycles per day. If used to only hold the EC windows at a tint level, instead of transitioning, the charge capacity of these UPSs may be capable of longer than one hour of hold time. Although certain embodiments are described with reference to a single UPS, multiple UPSs can be used.

In certain embodiments, an "optically switchable device" refers to a thin device that can change optical state in response to electrical input. In many cases, it can reversibly cycle between two or more optical states. Switching between these states is controlled by applying a predefined current and/or voltage profile to the device. In many cases, the optical switchable device comprises two thin conductive sheets that straddle at least one optically active layer. In these cases, the electrical input driving the change in optical state is applied to the thin conductive sheets. In certain implementations, the electrical input is provided by bus bars in electrical communication with the conductive sheets. While the disclosure emphasizes EC devices as examples of optically switchable devices, the disclosure is not so limited. Examples of other types of optically switchable devices include certain electrophoretic devices, liquid crystal devices, and the like. Optically switchable devices may be provided on various optically switchable products, such as optically switchable windows (e.g. EC windows). Moreover, the embodiments disclosed herein are not limited to optically switchable windows. Examples of other types of optically switchable products include mirrors, displays, and the like. In the context of this disclosure, these products are typically provided in a non-pixelated format.

In certain embodiments, an "optical transition" refers to a change in any one or more optical properties of an optically switchable device. The optical property that changes may be, for example, tint, reflectivity, refractive index, color, etc. In certain cases, the optical transition will have a defined starting optical state and a defined ending optical state. For example the starting optical state may be 80% transmissivity and the ending optical state may be 50% transmissivity. The optical transition is typically driven by applying an appropriate electric potential across the two thin conductive sheets of the optically switchable device. The starting or ending optical state may be an intermediate optical state having a value somewhere between the maximum and minimum optical states for the optically switchable device; e.g., 10%, 20%, 40%, 50%, 60%, 70%, or 80% transmissivity. The starting or ending optical state may be a maximum or minimum optical state for the optically switchable device. In one example, a maximum or minimum optical state for an optically switchable device is about 90% or below 1% transmissivity respectively.

In certain embodiments, a "clear state" or a "bleached state" refers to an optical state of the optically switchable device having the maximum level of transmissivity (e.g., about 90%). In some cases, clearing an optically switchable window may refer to applying a voltage/current that drives the optical transition to a clear state. In certain embodiments, a "hold voltage" refers to the applied voltage necessary to indefinitely maintain the optical device in particular optical state.

In certain embodiments, a "window controller" refers to a device for managing tinting decisions for electrochromic device(s) in one or more EC windows. The window controller also controls the power applied to the electrochromic devices in the EC windows. In some cases, a window controller is able to transition each EC device of an EC window between two tint end tint states, e.g., a bleached state and a fully colored end tint state, or between two intermediate tint levels, or between an end tint state and an intermediate tint level. For example, a window controller may be able to transition an EC window between four or more tint levels. In some cases, a single window controller is configured to transition multiple EC windows, for example, in a network of EC windows. In some cases, certain EC windows allow for transitioning to intermediate tint levels (levels between bleached and fully colored state) by using two (or more) electrochromic lites (panes) in a single IGU, where each lite is a two-state lite. In some cases, certain EC windows allow for transitioning to intermediate tint levels (levels between bleached and fully colored state) by using two (or more) electrochromic lites (panes) in a single IGU, where each lite is a two-state lite. Although embodiments make reference to window controllers in a building, these window controllers may be useful in any site.

Building Management Systems (BMSs)

In certain aspects, a BMS or other computer-based control system is installed at a building or other site (or sites) to monitor and control the site's mechanical and electrical equipment such as ventilation, lighting, power systems, elevators, fire systems, and security systems. These control systems typically consists of hardware, including interconnections by communication channels to a computer or computers, and associated software for maintaining conditions at the site according to preferences set by the occupants, site manager, and/or others. In one example, a BMS is implemented using a local area network, such as Ethernet. The software can be based on, for example, internet protocols and/or open standards. An example of software is software from Tridium, Inc. (of Richmond, Va.). A communications protocol commonly used with a BMS is BACnet (building automation and control networks). Although some window controllers and window control methods described herein are discussed with reference to a building, they can be used for any site.

A BMS is most commonly used in a large building, and can function to control the environment within the building. For example, a BMS may be used to control one or more of temperature, carbon dioxide levels, illumination levels, and humidity within a building. Typically, there are many mechanical devices that are controlled by a BMS such as heaters, air conditioners, blowers, vents, and the like. To control the building environment, a BMS may turn on and off these various devices to maintain predefined environmental conditions such as minimum/maximum room temperature, minimum/maximum humidity, avoidance of glare condition, minimum illumination levels, etc. In some cases, different areas (e.g., floors, particular offices, foyer, dining areas, etc.) of the building may be maintained at different environmental conditions based on occupancy (scheduled or current measured) in those areas. In many cases, the core function of a BMS is to maintain a comfortable and/or safe environment for the building's occupants while minimizing heating and cooling costs/demand. Thus, a BMS is used not only to monitor and control, but also to optimize the synergy between various systems, for example, to conserve energy and lower building operation costs.

In certain aspects, a window controller performs operations of IPO logic that incorporate feedback from the UPS and/or other systems in the building to make tinting decisions for the one or more networks of EC windows in the building. In certain cases, the EC windows in the building include at least one all solid state and inorganic electrochromic device. In another embodiment, all the EC windows in the building include only all solid state and inorganic electrochromic devices. In another embodiment, one or more of the EC windows in the building are multistate EC windows having two EC panes, as described in U.S. patent application Ser. No. 12/851,514 (now U.S. Pat. No. 8,270, 059) filed on Aug. 5, 2010 and titled "Multipane Electrochromic Windows," which is hereby incorporated by reference in its entirety.

In some cases, data generated by the IPO operations may be fed back to the BMS or directly to the systems at a site as feedback for management of those systems. For example, the window controller may use logic with instructions to perform an IPO operation that sends a notification signal to one or more systems that the EC windows are in IPO mode. As another example, an IPO operation may send a notification signal to the lighting system letting it know that certain windows have been cleared to allow solar radiation enter and heat the rooms and therefore certain lighting can be shut off in those rooms to conserve energy. As another example, an IPO operation may send a notification signal to the security system letting it know that certain windows may be clear at night and may be less secure. As another example, certain IPO operations may make tinting decisions that send control signals to float certain EC windows to conserve energy to maintain allotted energy for the security system to continue to function (e.g., maintain locks) or for certain critical zones to continue to function.

FIG. 1A is a schematic diagram of a system 10 for controlling functions of one or more networks of optically switchable windows of a building 102, according to an embodiment. In FIG. 1A, the system comprises a building communication network 100 comprising a BMS 101 that manages a number of systems of a building 102, including a security system 103, a heating, ventilation, and air conditioning (HVAC) system 104, a lighting system 105, an elevator system 106, a fire system 107, a main power system 110, and the like, according to embodiments. The security system 103 may comprise, for example, magnetic card access, turnstiles, solenoid driven door locks, surveillance cameras, burglar alarms, metal detectors, and the like. The fire systems 107 may comprise, for example, fire alarms and fire suppression systems including a water plumbing control. The lighting system 105 may comprise one or more of interior lighting, exterior lighting, emergency warning lights, emergency exit signs, and emergency floor egress lighting.

The building 102 further comprises one or more networks of optically switchable windows controlled by a master controller 122 of a distributed window communication network, 120. The distributed window communication network 120 comprises a master controller, 122, network window controllers, 124a and 124b, in communication with the master controller 122, and end or leaf window controllers (WCs), 126, in communication with network controllers 124a and 124b. Although not shown, the master controller 122 comprises intelligent power outage (IPO) logic. As depicted by the multiple dotted lines to the optically switchable windows of a floor of the building 102, each optically switchable window on the top floor has its own end/leaf window controller 126. Although not shown, other end or leaf window controllers (WCs) 126 may be in communication with other optically switchable windows on other floors of the building 102. In FIG. 1A and certain other examples, each optically switchable window has its own end/leaf window controller. In certain embodiments, the end/leaf window controllers (WCs) such as the WCs 126 shown in FIG. 1A comprise the components of the window controller 450 shown in FIG. 4. In FIG. 1A and certain other embodiments, each network window controller is in communication with a network of optically switchable windows where each network includes one or more zones and each zone includes one or more optically switchable windows. In some cases, each zone is controlled by its own network window controller. In FIG. 1A, the network window controller 124a is in communication with the three WCs 126, which are in communication with a network of three optically switchable windows and network window controller 124b is in communication with seven WCs 126, which are in communication with a network of seven optically switchable. In this example, the two network controllers 124a and 124b are in communication with the WCs 126 in communication with the optically switchable windows on the top floor of the building 102. In FIG. 1A, the distributed window network (e.g., EC window network) further comprises a UPS 121 dedicated to the window communication network 120 and in electrical communication with the master controller 122.

In certain embodiments, a UPS is dedicated to one or more networks of optically switchable windows (e.g., electrochromic windows) such as in the UPS 121 shown in FIG. 1A that is dedicated to the window communication network 120. A dedicated UPS may be located in close proximity to the window network(s) to which it provides power or may located separately and away from the window network(s). In FIG. 1A, for example, the UPS 121 is located in close proximity to the master controller 122 to which it provides power. In some embodiments, a system controlling one or more networks of optically switchable windows may comprise multiple UPSs. In one example, each of the multiple UPSs is dedicated and in close proximity to the system to which it provides power.

In certain embodiments, a master controller may be located in close proximity to the BMS. For example, the master controller 122 in FIG. 1A may be located in close proximity to the BMS 101.

In FIG. 1A and certain other examples, each end/leaf controller 126 controls a specific optically switchable window of the building 102. Also, each of the network controllers 124a and 124b controls a network of optically switchable windows, which may include one or more zones. In these examples, each end/leaf window controller 126 is electrically connected (depicted by the dashed line in FIG. 1A, for example) to an optically switchable window to control the voltage/current applied to the optically switchable window from one or more power sources (e.g., main power 110 and/or UPS 121). The end/leaf window controller 126 of each network of optically switchable windows is electrically connected to a network controller, 124a or 124b, to receive control signals with data such as tint decisions. Each of the network controllers, 124a and 124b, is electrically connected to the master controller 122 to received control signals with the data such as the tint decisions.

In certain embodiments, each end/leaf window controller can be separate from the optically switchable window that it controls, or can be integrated into the optically switchable window such as, for example, would be an onboard controller. Examples of onboard controllers for multi-state optically switchable windows such as EC windows are described in U.S. patent Ser. No. 13/049,750, titled "ONBOARD CONTROLLER FOR MULTISTATE WINDOWS," and filed on Mar. 16, 2011, which is hereby incorporated by reference.

For simplicity, only the ten optically switchable windows at the top floor of building 102 are depicted as controlled by master controller 122 in FIG. 1A. In a more typical setting, there may be a larger number of optically switchable windows in the building 102 controlled by the master controller 122. The window communication network 120 may not be a distributed network of window controllers in some cases. For example, a single master controller which controls the functions of a single optically switchable window also falls within the scope of the embodiments disclosed herein, as described above. Advantages and features of incorporating optically switchable window controllers as described herein with BMSs are described below in more detail and in relation to FIG. 1A, where appropriate.

One aspect of disclosed embodiments is a master controller that makes tint decisions based on feedback from a UPS and/or other systems of a building. By incorporating feedback, the master controller can provide, for example, enhanced: 1) environmental control, 2) energy savings, 3) security, 4) flexibility in control options, 5) improved reliability and usable life of other systems due to less reliance thereon and therefore less maintenance thereof, 6) information availability and diagnostics, 7) effective use of staff, and various combinations of these, because the optically switchable windows can be automatically controlled. In some embodiments, feedback from systems of the building may be communicated through the BMS. In other embodiments, the BMS may not be present or a BMS may be present but may not communicate with the master controller or communicate at a high level with a master controller. In these embodiments, the UPS and other systems in the building may communicate with the master controller directly. In these cases, maintenance on the BMS would not interrupt control of the optically switchable windows.

In FIG. 1A, the master controller 122 is in communication with the UPS 121 to receive signals from the UPS 121 and/or send signals to the UPS 121. Although not shown, the UPS 121 is also electrically connected to the WCs 126 to supply power to the optically switchable windows. The WCs 126 control power (e.g., control applied level and duration of voltage/current such as with an applied voltage profile of a tint transition) to their corresponding optically switchable windows. In the illustrated example, the UPS 121 is a dedicated power supply to the window communication network 120 and the optically switchable windows it controls. In other embodiments, the UPS 121 or other UPSs may share energy resources with other systems at the site.

The main power system 110 manages power to the systems in the building 102 from one or more sources or power. Although not shown, the main power system 110 is in communication through a main power line to a main source of power (e.g., utility company) to receive power and/or to receive communications regarding power interruptions or other reductions with information such as, for example, duration and start date/time of an anticipated power reduction.

In FIG. 1A, the UPS 121 is configured to provide uninterrupted power to the window communication network 120 and the optically switchable windows in the event of a power outage or other reduced power availability from the main power supply. Generally, a UPS includes a local power source, such as a battery, that can provide power during the period of reduced power from the main power supply. Although not shown in FIG. 1A, the UPS 121 is in communication through with the main power source (e.g., utility company) to receive communications regarding power reduction with information such as, for example, duration and start date/time of an anticipated (known) reduced power event.

In certain embodiments, a UPS includes a voltage/current sensor or other device that can measure a drop in the power from the main power line. The measured drop can be used as an indicator of a significant power reduction (e.g., outage) that would require the use of the power resources on the UPS. For example, determining that the measured drop in power is more than 10% may indicate a reduced power scenario requiring the use of energy stores on the BUP. As another example, determining that the measured drop in power is more than 90% may indicate a full power outage. Using these measurements, the UPS can detect an unexpected (unanticipated) power outage. In the case of an anticipated power outage, the UPS may receive a notification of the anticipated power outage directly from the main power source (e.g., utility company) or from the main power source through a BMS.

In certain aspects, the UPS is in communication with the master controller to send a trigger signal indicating a power reduction and to transmit feedback data from the UPS such as the current charge remaining and/or current power usage from systems in the building. In some cases, current actual power (energy) usage data may be provided by other sources such as the systems using the power or from the utility company. The master controller may also be in communication with other systems in the building directly or through the BMS to receive monitored data from the systems such as external and internal conditions from sensors located within and outside the building, date and time, etc. In addition, the master controller may be in communication with other systems in the building directly or through the BMS to receive static data such as geographical location of the building, occupancy type, etc.

In operation of certain embodiments, when a UPS determines there is a reduced power event, the UPS automatically turns on providing uninterrupted power and sends a trigger signal to the master controller letting it know that it is now running off the energy stores on the UPS. The UPS may also send a trigger signal to other systems in the building indicating that there is a reduced power event. The master controller responds by entering into IPO mode until power from the main power supply is turned back on. While in IPO mode, the master controller periodically receives temperature and irradiance measurements from the interior sensors and/or exterior sensors to determine the current environmental conditions within rooms and/or exterior to the building. The master controller also receives periodic feedback from the UPS of charge remaining on the energy stores of the UPS. The master controller may also receive periodic feedback of the rate of energy/power usage by various systems in the building. If the power reduction is anticipated (e.g., scheduled brownout), the master controller may receive outage information from the main power source (e.g., utility company) such as the duration of the power reduction, start time, and/or end time. This information may be received before the start of the power reduction. The master controller may also receive or have information regarding the current criticality of the rooms or zones in the building. In certain cases, the master controller determines the criticality based on occupancy type from the occupancy table, for example. The master controller may also receive override commands with override tinting values from an occupant, site manager, or other user/operator. In some cases, the master controller may also use geographical information and current clock time (e.g., from a real time clock) or weather forecast information (e.g., from weather feed data) to make tint decisions such as tint decisions (e.g., anticipatory tint decisions). Geographical information may include the latitude and longitude of the building. Geographical information also may include information about the direction that each window faces or each side of a building faces. Using such information, the windows in different rooms and zones on different sides of a building may be controlled in different ways. For example, if the external sensors show that it is cold and sunny, the master controller may instruct the windows to have no tint if it is in the morning so that the room warms up due to sunlight shining in the room.

Figure 1B:
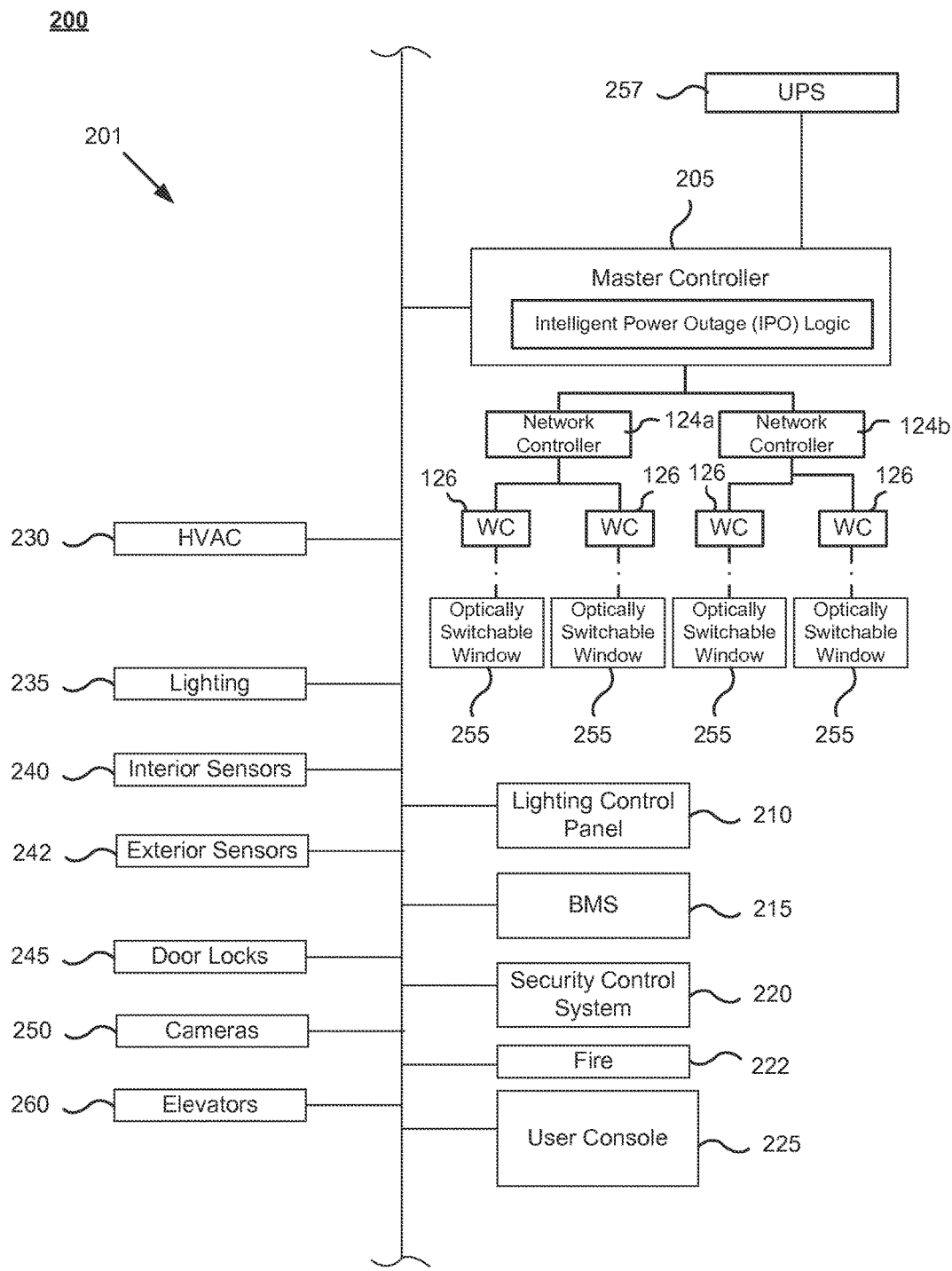

FIG. 1B depicts a block diagram of a system 200 for controlling functions of one or more optically switchable windows 255 at a site, according to an embodiment. FIG. 1B depicts a site communication network between systems at the site, which may be, for example, the building 102 in FIG. 1A. The site communication network 201 may employ any number of different communication protocols, including BACnet. The site communication network 201 comprises a master controller, 205, a lighting control panel, 210, a BMS, 215, a security control system, 220, and fire system, 222, and a user console, 225 for receiving information from and sending information to a user. Security control system 220 may include magnetic card access, turnstiles, solenoid driven door locks, surveillance cameras, burglar alarms, metal detectors, and the like. Fire system 222 may include smoke detectors, sprinkler systems, etc. User console 225 may be, for example, a computer terminal or an interface at a local end or leaf window controller for entering override commands for one or more EC windows. The site communication network 201 further comprises a heating, ventilation and air conditioning (HVAC) system, 230, a lighting system, 235, interior sensors, 240, exterior sensors, 242, door locks, 245, cameras, 250, and elevator system, 260. The lighting system 235 may include one or more of interior lighting, exterior lighting, emergency warning lights, emergency exit signs, and emergency floor egress lighting. The lighting control panel 210 controls the lighting system 235. Lighting control panel 210 may include circuits to control the interior lighting, the exterior lighting, the emergency warning lights, the emergency exit signs, and the emergency floor egress lighting. Interior sensors 240 may include motion sensors for determining current occupancy, temperature sensors, and irradiance sensors in the rooms of the building. Exterior sensors 242 may include temperature sensors, and irradiance sensors on the exterior of the building. Security control system 220 controls door locks 245 and cameras 250. In some cases, data may be exchanged and/or shared between all of the different devices/apparatus and controllers that are part of communication network 201.

In the site communication network 201, the optically switchable windows 255 are on a private window communication network with the master controller 205 and are not directly accessible on the same network as the BMS 215, lighting control panel 210, etc. The master controller 205 is in communication with network controller 124a and 124b, which are each in communication with two end/leaf window controllers (WC) 126. Each WC 126 is in electrically communication with an optically switchable window 255 to control power supplied to the optically switchable window 255. In the illustrated example, master controller 205 controls two networks of two optically switchable windows 255 at the site. The window communication network further comprises a UPS 257 dedicated to the network and in electrical communication with the master controller 205.

Referring back to the example in FIG. 1B, the BMS 215 manages one or more of the controllers and systems in the site communication network 201 such as, for example, the HVAC 230. The BMS 215 may operate in a similar manner as the BMS 101 described with respect to FIG. 1A. The BMS 215 may include a computer server that receives data from and issues commands to other systems of the site communication network 201. For example, the BMS 215 may receive data from and issue commands to both the master controller 205 and the security control system 220.

Master controller 205 may function in a similar manner as the master controller 122 described with respect to FIG. 1A. In many embodiments, the master controller comprises intelligent power outage (IPO) logic for performing IPO operations. During a period of power reduction, the master controller enters an IPO mode and processes instructions in the IPO logic to perform certain IPO operations. Otherwise, the master controller is in standard operating mode. The standard operating mode performs according to various standard schedules that run during standard schedules of normal operation including energy savings holiday mode that runs during holidays, energy saving nighttime mode, and the like.

In many embodiments, building systems and controllers, such as those in building communication network 100 or site communication network 201 in FIGS. 1A and 1B, run according to daily, monthly, quarterly, and/or yearly schedules. For example, the elevator system, the lighting system, the window control system, the HVAC system, and the security system may operate on a 24 hour schedule accounting for when people are at the site during the work day. Under standard operating conditions, during nighttime, the site may enter a nighttime energy savings mode, and during the day, the systems may operate in a daytime standard operating mode that minimizes energy consumption of the site while maximizing occupant comfort. As another example, under standard operating conditions, the systems may shut down or enter a standard holiday energy savings holiday mode over a holiday period.

In standard operating mode, a master controller (e.g., 205, 122, or 303) uses a combination of scheduling information, geographical information, and/or weather forecast information to make its tinting decisions. Geographical information may include the latitude and longitude of a site such as, for example, a building. In the case of a building, geographical information also may include information about the direction that each side or other facet of the building faces. Using such information, windows in different rooms/zones on various sides of the building facing different directions may be controlled in different manners. For example, under standard operating conditions, for east facing rooms of the building in the winter, the master controller may send a control command to the leaf/end controller to have the windows be in a low tint state in the morning so that the room warms up from sunlight shining into the room which can conserve energy that may be needed to heat the room. The lighting control panel may also send a control command to have the lights be dim because of the increased lighting from sunlight penetrating the room which can conserve energy needed to light the room. In this example, the west facing windows may be controllable by the occupants of the room in the morning because the tint state of the windows on the west side may have no impact on energy savings. However, these modes of operation of the east facing windows and the west facing windows may switch in the evening (e.g., when the sun is setting, the west facing windows are not tinted to allow sunlight in for both heat and lighting) under standard operating conditions. Sunrise and sunset times along with weather forecast data can be used to anticipate and take action to maximize occupant comfort and security.

Described below is an example of a site such as, for example, the building 102 in FIG. 1A, that includes one or more networks of optically switchable windows on the exterior (e.g., windows separating the interior of the building from the exterior of the building) and a number of different sensors. Light from exterior windows generally significantly increases the interior illumination of the rooms in the building penetrating to about 20 feet or about 30 feet from the windows. That is, space in a building that is more that about 20 feet or about 30 feet from an exterior window receives little light from the exterior window. Such spaces away from exterior windows in a building are mainly lit by lighting systems of the building. Further, the temperature within a building may be influenced by exterior sunlight and/or the exterior temperature. For example, on a cold day and with the building being heated by a heating system, rooms closer to doors and/or exterior windows will lose heat faster than the interior regions of the building and be cooler compared to the interior regions. For exterior condition monitoring, the building may include exterior sensors (e.g. light sensors measuring irradiance) on the roof of the building. Alternatively, the building may include an exterior sensor associated with each exterior window or an exterior sensor on each facet (e.g. side) or at each zone of the building. An exterior light sensor on each side of the building could track the irradiance on a side of the building as the sun changes position throughout the day.

Output from one or more exterior sensors may be used as input to a communication network (e.g., window communication network 120 or site communication network 201) and provided as feedback to a local window controller or to a master controller. In some cases, the output signals received by sensor(s) include a signal indicating energy or power consumption by a heating system, a cooling system, and/or lighting within the building. For example, the energy or power consumption of the heating system, the cooling system, and/or the lighting of the building may be monitored to provide the signal indicating energy or power consumption. Devices may be interfaced with or attached to the circuits and/or wiring of the building to enable this monitoring. Alternatively, the power systems in the building may be installed such that the power consumed by the heating system, a cooling system, and/or lighting for an individual room within the building or a group of rooms within the building can be monitored.

Tinting instructions can be provided to change the tint state of the optically switchable window to a determined level of tint. For example, referring to FIG. 1A, tinting instructions may include master controller 122 issuing commands to one or more network controllers 124a and 124b, which in turn issue commands to end/leaf controllers 126 that control power to the optically switchable windows of the building 102 from a power supply. Master controller 122 may issue commands to change to a level of tint determined based on information received from one or more of the BMS 101, the UPS 121, interior sensors, exterior sensors, and/or other systems in the building 102. End controllers 126 may apply voltage and/or current to the window to drive the change in tint state pursuant to the instructions.

In some cases, a site or one or more of its systems may participate in a power interruption/reduction notification program run by a utility or utilities providing power to the site. The program may send an advance notification signal prior to an anticipated power reduction (e.g. a scheduled brownout), for example. The advance notification signal may be sent on the day before, the morning of, one hour, one minute, or other amount of time before the expected power reduction. In certain cases, the advance notification signal may include information about power reduction such as, for example, the duration, start time, end time, amount of the reduction (e.g. percentage) and the like. The advance notification signal may be received by the BMS of the site, by the master controller, by the main power system, by the UPS, or other systems at the site. In certain embodiments, the master controller enters IPO mode upon receiving the advance notification signal from the utility/utilities before the actual power reduction at the site. In these cases, the site sends tinting instructions to the appropriate optically switchable devices (e.g. electrochromic devices) of the windows and/or control instructions to other systems that reduce the initial and ongoing power draw from the UPS to the systems to extend the life of the UPS while maximizing comfort and safety to the occupants.

Demand Response

In certain embodiments, a site may be enrolled in or participate in a demand response program run by the utility or utilities providing power to the site. The demand response program can require energy savings measures being taken at the site during a peak load event. To participate in the demand response program, energy consumption at the site is reduced when a peak load occurrence occurs or is expected to occur. Generally, the utility/utilities send a notification signal of the demand response. In some cases, the utility/utilities may send out an advance notification signal of the demand response prior to an expected peak load occurrence. For example, a peak load occurrence may be expected to occur on a hot summer day when cooling systems/air conditioners are drawing a large amount of power from the utility power resources. The notification (warning) signal may be received by a BMS, by the master controller, or by the power system of the site configured to control the optically switchable windows at the site. In some cases, this notification signal of demand response can be used as an override mechanism that disengages the current tinting instructions and the window controller determines tinting instructions appropriate for the demand response event. In some cases, this notification signal initiates reduced power operations specific to the energy saving measures in the demand response program. In one case, the reduced power operations of the power conservation mode may be used.

In some embodiments, upon receiving a notification signal of the demand response from the utility/utilities, the BMS or other site monitoring system sends instructions to the window controller to determine tinting instructions appropriate for the demand response event. In one example during a hot and sunny day, the end/leaf window controller(s) may initiate tinting instructions that transition the appropriate optically switchable device(s) (e.g. electrochromic devices) in the tintable windows to a darker tint level to aid in reducing the power draw of the cooling systems in the building during the time when the peak load is expected.

Power Conservation Mode

Generally, a system device is either active, off, shutting down, or idle. When a system is idling, it needs to be reactivated to be operable. An idling device may be reactivated by a signal from an end-user, a site manager, or by another system that requests reactivation. Reactivation can cause a time delay. For example, reactivating a window controller may involve a time delay before being able to resume operations such as determining or implementing tinting instructions. The time delay will depend on the device being reactivated.

In one embodiment, reduced power operations idles one or more devices/systems at a site in power conservation mode. While a window controller is idling, it does not clear all the windows, which can avoid any annoyance to the occupants from undue clearing of windows. In some cases, the power conservation mode lasts for a particular period of time (e.g., 5 minutes, 10 minutes etc.) and will automatically resume standard operations after the period of time. In one case, the power conservation mode lasts the entire duration of a reduced power event such as an anticipated power outage of known duration. While idling, the device can be reactivated by a reactivation signal from one or more of a controller, a user, a site manager, and other entity with reactivation permission.

During reduced power operations which implement a power conservation mode, the system may have a selective override of certain zones or certain windows. For example, there may be a particular zone with a selective override to not enter power conservation mode due to security or safety reasons. For example, a nursery or nursing room in a hospital may not enter power conservation mode. Selective override values may be stored in a lookup table. Selective overrides stored in the lookup table may be used in other reduced power operations.

Controlled Shutdown Mode

In some embodiments, just before the available power supplies run out, the window controllers and/or other systems at a site shut down and/or are placed in idle according to a predefined shutdown priority list. In one example, the window controllers may be shut down first, then the computers, then the control panels, etc. In another example, the computers may be shut down first. In another example, the computers are shutdown first, the windows are idled, and then the control panels are idled. Controlled shut down allows systems to close down properly, save files, etc. before a forced shutdown may be necessary when the power runs out. The predefined shutdown priority list may be stored in a lookup file.

Emergency Response Capability (ERC)

In certain embodiments of reduced power operations, a window controller make tinting decisions to preemptively react to a potential server power perturbations like datacenter power outages and building HVAC failures. In these cases, the window controller may operate in an ERC mode. Tinting decisions made in ERC mode supersede override commands from, for example, a user interface, a local switch, a BMS client, etc. The window controller remains in ERC mode until deactivated. In ERC mode, the window controller can set tint levels on all or selected zones of optically switchable windows, send notifications to a user interface and/or BMS clients, selectively stop or alter the behavior of platform components, and/or shutdown the master controller.

In certain embodiments, the master controller may enter into an ERC mode in response to a notification of a prolonged power outage. In one case, the master controller may issue a clear command to every impacted zone. In other cases, the master controller issues a tint command to impacted zones where HVAC has been disabled in order to help control internal temperatures of a site. There would be a selective override of the clear command to certain areas such as, for example, stairwells for safety reasons.

Zones

In certain embodiments, the optically switchable windows (e.g., EC windows) of a site may be grouped into zones with optically switchable windows in a zone being instructed to tint in a similar manner. For example, the exterior windows of the site (i.e., windows separating the interior from the exterior of a building) may be grouped into zones where all the optically switchable windows in a particular zone are instructed to tint in a similar manner. In one case, groups of optically switchable windows on different floors of the building or different sides or other facets of a building may be in different zones.

Various factors can be used to assign optically switchable windows to particular zones such as, for example, the direction of the optically switchable windows (e.g. east facing, west facing, etc.), the floor or other location of the optically switchable windows, the type of optically switchable windows, the occupancy in the room with the optically switchable windows, and other factors. The assignment of optically switchable windows may be stored in and retrieved from a lookup table. In one embodiment, on one or more floors of a building, all of the east facing optically switchable windows are assigned to a first zone (e.g., "zone 1"), all of the south facing optically switchable windows are assigned to a second zone (e.g., "zone 2"), all of the west facing optically switchable windows are assigned to a third zone (e.g., "zone 3"), and all of the north facing optically switchable windows are assigned to a fourth zone (e.g., "zone 4"). In another embodiment, all of the optically switchable windows on the first floor of the building are assigned to a first zone (e.g., "zone 1"), all of the optically switchable windows on the second floor are assigned to a second zone (e.g., "zone 2"), and all of the optically switchable windows on the third floor are assigned to a third zone (e.g., "zone 3"). In yet another embodiment, all of the east facing optically switchable windows are in a first zone (e.g., "zone 1"), all of the south facing optically switchable windows are in a second zone (e.g., "zone 2"), all of the west facing optically switchable windows in a third zone (e.g., "zone 3"), and all of the north facing optically switchable windows are in a fourth zone (e.g., "zone 4"). In yet another embodiment, east facing optically switchable windows on one floor could be further divided into different zones based on other factors such as, for example, occupancy. Any number of optically switchable windows on the same side and/or different sides and/or different floors of the building may be assigned to a zone. In some cases, each network of optically switchable windows includes one or more zones. In some cases, each network of optically switchable windows includes one zone.

In some cases, optically switchable windows in a zone may be controlled by the same window controller (e.g., network controllers, 124a or 124b). In other cases, optically switchable windows in a zone may be controlled by different window controllers, but the window controllers may all receive the same output signals from sensors and use the same function or lookup table to determine the level of tint for the windows in a zone.

In certain aspects, optically switchable windows in a zone may be controlled by a window controller or controllers based on information from an output signal received from a transmissivity sensor. In some cases, this transmissivity sensor may be mounted proximate the windows in a zone. For example, the transmissivity sensor may be mounted in or on a frame containing an IGU or in or on the building recess frame (e.g., mullion, the horizontal sash or transom, the vertical sash) of one of the windows in the zone. In other cases, the transmissivity sensor may be located on the roof of the building. In other aspects, the optically switchable windows in a zone may be controlled by a window controller or controllers based on information from multiple output signals received from multiple sensors.

In some embodiments, a site may have a master control zone and one or more slave control zones of optically switchable windows. In these embodiments, a window controller may determine tinting decisions based on information provided in an output signal from one or more sensors (e.g. photo sensors) that measure transmissivity or other environmental conditions at a first zone which is a master control zone. In one case, window controller may also control the optically switchable windows in a second zone, which is a slave control zone, in the same manner as the first zone. In another case, another window controller may control the optically switchable windows in the second zone (i.e. slave control zone) in the same manner as the first zone (i.e. master control zone).

In embodiments with a site having a first zone which is a master control zone and a second zone which is a slave control zone, an occupant of a room associated with the second zone or other person may override the current tinting to instruct (e.g., using a tint or clear command or a command from a user console) the optically switchable windows of the second zone to transition to a particular tint level such as, for example, a colored tint state (level) or a clear tint state. In some cases, when the tint level of the windows in the second zone is overridden with such an override command, the optically switchable windows in the first zone (i.e., the master control zone) remain under control of the window controller operations that determine tinting instructions based on output received from the transmissivity sensor. The second zone may remain in an override command mode for a period of time (e.g. 20 minutes, 30 minutes, 1 hour, etc.) and then revert back to be under control of the window controller operations based on receiving output from the transmissivity sensor. For example, the second zone may stay in an override command mode for one hour after receiving an override command, and then may revert back to be under control of the window controller receiving output from the transmissivity sensor.

In some embodiments, a site manager, an occupant of a room in the first zone which is a master control zone, or other person may send override instructions (e.g., using a tint command or a command from a user console either manual or remote control) the windows in the first zone to transition to a tint level such as a colored tint state or a clear tint state. The first zone may remain in an override command mode (e.g., manual command mode) for a period of time and then revert back to be under control of window controller operations making tinting decisions based on output from the transmissivity sensor. For example, the first zone may stay in an override command mode for one hour after receiving an override command, and then may revert back to be under control of the window controller operations based on receiving output from the transmissivity sensor. In some cases, when the tint level of the windows in the first zone is overridden with such an override command mode, the optically switchable windows in a second zone, which is a slave control zone, remain under the control of the window controller operations making tinting decisions based on output received from the exterior sensor. In other cases, the optically switchable windows in the second zone may remain at the tint level they were in when the override command mode for the first zone was received. In other cases, the optically switchable windows in the second zone be controlled based on the override command mode for the first zone. The first and second zones may remain in an override command mode for a period of time and then both the first and second zones may revert back to be under control of the window controller operations based on output received from the transmissivity sensor.

Any of the window control methods described herein, regardless of whether the window controller is a standalone window controller or is interfaced with a network, may be used to control the tint of an optically switchable window.

Wireless and/or Wired Communications

Certain window controllers described herein may use wired communications and/or wireless communications (i.e. be wireless enabled). These window controllers comprise one or more components for wired and/or wireless communication between other components such as, for example, other window controllers, sensors, and/or separate communication nodes. Wireless and wired communications may be accomplished with a communication interface that interfaces directly with the window controllers. Such a communication interface could be native to its microprocessor or provided via additional circuitry enabling these functions. In addition, other system elements of a communication network may include other components for enabling wired or wireless communication between different system elements. Wired and wireless communications may include one or more of communication of tinting instructions, communication of power, communication of information stored in memory such as a lookup table, and other communications associated with controlling optically switchable windows. Some details of window controllers that use wireless communications are provided in U.S. patent application Ser. No. 12/971,576, filed Dec. 17, 2010, and titled "WIRELESS POWERED ELECTROCHROMIC DEVICES," which is hereby incorporated by reference in its entirety.

A separate communication node for wireless communication can be, for example, another wireless enabled window controller (e.g., end/leaf controller, network controller, master controller, etc.), a remote control device, a UPS, or a BMS. Wireless communication may be used, for example, for at least one of the following operations: programming and/or operating an optically switchable window, collecting data from the optically switchable window from the various sensors and protocols described herein, and using the optically switchable window as a relay point for wireless communication. Data collected from optically switchable windows also may include count data such as number of times an EC device has been activated, efficiency of the EC device over time, and the like. These wireless communication features is described in more detail below.

In embodiments with wireless enabled window controllers, wireless communication may be used to operate associated optically switchable windows, for example, via an infrared (IR), and/or radio frequency (RF) signals. In some cases, the window controller comprises a wireless protocol chip, such as Bluetooth, EnOcean, WiFi, Zigbee, and the like. Window controllers may also be provided with wireless communication via a wireless communication network. In certain cases, override input to the wireless enabled window controllers can be input by an end user at a wall switch or other user console, either through wires or via wireless communication, input can be from a BMS of a site of which the optically switchable window is a component or from another site monitoring system managing system, either through wires or via wireless communication.

In one embodiment, a wireless enabled window controller is part of a distributed network of wireless enabled window controllers. In this case, wireless communications may be used to transfer data to and from each of a plurality of optically switchable windows via the distributed network of wireless enabled window controllers, each having wireless communication components. For example, referring again to FIG. 1A, master controller 122, may be enabled to communicate wirelessly with each of network controllers 124a and 124b, which are in turn enabled to communicate wirelessly with end controllers 126, each associated with an optically switchable window. In some cases, one or more of the end/leaf window controllers 126 communicate power wirelessly to the optically switchable device or devices of the associated window. Master controller 122 may also communicate wirelessly with a BMS or with a site monitoring system. In certain cases, at least one level of communication in a distributed network of window controllers is performed wirelessly.

In some cases, a local wall switch may be in communication with the leaf/end window controller to send override commands. In some cases, these wall switches may be manually operated. In other cases these wall switches may be wirelessly controlled by the end-user using a remote device such as, for example, a cell phone, tablet, etc. The wireless communications can be sent through infrared (IR), and/or radio frequency (RF) signals. In some cases, wall switches may include a wireless protocol chip, such as Bluetooth, EnOcean, WiFi, Zigbee, and the like.

In some embodiments, more than one mode of wireless communication protocol is used in a distributed network of window controllers. For example, a master controller may communicate wirelessly to intermediate controllers using a first wireless communication protocol (e.g., WiFi or Zigbee) while the network controllers communicate with end/leaf window controllers using a second wireless communication protocol that is different from the first protocol (e.g., Bluetooth, Zigbee, or EnOcean, or another different protocol). In another example, wireless enabled window controllers may have multiple redundant wireless communication modes for flexibility in end user choices for wireless communication.

Systems for Controlling Functions of Optically Switchable Windows

Figure 1C:
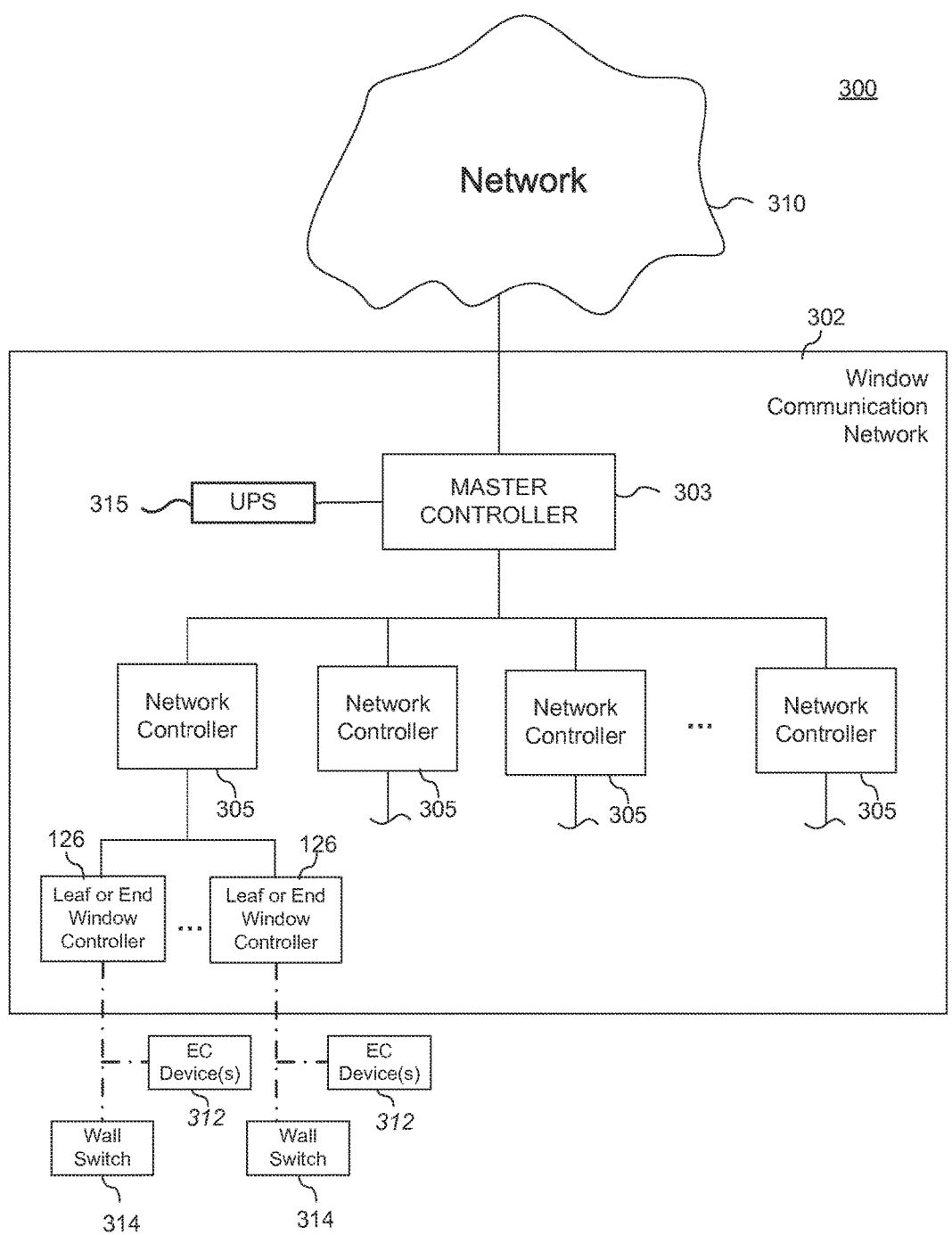
Figure 1D:
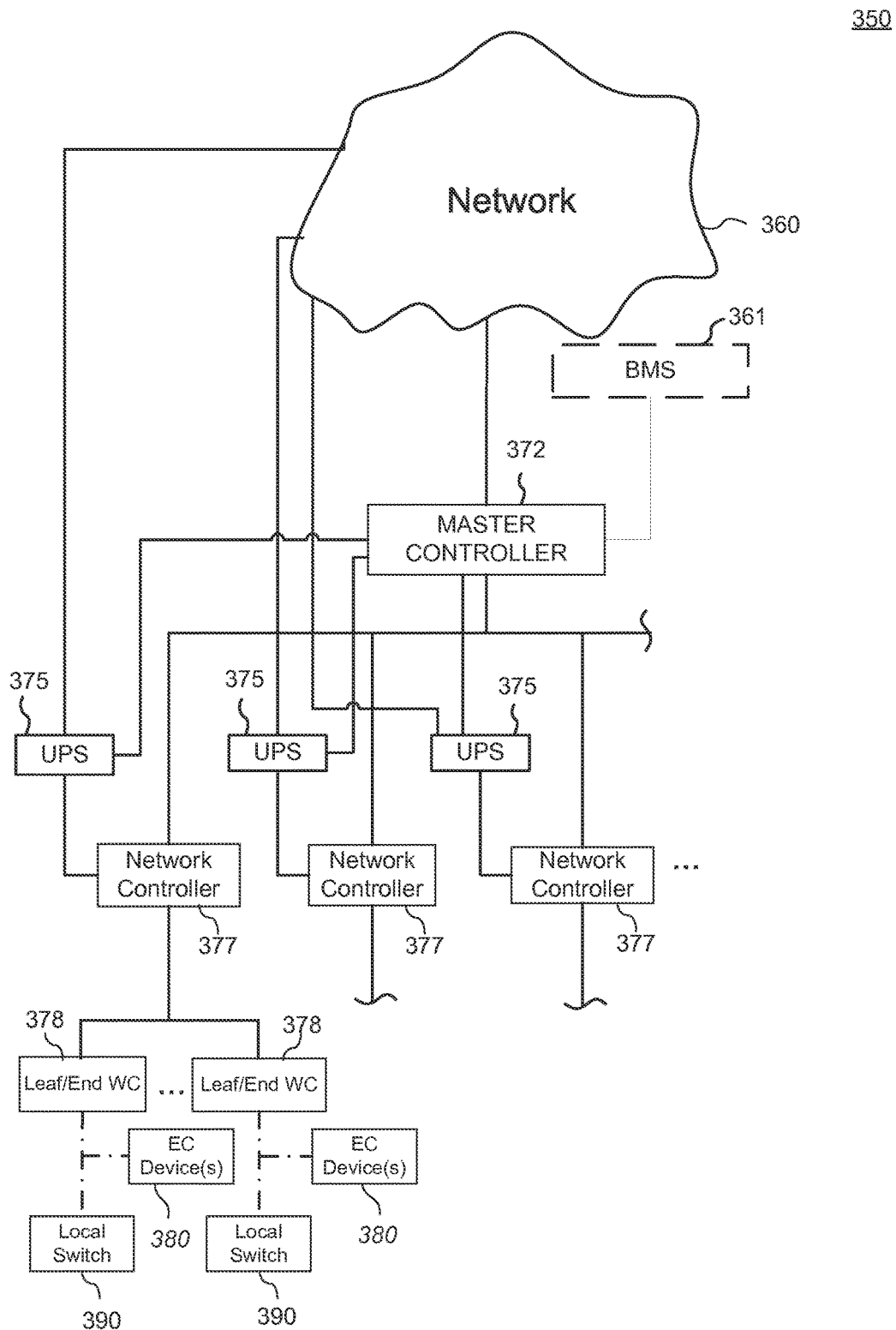

FIG. 1A and FIG. 1B depict examples of systems for controlling functions of one or more networks of optically switchable windows. The components of these systems are described in detail in the BMS section above. FIG. 1C and FIG. 1D depict additional examples of systems for controlling functions of one or more networks of optically switchable windows. Although FIG. 1C and FIG. 1D are described with reference to EC devices, other types of optically switchable devices can be used.

FIG. 1C is a block diagram of components of a system 300 for controlling functions of one or more networks of optically switchable windows at a site (e.g., the building 102 shown in FIG. 1A). System 300 comprises a window communication network 302 including a distributed network of window controllers that controls tinting of the one or more EC devices 312 of each of the optically switchable windows.

In FIG. 1C, the window communication network 302 comprises a master controller 303 in communication with and controlling network controllers 305. Each network controller 305 is connected to and controlling a network of leaf/end window controllers 126. Each leaf/end window controller 126 is in electrical connection (depicted by dot-dash line) with one or more EC devices 312 of an optically switchable window to control voltage/current applied to the EC devices 312 from a power supply to control the tent state of the window. Wall switches 314 are electrically connected (depicted by dot-dash line) to the one or more EC devices 312 to allow for local override control (e.g., by a room occupant) of the functions of the optically switchable windows. The window communication network 302 further comprises a UPS 315 dedicated to the window network and in electrical communication with the master controller 303.

System 300 further comprises a network 310 in electronic communication with master controller 303. Control logic and instructions for controlling functions of the optically switchable window(s), sensor data, and/or other data may be communicated to the master controller 303 through the network 310. Network 310 can be a wired or a wireless communication network (e.g. a cloud network). In some embodiments, network 310 may be in communication with a UPS and/or other systems in the building to receive feedback. The network 310 may also be in communication with other systems such as, for example, a utility company.

System 300 further comprises EC devices 312 of the optically switchable windows (not shown) and wall switches 314, which are both electrically connected to the leaf/end window controllers 126. Although not shown, the leaf/end window controllers 126 are electrically connected to a power source (e.g., UPS 121 or main power source) to receive a supply of power that can be used to apply voltage/current to the EC devices 312. In this illustrated example, master controller 303 can send control signals to the network controllers 305 and/or leaf/end window controllers 126 to apply voltage/current to the EC device(s) 312 to control the tint level of the optically switchable windows having the EC device(s) 312. Each wall switch 314 is also in communication with EC device(s) 312. An end user (e.g., occupant of a room having the optically switchable window) can use the wall switch 314 to control the tint level and other functions of the optically switchable window having the EC device(s) 312 by controlling the applied voltage/current to the associated window.

In FIG. 1C, the window communication network 302 is depicted as a distributed network of window controllers including a master controller 303, a plurality of network controllers 305 in communication with the master controller 303, and multiple pluralities of end/leaf window controllers 126. Each plurality of end/leaf window controllers 126 is in communication with a network controller 305. Although window communication network 302 is illustrated as a distributed network of window controllers, window communication network 302 could also be a single window controller controlling the functions of one or more optically switchable windows in other embodiments. The components of the system 300 in FIG. 1C may be similar in some respects to components described with respect to FIG. 1A and FIG. 1C. For example, master controller 303 may be similar to master controller 122 and network controllers 305 may be similar to network controllers 124*a* and 124*b*. Each of the window controllers described herein comprises a processor (e.g., microprocessor) and a computer readable medium in electrical communication with the processor.

In FIG. 1C, each leaf or end window controller 126 is electrically connected to one or more EC devices 312 of a single window to control the applied current/voltage and associated tint level of that window in the building. In other embodiments, each leaf/end window controller 126 may be in electrical connection with the EC devices 312 of a plurality of optically switchable windows. The leaf/end window controller 126 may be integrated into the optically switchable window or may be separate from the optically switchable window that it controls. Leaf/end window controllers 126 in FIG. 1C may be similar to the end/leaf window controllers 126 in FIG. 1A and/or may also be similar to window controller 550 described with respect to FIG. 5.

In some embodiments, an EC window may have multiple controllable EC devices such as, for example, in an IGU with multiple EC lites, a window with multiple controllable EC zones on one or more EC lites, a monolithic laminate of multiple substrates having EC devices, or other window with multiple EC devices. In the case of an IGU with multiple EC lites, leaf/end window controller may be in communication with the EC devices of the multiple EC lites of the IGU in order to control the tint level of the IGU. In the case of a window with multiple EC devices in different controllable zones of each of one or more lites, a leaf/end window controller may be in communication with the EC devices of the multiple zones of the one or more lites in order to control the tint level of the window.

Each wall switch 314 can be operated by an end user (e.g., occupant of the room) to enter override commands to control the voltage/current applied to the optically switchable window in electrical connection (depicted by dash-dot line) with the wall switch 314. For example, the end user can operate the wall switch 314 to turn off/on the applied voltage/current to the EC devices 312 in the optically switchable window. In this example, the wall switch 314 may override control signals sent from the master controller 303 to the leaf/end window controller 126 in some cases. In other cases, control signals from the master controller 303 may override commands from the wall switch 314. Each wall switch 314 is also in communication with the leaf or end window controller 126 to be able to send information about its override commands such as time, date, and tint level requested to another window controller in the distributed network. In some cases, the wall switches 314 may be wirelessly controlled by the end user using a remote device (e.g., cell phone, tablet, etc.) sending wireless communications with the control signals, for example, using infrared (IR), and/or radio frequency (RF) signals. In one such case, one or more of the wall switches 314 may include a wireless protocol chip, such as Bluetooth, EnOcean, WiFi, Zigbee, and the like. Wall switches 314 may be located on the wall(s), elsewhere in the room, or on a remote device. For example, a wall switch 314 may be part (e.g., icon) of a remote device that communicates wirelessly with the end/leaf window controller 126.

FIG. 1D is a block diagram of components of a system 350 for controlling functions of one or more networks of optically switchable windows at a site (e.g., the building 102 shown in FIG. 1A). The system 350 is an example of a system there would be used at a large site where multiple UPSs 375 are needed to provide power in the event of a reduced power scenario. In system 350, each network controller 377 has a dedicated UPS 375 providing power to the network of optically switchable windows being controlled by the corresponding network controller 377. In the event of reduced power in a particular network of optically switchable windows, the network controller 377 may perform reduced power operations for that network to make tinting decisions and other networks with full power can continue under standard operations.

System 350 comprises a distributed network of window controllers that controls tinting for one or more networks of optically switchable windows. The distributed network of window controllers comprises a master controller 372, the plurality of network controllers 377, and a network of leaf/end window controllers 378. The master controller 372 is in communication with and controlling the plurality of network controllers 377. Each network controller 377 is connected to and controlling a network of leaf/end window controllers 378.

System 350 further comprises an optional (denoted by dashed line) BMS 361 in communication with the master controller 372. System 350 further comprises EC devices 380 of the optically switchable windows (not shown) and local switches 390, which are both electrically connected to the leaf/end window controllers 378. Although not shown, the leaf/end window controllers 378 are electrically connected to a power source to receive a supply of power that can be used to apply voltage/current to the EC devices 380. The leaf/end window controller 378 may be integrated into the optically switchable window or may be separate from the optically switchable window that it controls.

Each leaf/end window controller 378 is in electrical connection (depicted by dot-dash line) with one or more EC devices 380 of an optically switchable window to control voltage/current applied to the EC devices 380 from a power supply to control the tint state of the window. Each local switch 390 is electrically connected (depicted by dot-dash line) to the one or more EC devices 380 to allow for local override control (e.g., by a room occupant) of the functions of the optically switchable window with the EC devices 380.

System 350 further comprises a network 360 in electronic communication with master controller 372. Control logic for a method of controlling functions of the optically switchable window(s), sensor data, and/or other data may be communicated to the master controller 372 through the network 360. Network 360 can be a wired or a wireless communication network (e.g. a cloud network). In some embodiments, network 360 may be in communication with systems outside the building such as, for example, a utility company to receive feedback.

In some cases, the master controller 372 can use control logic for reduced power operations to determine tinting decisions for the one or more networks of optically switchable windows at the site. The master controller 372 can then transmit control signals to the network controllers 377 and/or leaf/end window controllers 378 to apply voltage/current to the EC device(s) 380 to control the tinting of the optically switchable windows. In the event of reduced power in a particular network of optically switchable windows, the network controller 377 may use the control logic performing reduced power operations to determine tinting decisions for the network having limited power and other networks with full power can continue under standard operations. In this case, the network controller 377 can transmit control signals the leaf/end window controllers 378 to apply voltage/current to the EC device(s) 380 to control the tinting of the optically switchable windows.

In certain embodiments, the components of the system 350 in FIG. 1D may be similar in some respects to components described with respect to components of other systems such as those shown in FIG. 1A and FIG. 1B. For example, master controller 372 may be similar to master controller 122 and network controllers 377 may be similar to network controllers 124a and 124b. Leaf/end window controllers 378 in FIG. 1D may be similar to the end/leaf window controllers 126 in FIG. 1A and/or may also be similar to window controller 550 described with respect to FIG. 5.

As mentioned above, each local switch 390 can be operated by an end user (e.g., occupant of the room) to enter override commands to control tinting of the optically switchable window in electrical connection (depicted by dash-dot line) with the local switch 390. For example, the end user can operate the local switch 390 to turn off/on the applied voltage/current to the EC devices 380 in the optically switchable window. In this example, the local switch 390 may override other control signals sent from either window controllers. In other cases, control signals from either window controllers may override commands from the local switch 390. Each local switch 390 is also in communication with the leaf or end window controller 378 to be able to send information about its override commands such as time, date, tint level requested to the other window controllers. In some cases, the local switches 390 may be wirelessly controlled by the end user using a remote device (e.g., cell phone, tablet, etc.) sending wireless communications with the control signals, for example, using infrared (IR), and/or radio frequency (RF) signals. In some of these cases, local switches 390 may include a wireless protocol chip, such as Bluetooth, EnOcean, WiFi, Zigbee, and the like. In one case, a local switch 390 may be part (e.g., icon) of a display of a remote device that communicates wirelessly with the end/leaf window controller 378.

Wireless communication between, for example, master and/or intermediate window controllers and end/leaf window controllers offers the advantage of obviating the installation of hard communication lines. This is also true for wireless communication between window controllers and a BMS. In one aspect, wireless communication in these roles is useful for data transfer to and from optically switchable windows for operating the window and providing data to, for example, a BMS for optimizing the environment and energy savings in a building. Window location data as well as feedback from sensors are synergized for such optimization. For example, granular level (window-by-window) microclimate information may be fed to the master controller in order to optimize the building's various environments.

In certain embodiments, a system of controlling functions of one or more optically switchable windows comprises a window communication network in communication with the optically switchable windows and one or more UPSs for providing power in a reduced power scenario. The window communication network may comprise one or more window controllers. In some cases, the window communication network may be a distributed network of window controllers such as shown in FIG. 1A.

Switching Algorithms for EC Devices

Different switching algorithms may require different amounts of energy to transition the optical state of an EC device. The approach of some switching algorithms is to speed along optical transitions by initially providing an applied voltage at a magnitude greater than that required to hold the EC device at a particular optical state in equilibrium. This approach is illustrated in the profiles shown in FIG. 2 and FIG. 3.

Figure 2:
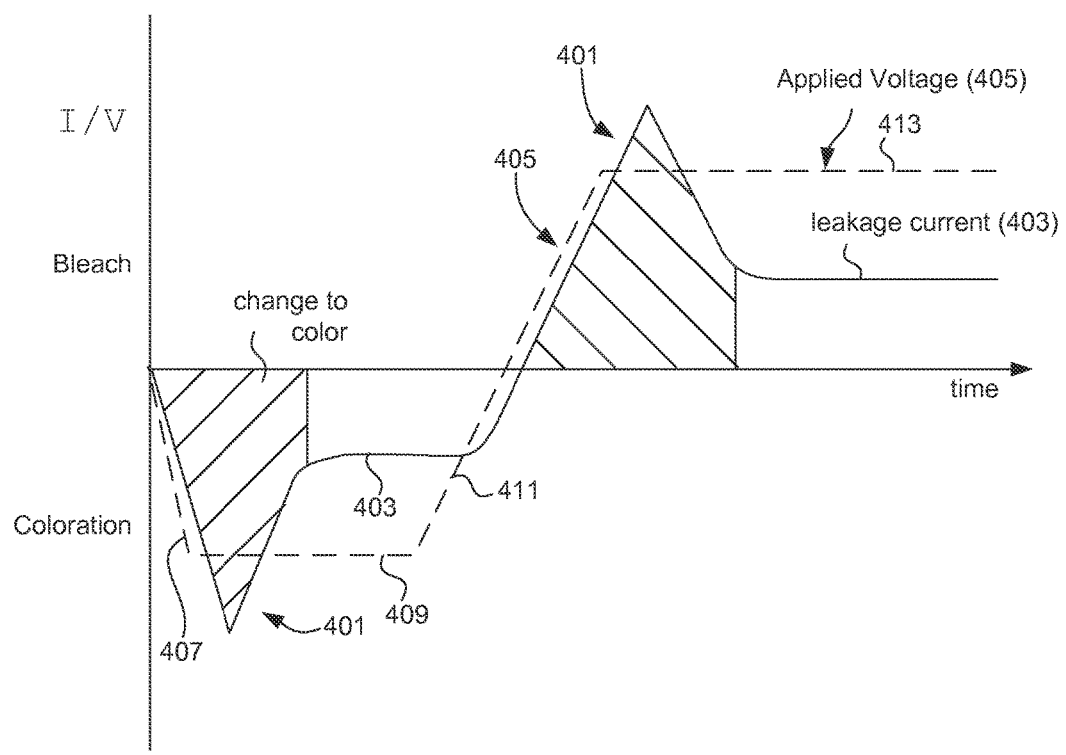
FIG. 2 and FIG. 3 are each graphs depicting voltage and current profiles associated with driving an electrochromic device from a bleached state to a colored state and from a colored state to a bleached state, according to an embodiment.
Figure 3:
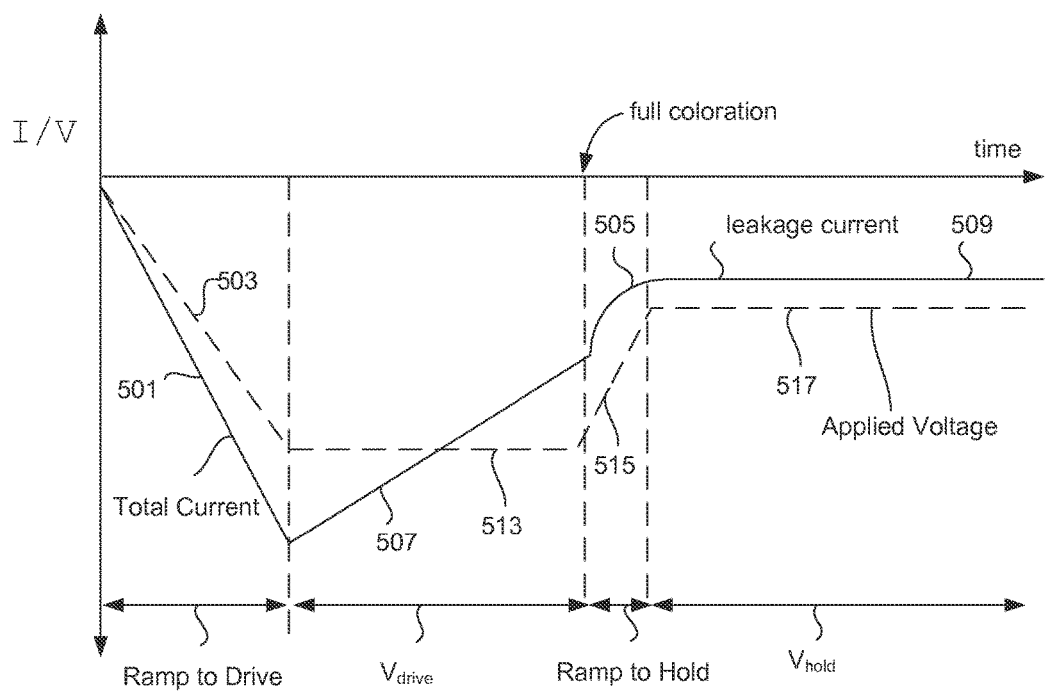

FIG. 2 is a graph depicting voltage and current profiles associated with driving an electrochromic device from a bleached state to a colored state and from a colored state to a bleached state, according to an embodiment. FIG. 3 is a graph depicting certain voltage and current profiles associated with driving an electrochromic device from a bleached state to a colored state, according to an embodiment.

FIG. 2 shows a complete current profile and voltage profile that employs a simple voltage control algorithm to cause an optical state transition (coloration followed by bleaching) of an EC device. In the graph, the total current density (I) is represented as a function of time. The total current density is a combination of the ionic current density associated with an electrochromic transition and an electronic leakage current between the electrochemically active electrodes of the EC device. Different types of EC devices will have the depicted current profile. In one example, a cathodic electrochromic material such as tungsten oxide is used in conjunction with an anodic electrochromic material such as nickel tungsten oxide in counter electrode. In such devices, negative currents indicate coloration of the device. In one example, lithium ions flow from a nickel tungsten oxide anodically coloring electrochromic electrode into a tungsten oxide cathodically coloring electrochromic electrode. Correspondingly, electrons flow into the tungsten oxide electrode to compensate for the positively charged incoming lithium ions. Therefore, the voltage and current are shown to have a negative value.

The depicted profiles in FIG. 2 results from ramping up the voltage to a set level and then holding the voltage to maintain the optical state. The current peaks 401 are associated with changes in optical state, i.e., coloration and bleaching. Specifically, the current peaks represent delivery of the ionic charge needed to color or bleach the device. Mathematically, the shaded area under the peak represents the total charge required to color or bleach the device. The portions of the curve after the initial current spikes (portions 403) represent electronic leakage current while the device is in the new optical state.

In FIG. 2, a voltage profile 405 (depicted by dashed line) is superimposed on the current curve. The voltage profile 405 follows the sequence: negative ramp (407), negative hold (409), positive ramp (411), and positive hold (413). Note that the voltage remains constant after reaching its maximum magnitude and during the length of time that the device remains in its defined optical state. Voltage ramp 407 drives the device to its new the colored state and voltage hold 409 maintains the device in the colored state until voltage ramp 411 in the opposite direction drives the transition from the colored state to the bleached state. In some switching algorithms, a current cap is imposed. That is, the current is not permitted to exceed a defined level in order to prevent damaging the device (e.g. driving ion movement through the material layers too quickly can physically damage the material layers). The coloration speed is a function of not only the applied voltage, but also the temperature and the voltage ramping rate.

FIG. 3 illustrates a current profile and a voltage profile in accordance with certain embodiments. In the depicted embodiment, the voltage control profile can be employed to drive the transition of an electrochromic device from a bleached state to a colored state (or to an intermediate state). To drive the electrochromic device in the reverse direction, from the colored state to the bleached state (or from a more colored to less colored state), a similar but inverted profile is used. In some embodiments, the voltage control profile for going from the colored to the bleached state is a mirror image of the one depicted in FIG. 3.

The voltage values depicted in FIG. 3 represent the applied voltage ($V_{app}$) values. The applied voltage profile is shown by the dashed line and the current density in the electrochromic device is shown by the solid line. In the depicted voltage profile, $V_{app}$ includes four components: a ramp to drive component 303, which initiates the transition, a $V_{drive}$ component 313, which continues to drive the transition, a ramp to hold component 315, and a $V_{hold}$ component 317. The ramp components are implemented as variations in $V_{app}$ and the $V_{drive}$ and $V_{hold}$ components provide constant or substantially constant $V_{app}$ magnitudes.

The ramp to drive component is characterized by a ramp rate (increasing magnitude) and a magnitude of $V_{drive}$. When the magnitude of the applied voltage reaches $V_{drive}$, the ramp to drive component is completed. The $V_{drive}$ component is characterized by the value of $V_{drive}$ as well as the duration of $V_{drive}$. The magnitude of $V_{drive}$ may be chosen to maintain $V_{eff}$ with a safe but effective range over the entire face of the EC device as described above.

The ramp to hold component is characterized by a voltage ramp rate (decreasing magnitude) and the value of $V_{hold}$ (or optionally the difference between $V_{drive}$ and $V_{hold}$). $V_{app}$ drops according to the ramp rate until the value of $V_{hold}$ is reached. The $V_{hold}$ component is characterized by the magnitude of $V_{hold}$ and the duration of $V_{hold}$. Actually, the duration of $V_{hold}$ is typically governed by the length of time that the device is held in the colored state (or conversely in the bleached state). Unlike the ramp to drive, $V_{drive}$, and ramp to hold components, the $V_{hold}$ component has an arbitrary length, which is independent of the physics of the optical transition of the device.

Each type of EC device will have its own characteristic components of the voltage profile for driving the optical transition. For example, a relatively large device and/or one with a more resistive conductive layer will require a higher value of $V_{drive}$ and possibly a higher ramp rate in the ramp to drive component. Larger devices may also require higher values of $V_{hold}$. U.S. patent application Ser. No. 13/449,251, filed Apr. 17, 2012, and hereby incorporated by reference, discloses controllers and associated algorithms for driving optical transitions over a wide range of conditions. As explained therein, each of the components of an applied voltage profile (ramp to drive, $V_{drive}$, ramp to hold, and $V_{hold}$, herein) may be independently controlled to address real-time conditions such as current temperature, current level of transmissivity, etc. In some embodiments, the values of each component of the applied voltage profile is set for a particular electrochromic device (having its own bus bar separation, resistivity, etc.) and does vary based on current conditions. In other words, in such embodiments, the voltage profile does not take into account feedback such as temperature, current density, and the like.

As indicated, all voltage values shown in the voltage transition profile of FIG. 3 correspond to the $V_{app}$ values described above. They do not correspond to the $V_{eff}$ values described above. In other words, the voltage values depicted in FIG. 3 are representative of the voltage difference between the bus bars of opposite polarity on the electrochromic device.

In certain embodiments, the ramp to drive component of the voltage profile is chosen to safely but rapidly induce ionic current to flow between the electrochromic and counter electrodes. As shown in FIG. 3, the current in the device follows the profile of the ramp to drive voltage component until the ramp to drive portion of the profile ends and the $V_{drive}$ portion begins. See current component 301 in FIG. 3. Safe levels of current and voltage can be determined empirically or based on other feedback. Some details of examples of algorithms for maintaining safe current levels during electrochromic device transitions can be found in U.S. Pat. No. 8,254,013 titled "Controlling Transitions in Optically Switchable Devices," issued on Aug. 28, 2012, which is hereby incorporated by reference in its entirety.

In certain embodiments, the value of $V_{drive}$ is chosen based on the considerations described above. Particularly, it is chosen so that the value of $V_{eff}$ over the entire surface of the EC device remains within a range that effectively and safely transitions the electrochromic devices. The duration of $V_{drive}$ can be chosen based on various considerations. One of these ensures that the drive potential is held for a period sufficient to cause the substantial coloration of the device. For this purpose, the duration of $V_{drive}$ may be determined empirically, by monitoring the optical density of the device as a function of the length of time that $V_{drive}$ remains in place. In some embodiments, the duration of the $V_{drive}$ is set to a predefined time period. In another embodiment, the duration of $V_{drive}$ is set to correspond to a desired amount of ionic charge being passed, which can be based on a measured value. As shown, the current ramps down during $V_{drive}$. See current segment 307.

Another consideration is the reduction in current density in the EC device as the ionic current decays as a consequence of the available lithium ions completing their journey from the anodic coloring electrode to the cathodic coloring electrode (or counter electrode) during the optical transition. When the transition is complete, the only current flowing across device is leakage current through the ion conducting layer. As a consequence, the ohmic drop in potential across the face of the EC device decreases and the local values of $V_{eff}$ increase. These increased values of $V_{eff}$ can damage or degrade the device if the applied voltage is not reduced. Thus, another consideration in determining the duration of $V_{drive}$ is the goal of reducing the level of $V_{eff}$ associated with leakage current. By dropping the applied voltage from $V_{drive}$ to $V_{hold}$, not only is $V_{eff}$ reduced on the face of the device but leakage current decreases as well. As shown in FIG. 3, the device current transitions in a segment 305 during the ramp to hold component. The current settles to a stable leakage current 309 during $V_{hold}$.

Window Controller Components

Figure 4:
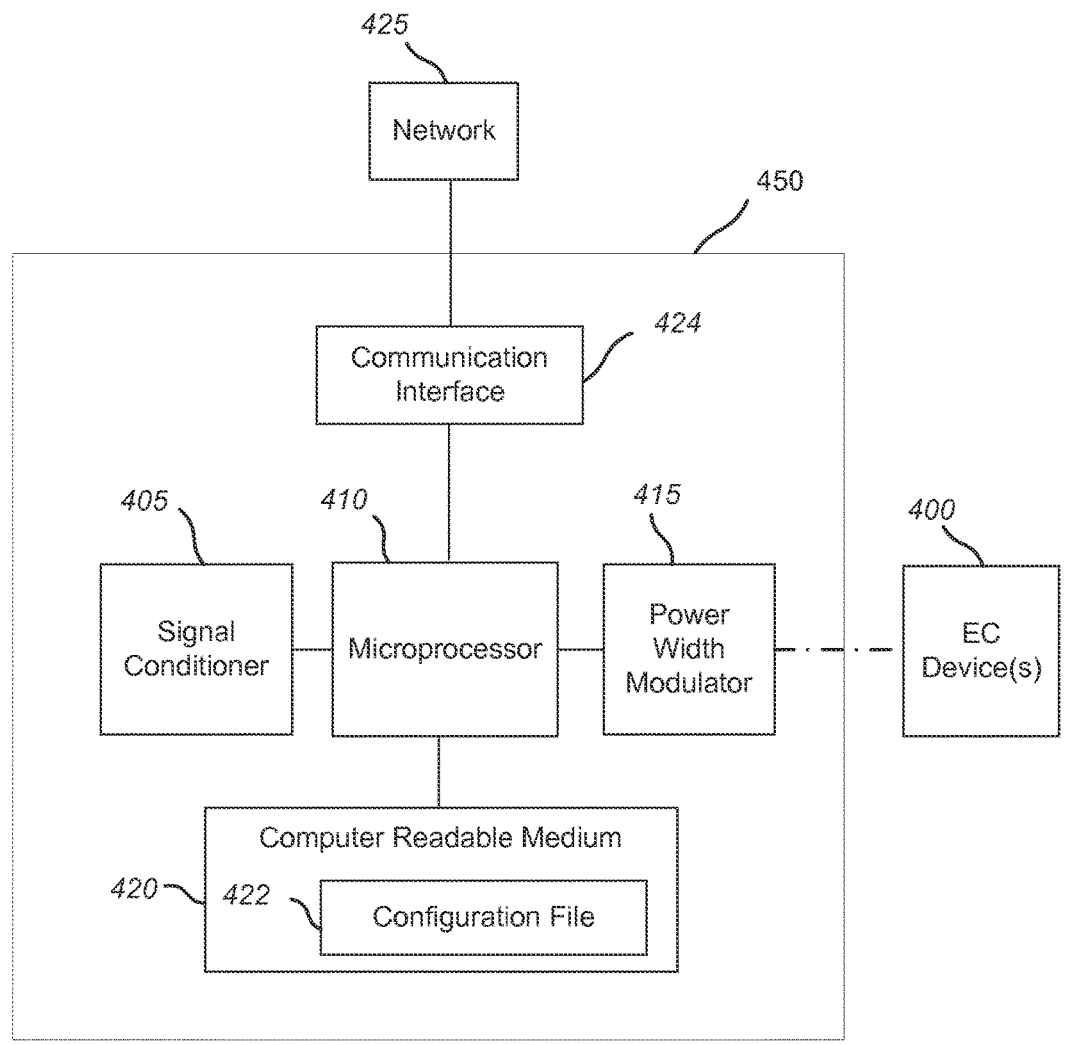
FIG. 4 depicts a simplified block diagram of components of a window controller according to embodiments.

FIG. 4 depicts a block diagram of some components of a window controller 450 and a network of a window controller system, according to certain embodiments. FIG. 4 provides a simplified block diagram of some components, and more detail regarding components of window controllers can be found in U.S. patent application Ser. Nos. 13/449,248 and 13/449,251, both naming Stephen Brown as inventor, both titled "CONTROLLER FOR OPTICALLY-SWITCHABLE WINDOWS," and both filed on Apr. 17, 2012, and in U.S. patent Ser. No. 13/449,235, titled "CONTROLLING TRANSITIONS IN OPTICALLY SWITCHABLE DEVICES," naming Stephen Brown et al. as inventors and filed on Apr. 17, 2012, all of which are hereby incorporated by reference in their entireties.

In FIG. 4, the window controller 450 comprises a microprocessor 410 and/or other processor, a power width modulator (PWM) 415, a signal conditioner 405, and a computer readable medium 420 (e.g., memory) having a configuration file 422, and a communication interface 424. The configuration file 422 may comprise a lookup table, for example. The microprocessor 410 is in communication with the power width modulator 415, the computer readable medium 420, the signal conditioner 405, and the communication interface 424. The window controller 450 is in communication with the network 425 (wired or wireless) to receive data such as, for example, control instructions. The window controller 450 is also electrically connected (depicted by dot-dash line) with one or more EC devices 312 in an AC window to control power to the EC devices 312 to apply current/voltage to control tint state of the EC window. In some embodiments, the window controller 450 may be a local leaf/end window controller in communication through a network (wired or wireless) to a master controller. In other embodiments, the window controller 450 may be a master controller in communication through a network (wired or wireless) to other control systems such as, for example, a BMS of a building.

Generally, each of the window controllers described herein comprises at least one processor (e.g., microprocessor 410) and at least one computer readable medium (e.g., computer readable medium 420) in electrical communication with the processor. In certain embodiments each window controller may further comprise one or more components of the window controller 450 described with respect to FIG. 4.

Sensor(s)

In certain embodiments, a site may be a building having at least one room having an optically switchable window (e.g. exterior window) between the exterior and interior of the building. One or more sensors may be located to the exterior of the building and/or inside the room to measure environmental conditions such as irradiance, temperature, humidity, etc. In embodiments, the output from the one or more sensors may be input to the signal conditioner (e.g., 405) of the window controller. In some cases, the output from the one or more sensors may be input to the BMS as well. Although sensors are described are shown in certain embodiments as located on the outside vertical wall of the building, this is for the sake of simplicity, and the sensors may be in other locations, such as inside the room, on other surfaces to the exterior such as the roof, as well. In some cases, two or more sensors may be used to measure the same input, which can provide redundancy in case one sensor fails or has an otherwise erroneous reading. In other cases, the readings from two or more sensors may be combined to measure a combined value.

Figure 5:
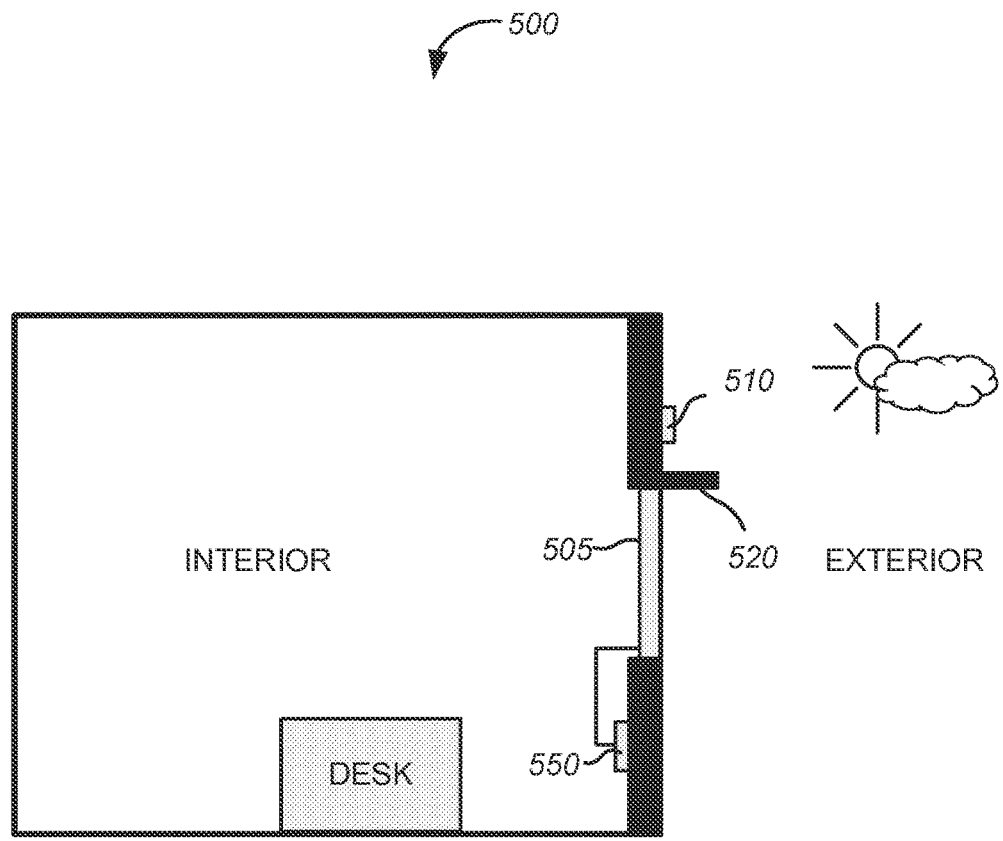
FIG. 5 depicts a schematic diagram of a room comprising an optically switchable window and at least one sensor, according to an embodiment.

FIG. 5 depicts a plan view of a drawing of a room 500 having an optically switchable window 505 with at least one electrochromic device, according to an embodiment. The optically switchable window 505 is located between the exterior and the interior of a building, which includes the room 500. The room 500 also includes a window controller 550 electrically connected to and configured to control power applied to and the tint level of the optically switchable window 505. An exterior sensor 510 is located on a vertical surface in the exterior of the building. Although not shown, one or more internal sensors may be located within the room 500 to measure the internal conditions (e.g., ambience light, internal temperature, occupancy, and/or other conditions) in the room 500. For example, an occupancy sensor (e.g., motion detector) may be used to determine when and where an occupant is located in the room 500. The window controller 550 may have components similar to those of window controller 450 described with respect to FIG. 4.

Exterior sensor 510 is a device, such as a photosensor, that is able to measure radiant light incident upon the device flowing from a light source such as the sun or from light reflected to the sensor from a surface, particles in the atmosphere, clouds, etc. For example, the exterior sensor 510 may generate a signal in the form of electrical current that results from the photoelectric effect and the signal may be a function of the light incident on the sensor 510. In some cases, the exterior sensor 510 may measure radiant light in terms of irradiance in units of watts/m$^2$ or other similar units. In other cases, the exterior sensor 510 may detect light in the visible range of wavelengths in units of foot candles or similar units. In many cases, there is a linear relationship between these measurements of irradiance and visible light.

Clear sky irradiance values from sunlight can be predicted (e.g., predicted using a solar calculator) for a particular time of day and time of year based on the angle at which sunlight strikes the earth changes. An exterior sensor (e.g., 510) can measure radiant light in real-time, which accounts for reflected and obstructed light due to buildings, current weather conditions (e.g., clouds), etc. For example, on cloudy days, sunlight would be blocked by the clouds and the radiant light detected by an exterior sensor would be lower than on cloudless days.

In some embodiments, a site may have one or more exterior sensors (e.g., 510) for taking readings associated with tinting instructions for a single optically switchable window. Output from the one or more exterior sensors could be compared to one another to determine, for example, if one of exterior sensors is shaded by an object, such as by a bird that landed on exterior sensor.

In some embodiments, a site may have one of its exterior sensors (e.g., 510) that take readings that are used to determine tinting decisions for multiple optically switchable windows such as windows in a zone. In some cases, it may be desirable to use relatively few sensors in a building because some sensors can be unreliable and/or expensive. In certain implementations, a single sensor or a few sensors may be employed to determine the current level of radiant light from the sun impinging on the building or perhaps one side of the building. A cloud may pass in front of the sun or a construction vehicle may park in front of the setting sun. These scenarios will result in the sensors measuring the current amount of radiant light from the sun that deviates from clear sky predictions calculated to impinge on the building.

In some cases, an interior or exterior sensor may be a type of photosensor. For example, a sensor may be a charge coupled device (CCD), photodiode, photoresistor, or photovoltaic cell. One of ordinary skill in the art would appreciate that future developments in photosensor and other sensor technology would also work, as they measure light intensity and provide an electrical output representative of the light level.

In some embodiments, the output measurements from the exterior sensor 510 may be communicated as input to a master controller and/or a BMS in communication with the window controller 550. The input may be in the form of a voltage signal. The BMS or master controller in communication with the window controller 550 may employ control logic to determine a desired tint level based on signals from the exterior sensor 510 and/or other input. The master controller and/or the BMS may process the input and pass an output signal with tinting instructions to the window controller 550 controlling the optically switchable window 505. Window controller 550 then instructs the PWM 415 (as shown in FIG. 4) to apply an appropriate voltage and/or current profile to the optically switchable window 505 to transition to the desired tint level.

In one embodiment, the window controller 450 instructs the PWM 415 to apply a voltage and/or current profile to the optically switchable window 505 (e.g., EC window) to transition it to any one of four or more different tint levels. In disclosed embodiments, the optically switchable window 505 can be transitioned to at least eight different tint levels described as: 0 (lightest), 5, 10, 15, 20, 25, 30, and 35 (darkest). The tint levels may linearly correspond to visual transmittance values and solar gain heat coefficient (SGHC) values of light transmitted through the optically switchable window 505. For example, using the above eight tint levels, the lightest tint level of 0 may correspond to an SGHC value of 0.80, the tint level of 5 may correspond to an SGHC value of 0.70, the tint level of 10 may correspond to an SGHC value of 0.60, the tint level of 15 may correspond to an SGHC value of 0.50, the tint level of 20 may correspond to an SGHC value of 0.40, the tint level of 25 may correspond to an SGHC value of 0.30, the tint level of 30 may correspond to an SGHC value of 0.20, and the tint level of 35 (darkest) may correspond to an SGHC value of 0.10.

II. Window Control Logic for Reduced Power Operations

When a window controller determines that an energy supply is limited, the window controller may begin reduced power operations that make tinting decisions to minimize energy usage while maximizing comfort and safety for its occupants. In some cases, the window controller may ride through during a time delay period to avoid initiating reduced power operations in response to a short glitch in power. The window controller implements various control logic that perform reduced power operations of methods of making these tinting decisions using feedback from one or more systems at the site. Energy supply may be limited, for example, during a full or partial power outage (e.g., an anticipated brownout) or during a demand response for energy savings measures during a peak load event.

Although the control logic is described herein as being used by a window controller to perform reduced power operations, other devices may use this control logic to make and implement tinting decisions for one or more networks of optically tintable windows. For example, a UPS may have this control logic or similar control logic. In this example, the UPS may determine that the main supply of energy is limited and may have its own control logic make and implement tinting decisions to control one or more networks of optically switchable windows. In this example, the UPS includes much of the functionality of a window controller.

Though a finite amount of UPS energy supply may be available during a power reduction, in certain instances, IPO operations may actually direct more power to certain windows and/or zones than it would otherwise. For example, when no power loss from the main supply is in effect, if heat load in a particular zone is managed by a combination of tinting the windows to 50% of their darkest state and AC, for example to allow more light for occupants; then during a power loss, because heat load is more important than light for the occupants and the AC uses too much power, the IPO operations may provide more power to the windows to tint to maximum level to increase the level of heat blocking of the windows during a period where AC is not an option to offset heat load. This increased power to certain windows/zones may be offset by reducing power to other components of the system where heat load is not as strong and/or the spaces are less critical and/or unoccupied.

In certain cases, a master controller makes the tinting decisions and transmits instructions to the end/leaf window controllers (e.g., but not necessarily, via network window controllers) in communication with the optically switchable windows to provide the applied voltage/current profiles according to these instructions. In one such case, the site may be equipped with a single UPS in communication with the master controller. In this case, the master controller performs reduced power operations for the entire site, makes tinting decisions for all the networks of optically switchable windows, and sends tinting instructions to the end/leaf window controllers to apply the appropriate voltage/current profiles to implement these tinting decisions. In other cases, the site may be equipped with multiple UPSs. In one such case, a UPS at the site is dedicated to a particular network controller providing instructions to a network of optically switchable windows. If there is a local power reduction at this network, the network controller will begin reduced power operations for the network and make tinting decisions for the windows in that network. The network controller will transmit the tinting instructions to the end/leaf window controllers in the network to apply the appropriate voltage/current profiles to implement the tinting decisions. In this case, other networks at the site that are not affected by a power reduction will continue in standard operating mode. In yet other cases, the sites may be equipped with multiple UPSs and the power reduction is localized to one or more optically switchable windows in one or more networks. This may occur, for example, when a single optically switchable window loses power from the main power source and other optically switchable windows in its network continue to have full power. In this example, the corresponding end/leaf window controller makes the tinting decisions for its optically switchable window with reduced power and applies the appropriate voltage/current profiles to implement the tinting decisions. The other optically switchable windows are not affected by the power reduction and continue under standard operations.

In some cases, the power loss may be localized to certain segments of one or more windows such as, for example, a network of windows, a zone of windows, or windows at a particular location. For example, the windows on a façade of the building may have lost power. In one case, the leaf/end controllers controlling those windows in the façade make tinting decisions and apply the appropriate voltage/current profiles to implement the tinting decisions. The other optically switchable windows at the other facades are not affected by the power reduction and continue under standard operations.

In certain power reduction embodiments, power to the information technology infrastructure (e.g. switches, routers, etc.) is maintained by UPS power (e.g., power supply from one or more UPSs) or other power source so that there is reliable communication maintained between window controllers in the distributed window controller network. In one embodiment, however, there may be a loss of power that prevents reliable communication between the master controller and the network controller. In this case, the network controller may make the tinting decisions by itself when it detects a loss of communication with its associated master controller.

For simplicity, the control logic described below with respect to the flowcharts is described with reference to a master controller making tinting decisions and transmitting the decisions to the end/leaf window controllers of the one or more networks of optically switchable windows. It would be understood that this control logic is not so limited and that it applies to an end/leaf window controller making the tinting decisions for a particular optically switchable window, or to a network window controller making tinting decisions for a network of optically switchable windows and transmitting the tinting decisions to the end/leaf window controllers associated with the network.

Figure 6A:
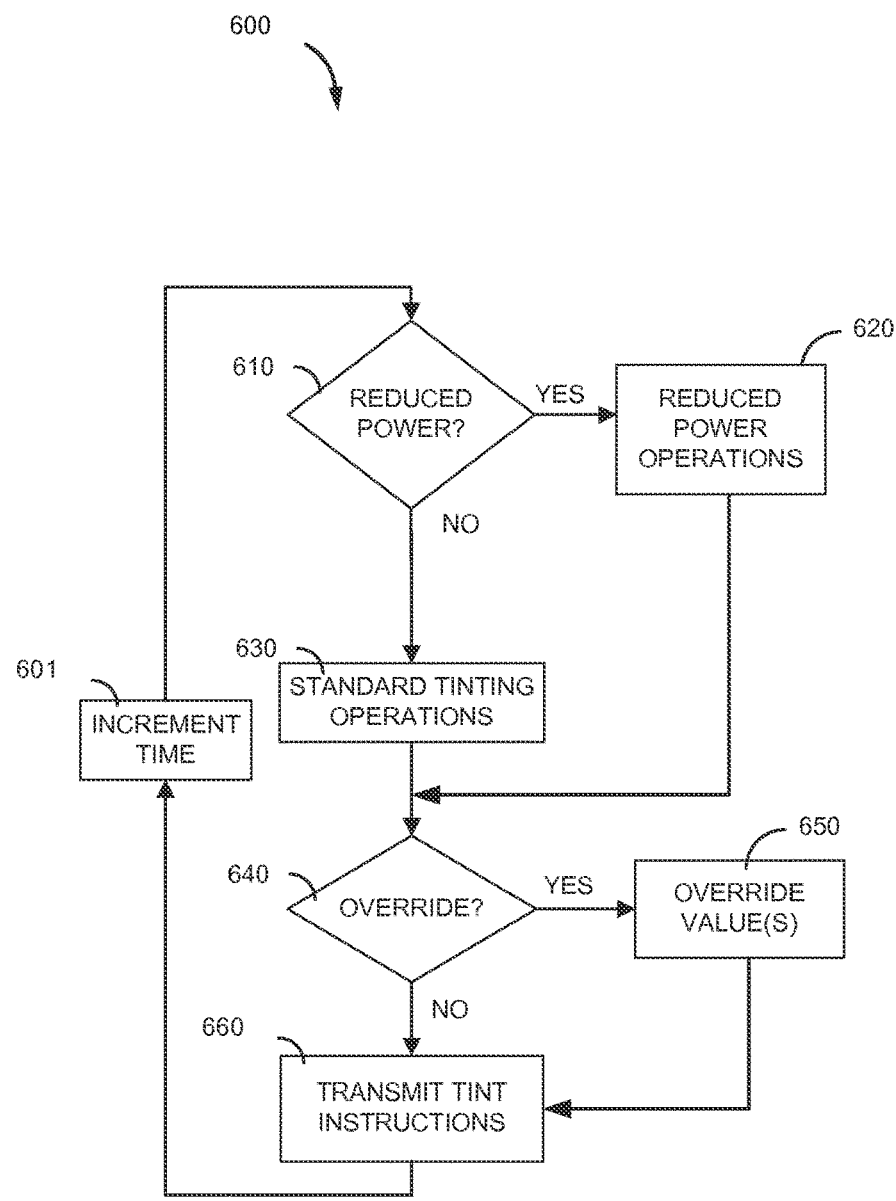
FIGS. 6A-6C are each flowcharts depicting control logic for a method of making and implementing tinting decisions for one or more networks of optically switchable windows at a site, according to embodiments.

FIG. 6A is a flowchart depicting control logic for a method of making and implementing tinting decisions for one or more networks of optically switchable windows at a site (e.g., the building shown in FIG. 1A), according to embodiments. The logic calculations are performed in a closed loop at time intervals incremented at step 601. In certain cases, the times intervals are constant unless there is a time delay imposed. For example, control logic calculations may be performed every 1, 2, 3, 4, 5, etc. minutes. In many cases, once the tinting decision is made, the tinting instructions are transmitted to the end/leaf window controller to control the applied voltage/current to transition, hold, float, etc. the optically switchable window(s) (step 660).

At step 610, the master controller determines whether there is a significant reduction in power from the main source of power to the site based on a notification signal from one or more UPSs, from another system at the site, from a utility, from a user, or from another source. For example, the master controller may receive a trigger signal automatically generated by a UPS when the UPS detects a (full or partial) power outage and starts providing power. As another example, the master controller may receive a notification signal from the energy utility or utilities with advance notification of an anticipated power interruption such as, for example, a scheduled brown out. In yet another example, the master controller may receive a notification signal from the energy utility or utilities with notification of a demand response to energy savings measures during a peak load event. In yet another example, the master controller may receive a notification signal from a user, a site manager, etc. In yet another example, the master controller may receive a notification signal from a weather feed service of an anticipated power reduction due to weather conditions. In yet another example, the master controller may receive a notification signal of a power conservation mode. This notification may be sent, for example, by a user or a site manager. In some cases, the notification signals may indicate whether the power reduction would be local to a network of optically switchable windows or one or more windows.

In certain aspects, a notification signal is received from one or more UPSs at the site, another system at the site, a utility company, a user, or other source. The window controller can determine whether there is a significant reduction in power based on this notification signal. In some cases, the notification signal may include an indication that it the power reduction will be significant. In other cases, the notification signal may include a value of the amount of power available. The window controller can then determine whether the reduction is significant based on the value. For example, the master controller may determine that the reduction is significant by determining the percentage reduction and then determining that the percentage reduction is greater than a predefined percentage such as, for example, more than 10%, more than 20%, more than 30%, or than 40%, etc. As another example, the master controller that the reduction is significant by determining that the amount of power available is less than the current amount of power being used at the site.

Returning to FIG. 6A, if the master controller does not determine a significant reduction of power during the current time interval at step 610, the master controller continues standard tinting operations to determine tinting instructions at step 630. In this case, the master controller remains in standard operating mode, and determines tint levels based on standard tinting logic used under standard operating conditions. An example of control logic that can be used under standard operating conditions is described in U.S. patent application Ser. No. 13/772,969 filed on Feb. 21, 2013 and titled "Control Method for Tintable Windows," which is hereby incorporated by reference in its entirety. The standard tinting logic performs calculations to determine a tint level for each optically switchable at a single instant in time $t_i$. In certain cases, the standard tinting logic predictively calculates how the window should transition in advance of the actual transition. In these cases, the calculations may be based on a future time around or after a transition to a new tint state is complete.

If, however, the master controller determines that there is a significant power reduction at step 610, the master controller commences reduced power operations at step 620. In some cases, the master controller may also receive information about the power reduction from, for example, one or more UPSs, another system at the site, the utility(ies), an operator, a site manager, a weather service, an emergency broadcast service and/or other source. The window controller may receive information about the power reduction such as one or more of the type of power reduction (e.g., power outage of known duration, power outage of unknown duration, demand response, power conservation mode, etc.), the duration, the start and end time, the anticipated amount of reduction, and the like. In the example of an automatically-generated trigger signal from a UPS, the trigger signal may include the currently remaining charge on the power supply of the UPS. In the example of the notification signal of an anticipated power outage, the signal may include the date and starting time of the outage and the duration of the outage. In the example of notification signal from the energy utility or utilities notifying of a demand response, the signal may include the anticipated starting and ending time of the peak load event.

At step 620, the master controller may process control logic to perform certain reduced power operations based on the type of power reduction (e.g., power outage of known duration, power outage of unknown duration, demand response, power conservation mode, etc.). The reduced power operations comprise determining tinting instructions for the one or more networks of optically switchable windows. In some embodiments, the reduced power operations further comprise determining instructions for other systems at the site.

Figure 7:
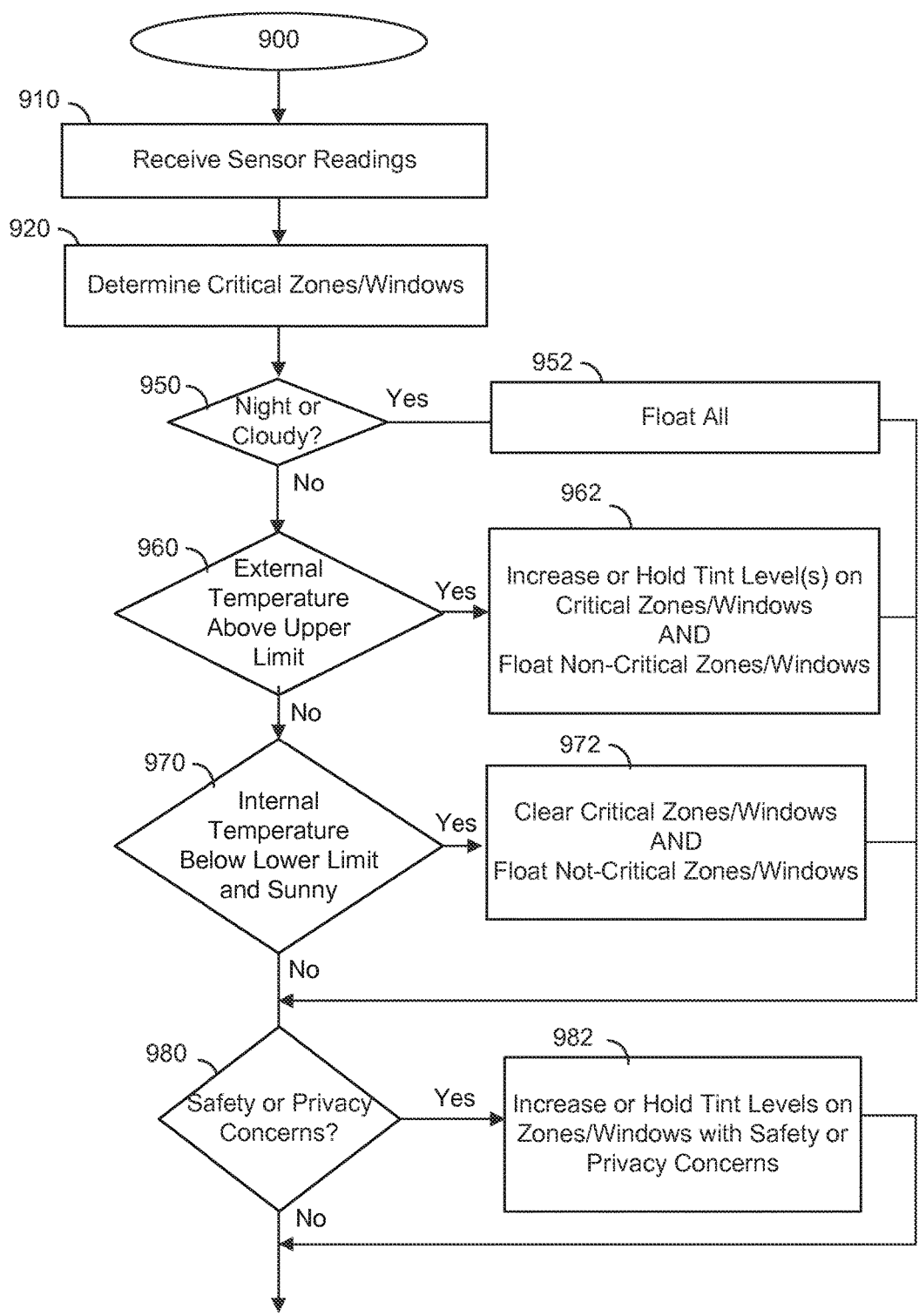
FIG. 7 is a flowchart depicting control logic for a method of determining tinting instructions (levels) for one or more networks of optically switchable windows at a site and/or implementing the tint levels, according to an embodiment.

An example of reduced power operations is described in detail with respect to the flowchart in FIG. 7. Although certain embodiments of reduced power operations are described in terms of controlling the window system, reduced power operations may also include instructions or other input for operating other systems at the site in other embodiments. For example, systems may communicate with each other during reduced power operations to reduce the overall power usage at the site.

An example of reduced power operations occurs in response to a demand response for energy saving measures. Generally a notification of a demand response is received from a local power company to indicate energy savings measures should be activated. In one embodiment, the master controller places the system in maximum energy conservation state when a notification of demand response is received. In some cases, the tint levels for maximum energy conservation state are predetermined and stored in a lookup table, for example, according to zone. If a power outage occurs during the period of demand response, the master controller will use reduced power operations based on the power outage. In one case, the reduced power operations used in response to a demand response are similar to the reduced power operations described with respect to FIG. 7.

Another example of reduced power operations idle certain windows and/or other systems at the site in a power conservation mode. In some cases, only the windows and/or other systems impacted by the reduced power availability are placed in power conservation mode. The power conservation mode may last the entire duration of the reduced power event or may last a particular period of time. In either case, standard operations generally resume after the power conservation mode. While idling, the system can be reactivated by a reactivation signal from a controller, from a user, site manager, or other entity with reactivation permission. In some cases, there may be a selective override of power conservation mode for certain zones or windows. For example, there may be a particular zone with a selective override status due to security or safety reasons. For example, a nursery or nursing room in a hospital may be designated to not enter power conservation mode. Selective override values may be stored in a lookup table.

Another example of reduced power operations is a controlled shut down mode of one or more systems at the site. Just before the available power supplies run out, the window controllers and other systems at a site are shut down and/or placed in idle according to a predefined priority list. According to one priority list of one case, the window controllers may be shut down first, then the computers, then the control panels, etc. In another example, the computers may be shut down first. This controlled shut down of systems at the site can allow systems to close down properly, save files, etc. before a forced shutdown may be necessary when the power runs out. The predefined shutdown priority list may be stored in a lookup file. Some illustrated examples of control logic that may be used for a controlled shut down mode are described with respect to the flowcharts in FIGS. 8-10.

In one example of reduced power operations, the master controller may set a timer to continue standard operations using UPS power or other power sources available during the duration of the timer or shut off power for the duration of the timer. Once the timer expires, the master controller determines whether the power reduction continues. If the power has returned, then the master controller returns to standard operating mode. If the power has not returned, the master controller determines tint states according to the type of power reduction. In another example, the master controller may receive confirmation from a user, from an energy company, or another source that that the power reduction will be of an extended duration. In one case, the master controller may receive a duration from one of these sources and determine that it is an extended duration if the received duration is greater than a minimum duration such as, for example, 10 minutes, 20 minutes, 1 hour, 2 hours, 3 hours, etc. In this case, the master controller may not use (skip) a timer delay and may determine tint states according to the type of power reduction.

At step 640, the master controller determines whether there is an override. For example, the master controller may have received an override signal from a site manager, from an end-user, or another source. One type of override is a user console override from an end user who occupies a room to determine a tint level (override value) for one or more optically switchable windows in the room. Another type of override is an override from a site manager.

If it is determined that there is not an override at step 640, the master controller continues to step 660. If it is determined that there is an override at step 640, the master controller disengages the control logic and defines override values at step 650 based on some other consideration and continues to step 660 to transmit tinting instructions with the override values over a window communication network to window controller(s) electrically connected to the electrochromic device(s) in one or more optically switchable windows at the site.

At step 660, control instructions with the determined tint levels are transmitted over a window communication network to one or more window controller(s) electrically connected to the electrochromic device(s) in one or more optically switchable windows at the site. The control instructions are implemented to provide the voltage/current profile to the electrochromic device(s) to transition to the tint levels in the control instructions. The master controller then continues to increments the time at step 601 for the next interval.

In certain embodiments, the transmission of tint levels at step 660 to particular window controllers at the site may be implemented with efficiency in mind. For example, if the recalculation of tint level suggests that no change in tint from the current tint level is required, then there is no transmission of control instructions with an updated tint level. As another example, the master controller may calculate a single tint level for a network of optically switchable windows. As another example, the site may be divided into zones of optically switchable windows based on window size, location, or other criteria. In this example, the master controller may calculate a single tint level for each zone. In one case with zones are based on window size, the control logic may recalculate tint levels for zones with smaller windows more frequently than for zones with larger windows.

In certain embodiments, the master controller sends a notification to the end-user of the current operating mode. For example, a green light may be an indicator of standard operating mode. As another example, a yellow light may be an indicator of a demand response and/or a UPS event.

In one embodiment, the window controller determines both the actual energy consumption at the site and the calculated energy consumption, and then determines final tint decisions based on the difference in these values. For example, if the difference is more than a certain amount (e.g., 5%, 10%, 20%, 30% difference), the actual energy consumption value may be used to determine tinting decisions. For example, if the actual energy consumption at a site is 5%, 10%, 20% or 30% greater than the calculated consumption, the tinting decisions are changed to reflect the lower actual amount of energy remaining in the system, e.g. less power (e.g. to conserve energy reserves as the priority) is used for tinting than otherwise would be used based on the calculated energy consumption. In another example, if the actual energy consumption at a site is 5%, 10%, 20% or 30% less than the calculated consumption, the tinting decisions are changed to reflect the lower actual amount of energy remaining in the system, e.g. more power (e.g. to provide higher occupant comfort from heat or glare) is used for tinting than otherwise would be used based on the calculated energy consumption.

Figure 6B:
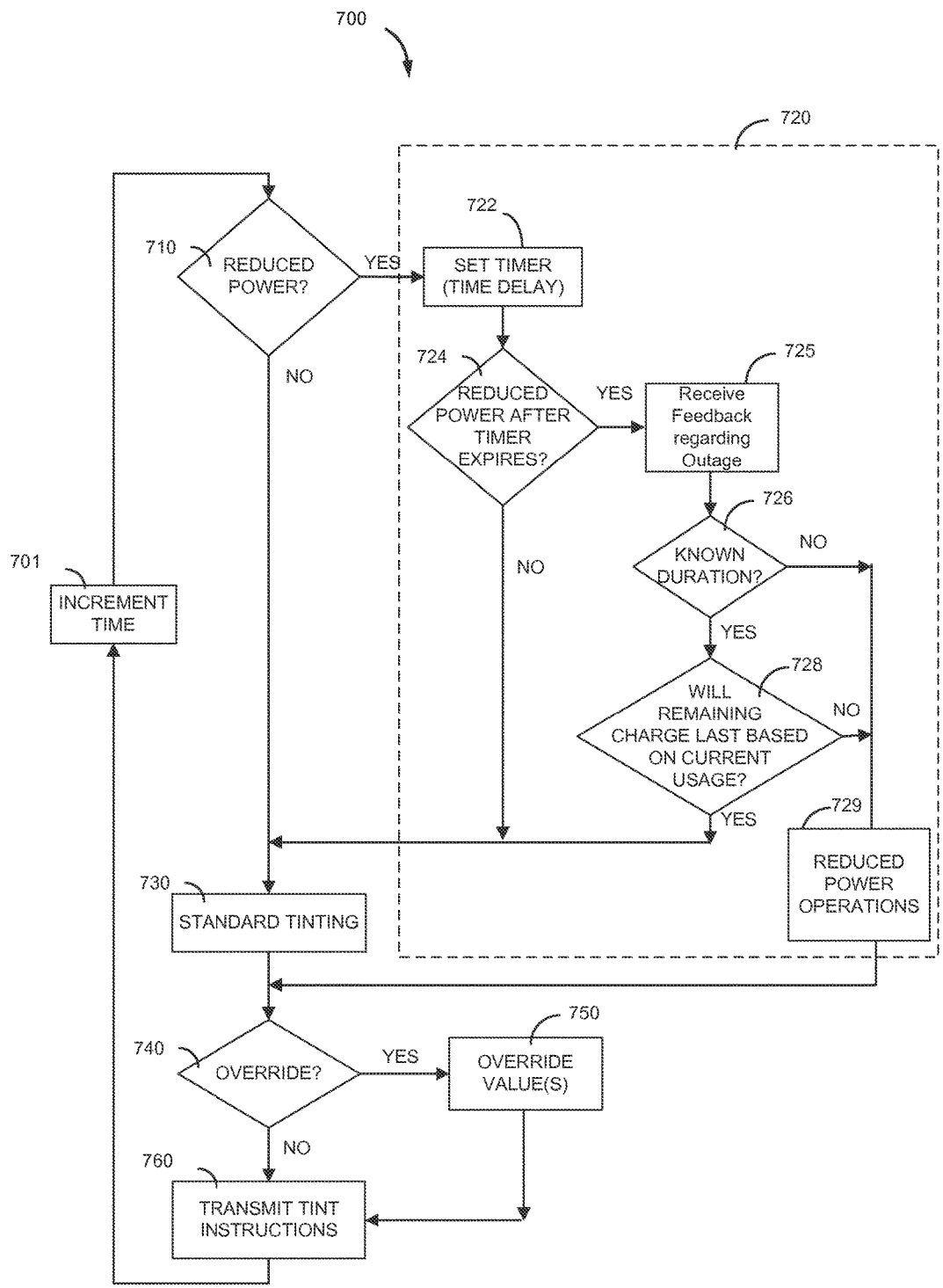

FIG. 6B is a flowchart depicting control logic for a method of making and implementing tinting decisions for one or more networks of optically switchable windows at a site (e.g., the building shown in FIG. 1A), according to an embodiment. In this method, a time delay may be imposed (step 722) by a timer before the master controller uses reduced power operations. During this time delay, the master controller (or IPO control software, wherever located) is configured to ride through the time delay using standard operations (or other predefined operations). In this aspect, the master controller is configured to avoid kicking into IPO mode during a short power glitch. The logic calculations are performed in a closed loop at time intervals incremented at step 701. In certain cases, the time intervals are constant unless there is a time delay imposed. For example, control logic calculations may be done every 1, 2, 3, 4, 5, etc. minutes. In many cases, once the tinting decision is made, the tinting instructions are transmitted to the end/leaf window controller to control the applied voltage/current to transition, hold, float, etc. the optically switchable window(s) (step 760).

At step 710, the master controller determines whether there is a significant reduction in power from the main source of power to the site based on a notification signal from one or more UPSs, from another system at the site, from a utility, from a user, or from another source. For example, the master controller may receive a trigger signal automatically generated by a UPS when the UPS detects a (full or partial) power outage and starts providing power. As another example, the master controller may receive a notification signal from the energy utility or utilities with advance notification of an anticipated power interruption such as, for example, a scheduled brown out. In yet another example, the master controller may receive a notification signal from the energy utility or utilities with notification of a demand response to energy savings measures during a peak load event. In yet another example, the master controller may receive a notification signal from a user, a site manager, etc. In yet another example, the master controller may receive a notification signal from a weather feed service of an anticipated power reduction due to weather conditions. In some cases, the signal may indicate whether the power reduction would be local to a network of optically switchable windows or one or more windows.

If the master controller does not determine a significant reduction of power during the current time interval at step 710, the master controller continues standard tinting operations to determine tinting instructions at step 730. In this case, the master controller remains in standard operating mode, and determines tint levels based on standard tinting logic used under standard operating conditions. An example of control logic that can be used under standard operating conditions is described in U.S. patent application Ser. No. 13/772,969 filed on Feb. 21, 2013 and titled "Control Method for Tintable Windows." The standard tinting logic performs calculations to determine a tint level for each optically switchable at a single instant in time $t_i$. In certain cases, the standard tinting logic predictively calculates how the window should transition in advance of the actual transition. In these cases, the calculations may be based on a future time around or after a transition to a new tint state is complete.

If, however, the master controller determines that there is a significant power reduction at step 710, the master controller commences reduced power operations 720 according to the type of power reduction (e.g., power outage of known duration, power outage of unknown duration, demand response, power conservation mode, etc.). The reduced power operations comprise determining tinting instructions for the one or more networks of optically switchable windows. In some embodiments, the reduced power operations further comprise determining instructions for other systems at the site.

At step 722, the master controller sets a timer. During the duration of the timer, the master controller either a) continues standard operations uses the available power supply (e.g., one or more UPSs), b) floats the windows, or c) maintains the current tint state. If the master controller continues using standard operations, the master controller rides through the duration of the timer, which can avoid kicking into IPO mode in response to a short glitch in power. In one example, the master controller makes tint decisions to maintain the current tint state in order to avoid inconveniencing the occupants by changing tint states. The duration of the timer may be, for example, 10 seconds, 20 seconds, 30 seconds, 1 minute, 5 minutes, 10 minutes, etc.

In certain embodiments, during the duration of the timer, the master controller maintains a predefined set of tint states for the windows. This predefined set of tint states may be specified by zone in the lookup table. In one case, the windows default tint state is a clear tint state during the duration of the timer.

In certain cases, there may be windows in transition at the setting of the timer. In these cases, the master controller may wait until the transition is complete before changing the tint state. In other cases and where this site is a "no lockout" site, the master controller will interrupt the transition and send tint commands according to the tint states determined for the duration of the timer.

Once the timer expires, the master controller determines whether the power reduction continues (step 724). If the power has returned (i.e. no reduced power after timer expires), then the master controller returns to standard operating mode at step 730.

If the power has not returned (i.e. yes, reduced power after timer expires), the master controller receives information about the power reduction at step 725. The information about the power reduction may be received from, for example, one or more UPSs, another system at the site, the utility(ies), an operator, a site manager, a weather service, an emergency broadcast service and/or other source. The window controller may receive information about the power reduction such as one or more of the type of power reduction (e.g., power outage of known duration, power outage of unknown duration, demand response, power conservation mode, etc.), the duration, the start and end time, the anticipated amount of reduction, and the like. In the example of the automatically-generated trigger signal from the UPS, the trigger signal may include the currently remaining charge on the power supply of the UPS. In the example of the notification signal of an anticipated power outage, the signal may include the date and starting time of the outage and the duration of the outage. The master controller may determine the current usage of power by the optically switchable windows in their current tint states. In the example of the notification signal of demand response, the signal may include the date and starting time of the duration of the demand response and requested energy saving measures. For example, the notification signal of the demand response may include a requested percentage of energy savings such as, for example, 10%, 20%, 30%, etc. demand response.

At step 726, the master controller determines whether or not the power reduction is of known duration. In the case of an unexpected reduction, the duration is typically unknown. In the case of an anticipated reduction, the duration may be known.

If the duration of the power reduction is known, the master controller determines whether there is enough charge on the power supply of the UPS and/or other power source to last through the duration of the outage based on the current usage of energy by the windows in their current tint states (step 728). The master controller may determine the current usage of power by the optically switchable windows in their current tint states. If there is enough charge remaining to last through the duration, the master controller will go back to standard operating mode proceeding to step 730.

If the master controller determines at step 726 that the duration of the power reduction is not known or determines at step 728 that there is a not enough charge remaining to last through the duration of the known power reduction, then the master controller performs reduced power operations at step 729 and continues to step 740.

An example of reduced power operations that may be used is described in detail in FIG. 7. Another example of reduced power operations are used when a notification of a demand response is received. The notification typically comes from a local power company to indicate energy savings measures should be activated. In one embodiment, the master controller places the system in maximum energy conservation state when a notification of demand response is received. In some cases, the tint levels for maximum energy conservation state are predetermined and stored in a lookup table, for example, according to zone. If a power outage occurs during the period of demand response, the master controller will use reduced power operations based on the power outage.

At step 740, the master controller determines whether there is an override. For example, the master controller may have received an override signal from a site manager, from an end-user, or another source. One type of override is a user console override from an end user who occupies a room to determine a tint level (override value) for one or more optically switchable windows in the room. Another type of override is an override from a site manager.

If it is determined that there is not an override at step 740, the master controller continues to step 760. If it is determined that there is an override at step 740, the master controller disengages the control logic and defines override values at step 750 based on some other consideration and continues to step 760 to transmit tinting instructions with the override values over a window communication network to window controller(s) electrically connected to the electrochromic device(s) in one or more optically switchable windows at the site.

At step 760, control instructions with the determined tint levels are transmitted over a window communication network to one or more window controller(s) electrically connected to the electrochromic device(s) in one or more optically switchable windows at the site. The control instructions are implemented to provide the voltage/current profile to the electrochromic device(s) to transition to the tint levels in the control instructions. The master controller then continues to increments the time at step 701 for the next interval.

In certain embodiments, the transmission of tint levels at step 760 to particular window controllers at the site may be implemented with efficiency in mind. For example, if the recalculation of tint level suggests that no change in tint from the current tint level is required, then there is no transmission of control instructions with an updated tint level. As another example, the master controller may calculate a single tint level for a network of optically switchable windows. As another example, the site may be divided into zones of optically switchable windows based on window size, location, or other criteria. In this example, the master controller may calculate a single tint level for each zone. In one case with zones are based on window size, the control logic may recalculate tint levels for zones with smaller windows more frequently than for zones with larger windows.

In certain embodiments, the master controller may receive confirmation from a user, from an energy company, or another source that that the power reduction will be of an extended duration. In one case, the master controller may receive a duration from one of these sources and determine that it is an extended duration if the received duration is greater than a minimum duration such as, for example, 10 minutes, 20 minutes, 1 hour, 2 hours, 3 hours, etc. In this case, the master controller may not use (skip) a timer delay and may determine tint states according to the type of power reduction.

Figure 6C:
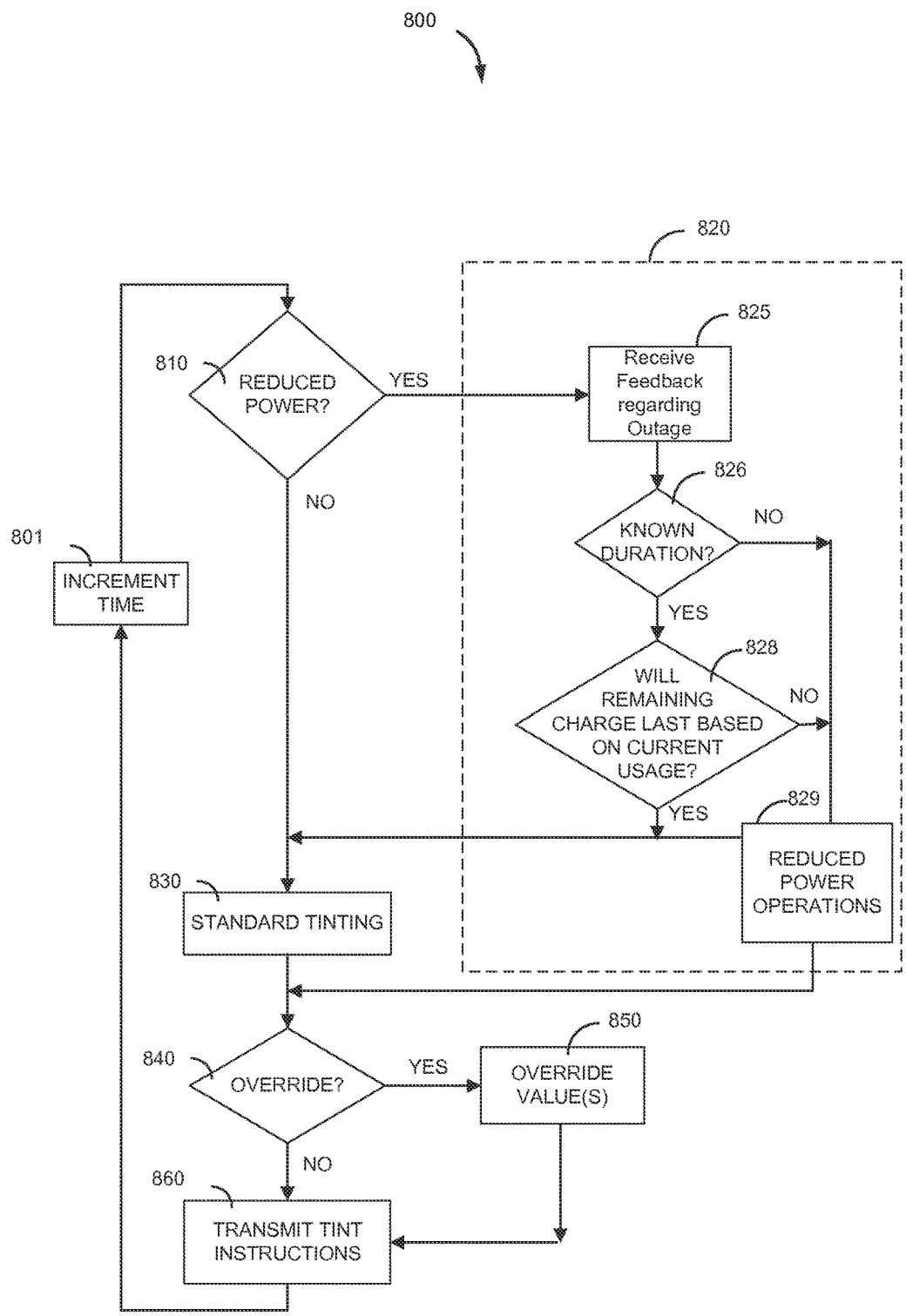

FIG. 6C is a flowchart depicting control logic for a method of making and implementing tinting decisions for one or more networks of optically switchable windows at a site (e.g., the building shown in FIG. 1A), according to an embodiment. The logic calculations are performed in a closed loop at time intervals incremented at step 801. In certain cases, the time intervals are constant unless there is a time delay imposed. For example, control logic calculations may be done every 1, 2, 3, 4, 5, etc. minutes. In many cases, once the tinting decision is made, the tinting instructions are transmitted to the end/leaf window controller to control the applied voltage/current to transition, hold, float, etc. the optically switchable window(s) (step 860).

At step 810, the master controller determines whether there is a significant reduction in power from the main source of power to the site based on a notification signal from one or more UPSs, from another system at the site, from a utility, from a user, or from another source. For example, the master controller may receive a trigger signal automatically generated by a UPS when the UPS detects a (full or partial) power outage and starts providing power. As another example, the master controller may receive a notification signal from the energy utility or utilities with advance notification of an anticipated power interruption such as, for example, a scheduled brown out. In yet another example, the master controller may receive a notification signal from the energy utility or utilities with notification of a demand response to energy savings measures during a peak load event. In yet another example, the master controller may receive a notification signal from a user, a site manager, etc. In yet another example, the master controller may receive a notification signal from a weather feed service of an anticipated power reduction due to weather conditions. In some cases, the signal may indicate whether the power reduction would be local to a network of optically switchable windows or one or more windows.

If the master controller does not determine a significant reduction of power during the current time interval at step 810, the master controller continues standard tinting operations to determine tinting instructions at step 830. In this case, the master controller remains in standard operating mode, and determines tint levels based on standard tinting logic used under standard operating conditions. An example of control logic that can be used under standard operating conditions is described in U.S. patent application Ser. No. 13/772,969 filed on Feb. 21, 2013 and titled "Control Method for Tintable Windows." The standard tinting logic performs calculations to determine a tint level for each optically switchable at a single instant in time $t_i$. In certain cases, the standard tinting logic predictively calculates how the window should transition in advance of the actual transition. In these cases, the calculations may be based on a future time around or after a transition to a new tint state is complete.

If, however, the master controller determines that there is a significant power reduction at step 810, the master controller commences reduced power operations 820 according to the type of power reduction (e.g., power outage of known duration, power outage of unknown duration, demand response, power conservation mode, etc.). The reduced power operations comprise determining tinting instructions for the one or more networks of optically switchable windows. In some embodiments, the reduced power operations further comprise determining instructions for other systems at the site.

At step 825, the master controller receives information about the power reduction. The information about the power reduction may be received from, for example, one or more UPSs, another system at the site, the utility(ies), an operator, a site manager, a weather service, an emergency broadcast service and/or other source. The window controller may receive information about the power reduction such as one or more of the type of power reduction (e.g., power outage of known duration, power outage of unknown duration, demand response, power conservation mode, etc.), the duration, the start and end time, the anticipated amount of reduction, and the like. In the example of the automatically-generated trigger signal from the UPS, the trigger signal may include the currently remaining charge on the power supply of the UPS. In the example of the notification signal of an anticipated power outage, the signal may include the date and starting time of the outage and the duration of the outage. The master controller may determine the current usage of power by the optically switchable windows in their current tint states. In the example of the notification signal of demand response, the signal may include the date and starting time of the duration of the demand response and requested energy saving measures. For example, the notification signal of the demand response may include a requested percentage of energy savings such as, for example, 10%, 20%, 30%, etc. demand response.

At step 826, the master controller determines whether or not the power reduction is of known duration. In the case of an unexpected reduction, the duration is typically unknown. In the case of an anticipated reduction, the duration may be known.

If the duration of the power reduction is known, the master controller determines whether there is enough charge on the power supply of the UPS and/or other power source to last through the duration of the outage based on the current usage of energy by the windows in their current tint states (step 828). The master controller may determine the current usage of power by the optically switchable windows in their current tint states. If there is enough charge remaining to last through the duration, the master controller will go back to standard operating mode proceeding to step 830.

If the master controller determines at step 826 that the duration of the power reduction is not known or determines at step 828 that there is a not enough charge remaining to last through the duration of the known power reduction, then the master controller performs reduced power operations at step 829 and continues to step 840.

An example of reduced power operations that may be used is described in detail in FIG. 7. Another example of reduced power operations are used when a notification of a demand response is received. The notification typically comes from a local power company to indicate energy savings measures should be activated. In one embodiment, the master controller places the system in maximum energy conservation state when a notification of demand response is received. In some cases, the tint levels for maximum energy conservation state are predetermined and stored in a lookup table, for example, according to zone. If a power outage occurs during the period of demand response, the master controller will use reduced power operations based on the power outage.

At step 840, the master controller determines whether there is an override. For example, the master controller may have received an override signal from a site manager, from an end-user, or another source. One type of override is a user console override from an end user who occupies a room to determine a tint level (override value) for one or more optically switchable windows in the room. Another type of override is an override from a site manager.

If it is determined that there is not an override at step 840, the master controller continues to step 860. If it is determined that there is an override at step 740, the master controller disengages the control logic and defines override values at step 850 based on some other consideration and continues to step 860 to transmit tinting instructions with the override values over a window communication network to window controller(s) electrically connected to the electrochromic device(s) in one or more optically switchable windows at the site.

At step 860, control instructions with the determined tint levels are transmitted over a window communication network to one or more window controller(s) electrically connected to the electrochromic device(s) in one or more optically switchable windows at the site. The control instructions are implemented to provide the voltage/current profile to the electrochromic device(s) to transition to the tint levels in the control instructions. The master controller then continues to increments the time at step 801 for the next interval.

In certain embodiments, the transmission of tint levels at step 860 to particular window controllers at the site may be implemented with efficiency in mind. For example, if the recalculation of tint level suggests that no change in tint from the current tint level is required, then there is no transmission of control instructions with an updated tint level. As another example, the master controller may calculate a single tint level for a network of optically switchable windows. As another example, the site may be divided into zones of optically switchable windows based on window size, location, or other criteria. In this example, the master controller may calculate a single tint level for each zone. In one case with zones are based on window size, the control logic may recalculate tint levels for zones with smaller windows more frequently than for zones with larger windows.

In some embodiments, the control logic in FIGS. 6A, 6B, 6C and 7 for implementing the control methods for multiple optically switchable windows in an entire site can be on a single device, for example, a single master controller. This device can perform the calculations for each and every window in the site and also provide an interface for transmitting tint levels to one or more electrochromic devices in individual optically switchable windows.

FIG. 7 is a flowchart depicting control logic for a method of determining tinting instructions (levels) for one or more networks of optically switchable windows at a site (e.g., the building shown in FIG. 1A) and/or implementing the tint levels, according to an embodiment. The control logic in FIG. 7 comprises reduced power operations used in the event of a power reduction. These logic calculations may be performed in a closed loop at regular time intervals. In some cases, the time intervals may be constant unless there is a time delay imposed. For example, control logic calculations may be done every 1, 2, 3, 4, 5, etc. minutes. In some cases, once the tinting decision is made at an instance, $t_i$, the tinting instructions are transmitted to the end/leaf window controller to control the applied voltage/current to transition, hold, float, etc. the optically switchable window(s). In other cases, the tinting instructions are transmitted only if they include tint levels different from the current tint levels.

The method starts at step 900. At step 910, the master controller receives sensor readings from internal and/or external sensors at the sites to determine internal and external conditions at the site. Internal sensors can be used to determine room conditions such as glare conditions, irradiance levels, room temperature, occupancy, etc. External sensors can determine current irradiance levels to determine whether it is sunny or cloudy, or daytime or nighttime. Alternatively, the master controller can use a solar calculator to determine or predict certain external and internal conditions. For example, the master controller can use a solar calculator to determine whether it is daytime or nighttime based on the current date and time and geographical location of the site. The master controller can also use the solar calculator to determine the direction of radiation from the sun and then predict how far the sunlight would penetrate into the rooms on a clear sky day according to the location of the windows. In addition, a weather forecast can be used, for example to predict whether it may be sunny or cloudy at current or future times. With this information, the master controller can predict whether there may be glare through certain rooms at certain times.

In one embodiment, the master controller may determine anticipate tint decisions in the future based on weather forecast data from, for example, weather feed received over a network. In this case, the master controller at step 910 predicts the internal and/or external conditions at the site based on the weather forecast data. In these cases, the tint decisions can be made for a future time in anticipation of the conditions in the weather forecast data.

At step 920, the master controller defines one or more windows, one or more zones of windows, or one or more networks of windows as either critical or non-critical. These definitions may change during the duration of the power reduction. The master controller makes tinting decisions that maximize comfort and safety for the occupants in the rooms with critical windows and makes tinting decisions for the non-critical windows that minimize energy consumption.

In some cases, the master controller may determine certain windows are critical based on whether the rooms with the windows are occupied and based on the level of need for comfort of the occupants. For example, a critical zone may be a zone with windows in a hospital nursery or ICU which may be occupied by patients with a high level of need for comfort.

In some cases, the master controller may determine certain windows are critical based on whether tinting or non-tinting is of high importance for energy conservation. For example, a critical zone may be a zone with the most window surface area. As another example, a critical zone may be the side of a building facing the sun at its current position and a non-critical zone may be a side of the building that is currently in the shade. As another example, the master controller may determine that windows both facing the sun and in rooms with occupants are critical and that windows that face the sun, but do not have occupants, are not critical.

The master controller can determine the current room occupancy based on one or more of the scheduled occupancy (i.e. from a lookup table), measurements taken from one or more motion sensors in the room, and based on evacuation areas. For example, a notification may have been sent to occupants of a building at the onset of a power outage to evacuate to certain areas of a building (e.g., shaded side of a building on a hot and sunny day). In this example, the master controller determines that the evacuation areas (e.g., the areas to which the occupants have been evacuated) of the building are critical zones so that those areas are provided with maximum comfort and safety to the evacuated occupants. The evacuation areas may change location during the duration of the power outage.

At step 950, the master controller determines whether it is nighttime or cloudy. In one case, the master controller determines whether it is nighttime with the solar calculator based on the current date, time, and geographical location of the site. In another case, the master controller determines whether it is nighttime or cloudy based on one or more external sensors. In yet another case, the master controller determines whether it is nighttime or cloudy based on weather feed data.

If it is determined to be nighttime or cloudy at step 950, the master controller decides to float (power off) all the optically switchable windows to conserve energy at step 952 unless there are any safety or privacy concerns (step 980). If the master controller determines that there are safety or privacy concerns at step 980, the master controller will transition to or hold at appropriate tint levels for those windows with safety or privacy concerns at step 982. For example, there may be safety concerns of vandalism or intruders entering the building during the power reduction.

In one embodiment, the street level windows may be cleared or held in a clear state to allow visibility into the building by police or other emergency personnel outside the building to see whether intruders are present inside the building. In another embodiment, the street level windows (e.g., shop windows) may be transitioned to or held at a darkest tint state in order to block visibility through the windows from potential intruders outside the building. As another example, there may be certain windows with privacy concerns (e.g., an occupied restroom) during a power reduction. In one embodiment, the windows with privacy concerns may be transitioned to or held at a darkest tint state in order to block visibility through those windows from outside the building.

If it is determined to not be nighttime or cloudy at step 950, the master controller determines whether the external temperature is above an upper limit at step 960. If the external temperature is above the upper limit, the external conditions are determined to be "hot and sunny" and the master controller increases or holds the tint levels of the windows in the critical zones to maintain comfortable temperatures in the rooms and floats the non-critical windows or zones to reduce energy usage at step 962. If the master controller determines that there are safety or privacy concerns at step 980, the master controller will transition to or hold at appropriate tint levels for those windows with safety or privacy concerns at step 982.

If the master controller determines whether the external temperature is below the upper limit at step 960, the master controller determines whether that internal temperature is below the lower limit and sunny (step 970).

If the master controller determine that the internal temperature is below the lower limit and sunny (step 970), the conditions are "cold and sunny." In this case, the master controller clears the critical zones to maintain comfortable internal temperatures in the rooms and floats the non-critical windows or zones to reduce energy usage and floats the non-critical windows or zones to reduce energy usage at step 972. If the master controller determines that there are safety or privacy concerns at step 980, the master controller will transition to or hold at appropriate tint levels for those windows with safety or privacy concerns at step 982.

If the master controller determine that the internal temperature is above the lower limit (step 970), the conditions are not cold. If the master controller determines that there are safety or privacy concerns at step 980, the master controller transition to or hold at appropriate tint levels for those windows with safety or privacy concerns at step 982.

Figure 8:
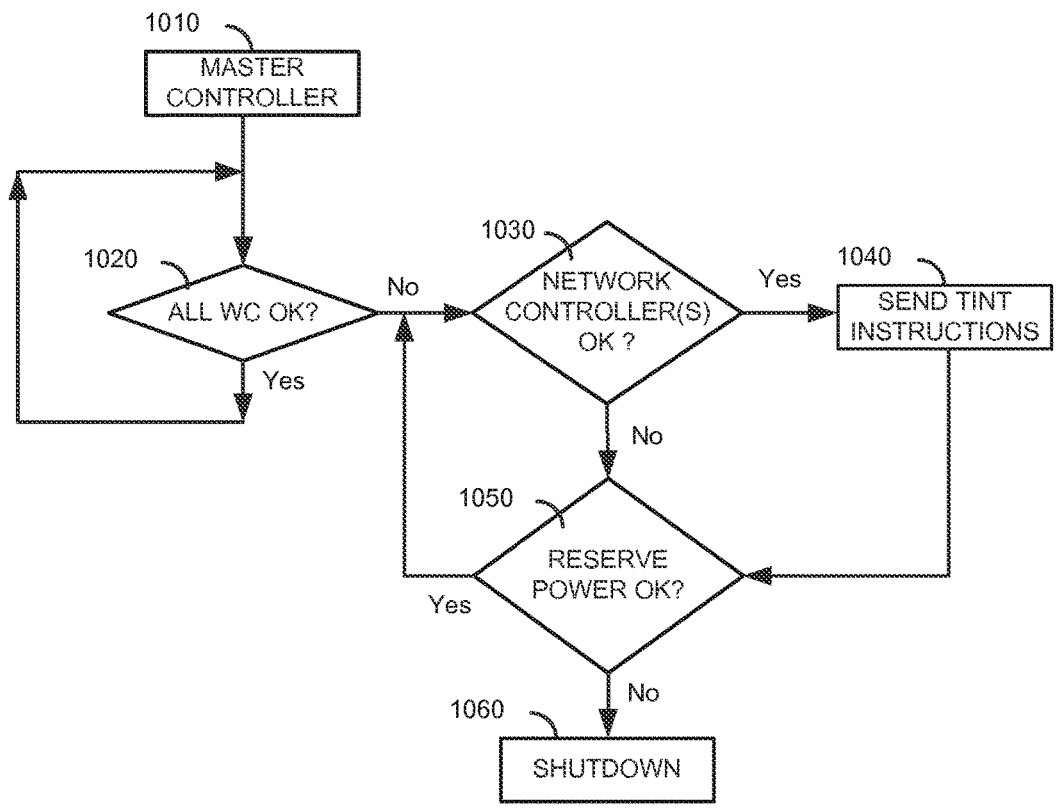
FIG. 8 is a flowchart depicting control logic for reduced power operations used by a first control system, such as a master controller for a controlled shut down mode, according to an embodiment.
Figure 9:
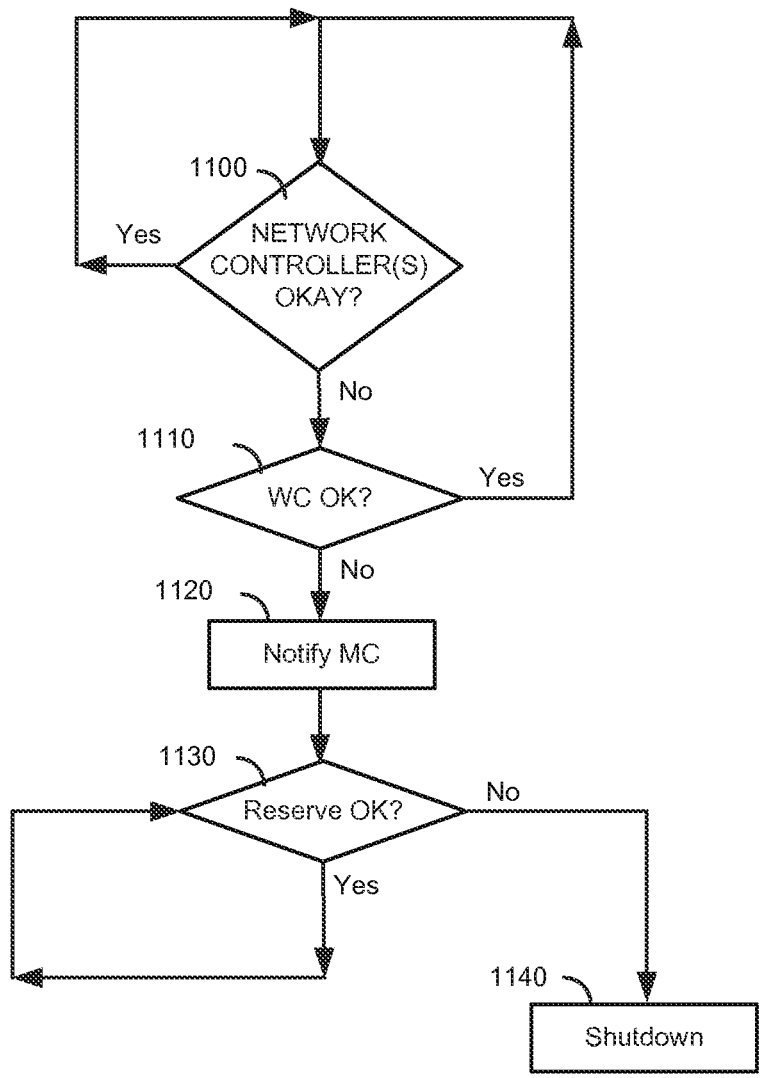
FIG. 9 is a flowchart depicting control logic for reduced power operations used by a second control system, such as a first end/leaf window controller, for a controlled shut down mode, according to an embodiment.
Figure 10:
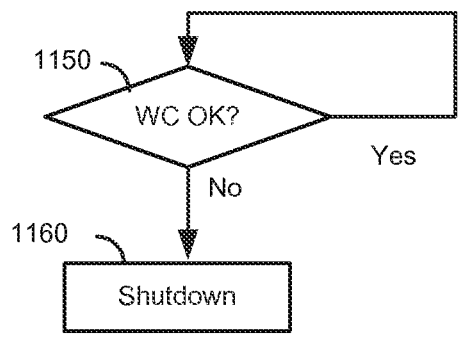
FIG. 10 is a flowchart depicting control logic for reduced power operations used by a third control system, such as a second end/leaf window controller, for a controlled shut down mode, according to an embodiment.

FIGS. 8-10 depict examples of distributed control logic at different systems at a site for reduced power operations for a controlled shut down mode, according to an embodiment. This control logic may be used, for example, when communication between different control elements of a system have lost communication. FIG. 8 is a flowchart depicting control logic for reduced power operations used by a first control system (e.g. master controller) for a controlled shut down mode, according to an embodiment. FIG. 9 is a flowchart depicting control logic for reduced power operations used by a second control system, e.g. a first end/leaf window controller, for a controlled shut down mode, according to an embodiment. The control logic depicted in FIG. 9 may be particularly useful to implement tint instructions in scenarios such as, for example, when communication between one or more network controller(s) and the master controller is not possible, where the system does not include a master controller, etc. FIG. 10 is a flowchart depicting control logic for reduced power operations used by a third control system, e.g. a second end/leaf window controller, for a controlled shut down mode, according to an embodiment.

Referring to FIG. 8, at step 1010, the master controller starts reduced power operations for a controlled shut down mode. At step 1020, the master controller determines whether the end/leaf controllers for one or more optically switchable windows are functioning properly (e.g., power is available to them). If the end/leaf window controllers are functioning properly, the master controller will check again at the next interval time at step 1010.

If the master controller determines that the end/leaf window controllers are not functioning properly at step 1020, the master controller determines whether one or more network controllers at the site are functioning properly at step 1030. If the master controller determines that the one or more network controllers are functioning properly at step 1030, the master controller will send the current tint instructions through the network controllers at step 1040 and will continue to step 1050. If the master controller determines that the one or more network controllers are not functioning properly at step 1030, the master controller will continue to step 1050.

At step 1050, the master controller determines whether the UPS or other power reserve has sufficient power supply to last the duration of the reduced power event. If the master controller determines that there is enough power to last the duration, the master controller will continue at the next time interval to step 1030 to check whether the one or more network controllers are functioning properly. If the master controller determines that there is not enough power to last the duration of the reduced power, the master controller will initiate a shutdown or idle of one or more systems at the site based on a priority list (step 1060).

As mentioned above, the control logic described with respect to the flowchart in FIG. 9 may be useful to implement tint instructions in scenarios such as, for example, when communication between one or more network controller(s) and the master controller is not possible or where the system does not include a master controller. For example, the loss of power in the system may have caused the loss of commination between a master controller and the network controller(s). For simplicity, FIG. 9 is described with respect to a system having a master controller, one or more network controllers during a scenario where there is a loss of communication between the master controller and the network controllers while communication is still possible between the end/leaf controllers and the master controller.

Referring to FIG. 9, at step 1100, it is determined whether the one or more network controller(s) are functioning properly. If it is determined that the one or more network controller(s) are functioning properly, the one or more network controller(s) initiate reduced power operations to make tinting decisions and communicate the tinting decisions to the end/leaf controllers to implement the current tint instructions by applying the appropriate current/voltage profile to the electrodes at the optically switchable windows. The process continues to loop at intervals to perform operation 1100 while the one or more network controllers are functioning.

If it is determined that the one or more network controllers are not functioning properly at step 1100, then it is determined whether the end/leaf controllers are functioning properly at 1110. If it is determined that first end/leaf controllers can function properly at 1110, the logic returns to determine whether the one or more network controllers are functioning properly at step 1100.

If it is determined that first end/leaf controllers cannot function properly at 1110, a notification signal is sent to the master controller at step 1120 and the method continues to step 1130. At step 1130, the master controller determines whether the UPS or other power reserve has sufficient power supply to last the duration of the reduced power event. If the master controller determines that there is enough power to last the duration, the master controller will continue sending tinting instructions to the end/leaf controllers to implement the current tint instructions by applying the appropriate current/voltage profile to the electrodes at the optically switchable windows.

If, at step 1130, the master controller determines that there is not enough power to last the duration of the reduced power, the master controller will initiate a shutdown or idle of one or more systems at the site based on a priority list (step 1140).

The control logic described with respect to the flowchart in FIG. 10 may be useful to implement tint instructions in scenarios such as, for example, when there is a loss of communication between the end/leaf controllers and any other controllers in the system. At step 1150, the end/leaf controllers determine whether they can function properly. As long as the end/leaf controllers can function properly, they use control logic to determines and implement tinting instructions and the method returns at intervals to check the function of the end/leaf controllers at step 1150. If, at step 1150, it is determined that the end/leaf controllers are not functioning properly, the master controller will initiate a shutdown or idle of one or more systems at the site based on a priority list (step 1160).

Also, there may be certain adaptive components of the control logic of embodiments. For example, the control logic may determine how an end user (e.g. occupant) tries to override the algorithm at particular times of day and makes use of this information in a more predictive manner to determine desired tint levels. In one case, the end user may be using a wall switch to override the tint level provided by the predictive logic at a certain time each day to an override value. The control logic may receive information about these instances and change the control logic to change the tint level to the override value at that time of day.

In one scenario, an unanticipated power outage may occur in a building where security is not a concern to its occupants, but occupant comfort is of a great concern. It is summer time in this case, and during the day it is hot and sunny so that windows are tinted on the side(s) of the building facing the Sun at the time of the power outage. The method determines that it is daytime and hot and sunny, and holds the tinted windows in the current tinted state. Holding the windows avoids using energy needed to transition and blocks solar radiation from entering the rooms to keep the room temperature down and avoid glare for occupancy comfort. At nighttime, the method continues to hold the tint level. If an override command with override values is received (by site manager or occupant(s)) for certain windows or zones, then the override values are used.

In another scenario, there is an anticipated power outage of known duration in the building, the window controller uses logic to perform IPO operations that determine whether there is enough charge left on the UPS battery to last through the power outage under standard operating conditions. If there is enough charge, the IPO operations will determine tint decisions based on standard tinting. If there is not enough remaining charge left to last through the power outage, the IPO operations determines which of the windows or zones of windows are critical (e.g., windows in a hospital nursery or areas where occupants have been evacuated to). The IPO operations will determine tint decisions for the critical windows based on occupancy comfort. The IPO operations will use the "don't care mode" to make tint decisions (e.g., hold, transition, or float) based on whichever option will use the least amount of energy. In some cases, the non-critical windows will be allowed to float. In other cases, the non-critical windows may be held in the current tint state. In other cases, the non-critical windows may be transitioned to another tint state.

In one embodiment, a site may be equipped with its own emergency power source such as a generator. Hospitals and ISPs are examples of entities that may have their own generators at their sites. In this case, even if there is a UPS available at the site, it will not be triggered to provide power in the event of power loss from the main power supply. In this case, the UPS does not need to be monitored.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

Although the foregoing embodiments have been described in some detail to facilitate understanding, the described embodiments are to be considered illustrative and not limiting. It will be apparent to one of ordinary skill in the art that certain changes and modifications can be practiced within the scope of the description.

What is claimed is:

1. A method of determining tinting instructions for one or more optically switchable windows to reduce power usage at a site, the method comprising:
   (a) determining that a reduced power event has occurred at the site;
   (b) determining a current amount of power available at the site;
   (c) performing reduced power operations to determine new tinting instructions for the one or more optically switchable windows based on the current amount of power available at the site and transitioning the one or more optically switchable windows to one or more new tint levels based on the new tinting instructions; and
   (d) repeating (b) and (c) at intervals during a period of the reduced power event.

2. The method of claim 1, further comprising:
   using an override value as the new tinting instructions if an override exists; and
   implementing the new tinting instructions at the one or more optically switchable windows.

3. The method of claim 1,
   wherein the reduced power event is associated with locally reduced power at a zone of windows of the one or more optically switchable windows at the site, and
   wherein a controller in communication with the zone of windows performs the reduced power operations to determine the new tinting instructions for the zone of windows with reduced power while performing standard operations to determine the new tinting instructions for other of the one or more optically switchable windows at the site.

4. The method of claim 1, wherein (a) is determined upon receiving one or more of a notification of a demand response, a request from a site manager for reduced power usage, a request from an end user for reduced power usage, a notification signal sent in response to an uninterruptable power supply at the site detecting a power outage, a notification signal from an operator or a site manager of the power outage, and a notification signal from a utility company, and a reduced power event.

5. The method of claim 4, wherein the current amount of power available at the site is determined from feedback from the uninterruptible power supply with an indication of a current charge remaining on the uninterruptible power supply.

6. The method of claim 1, further comprising:
   (e) determining that a power reduction is of a known duration; and
   (f) determining a required amount of power to continue standard operations during the known duration;
   if the current amount of power available at the site is greater than the determined required amount of power to continue standard operations, determining the new tinting instructions using standard operations; and
   if the current amount of power available at the site is less than the determined required amount of power to continue standard operations, determining the new tinting instructions for critical windows based on maximizing occupant comfort and determining the new tinting instructions for non-critical windows based on minimizing energy usage.

7. The method of claim 1,
   wherein the reduced power event is receipt of a notification signal in advance of a start time of a power reduction; and
   further comprising implementing the new tinting instructions at the one or more optically switchable windows in advance of the start time of the reduced power event.

8. The method of claim 1, further comprising setting a timer delay during which standard tinting operations are used to determine the new tinting instructions to control the one or more optically switchable windows.

9. The method of claim 1, further comprising setting a timer delay during which predefined tinting instructions are used to control the one or more optically switchable windows, wherein the predefined tinting instructions are to float the one or more optically switchable windows or to hold the one or more optically switchable windows in a current tint state.

10. The method of claim 1,
    wherein the reduced power event is a demand response for energy saving measures at the site; and
    wherein it is determined that the reduced power event has occurred when the demand response is received from a utility company.

11. The method of claim 1, wherein the reduced power operations comprise idling in a power conservation mode until reactivated.

12. The method of claim 1, further comprising
categorizing each of the one or more optically switchable windows as critical or non-critical,
wherein if it is nighttime or cloudy, the new tinting instructions are to float all of the one or more optically switchable windows;
wherein if an external temperature is above an upper limit, the new tinting instructions are to increase or hold tint levels of the critical optically switchable windows and to float the noncritical optically switchable windows;
wherein if an internal temperature is below a lower limit and it is sunny, the new tinting instructions are to clear the critical optically switchable windows and to float the non-critical optically switchable windows; and
wherein for each optically switchable window with safety or privacy concerns, the new tinting instructions are to increase or hold current tint levels; and
wherein the reduced power event is of unknown duration.

13. The method of claim 12, further comprising receiving sensor readings from one or more sensors at the site, wherein one or more of the external temperature, the internal temperature, a nighttime condition, a cloudy or sunny condition, is determined based on the sensor readings.

14. The method of claim 12, wherein critical windows are windows of the one or more optically switchable windows selected from the group consisting of windows in occupied rooms, windows in rooms with high need occupants, windows facing the sun, and windows in an evacuation area, and wherein non-critical windows are windows of the one or more optically switchable windows selected from the group consisting of windows in unoccupied rooms and windows in shade.

15. The method of claim 1, wherein each of the one or more optically switchable windows is an electrochromic window having one or more electrochromic devices.

16. A window controller for determining tinting instructions for one or more optically switchable windows to reduce power usage at a site, the window controller comprising:
a computer readable medium storing control logic and zone data;
a processor in communication with the computer readable medium, the processor configured to:
(a) determine a reduced power event has occurred;
(b) determine an amount of power available at the site;
(c) perform reduced power operations to determine new tinting instructions for the one or more optically switchable windows based on the amount of power available at the site and transition the one or more optically switchable windows to one or more new tint levels based on the new tinting instructions; and
(d) repeat (b) and (c) at intervals during a period of the reduced power event; and
a communication interface in communication with the processor to receive the new tinting instructions and in communication with electrodes configured to apply power to the one or more optically switchable windows to implement the new tinting instructions.

17. The window controller of claim 16, wherein the communication interface is further in communication with one or more leaf window controllers electrically connected to the electrodes.

18. The window controller of claim 16, wherein the communication interface is further in communication with one or more network controllers, each network controller electrically connected to one or more leaf window controllers electrically connected to the electrodes.

19. The window controller of claim 16, wherein the processor is further configured to:
use override values as the new tinting instructions if an override exists; and
implement the new tinting instructions at the one or more optically switchable windows.

20. The window controller of claim 16,
wherein the reduced power event is associated with locally reduced power at a network of the one or more optically switchable windows at the site, and
wherein the communication interface is further in communication with one or more leaf window controllers electrically connected to the optically switchable windows with reduced power.

21. The window controller of claim 16,
wherein the reduced power event is associated with locally reduced power at a zone of the one or more optically switchable windows at the site,
wherein the communication interface is further in communication with a controller electrically connected to one or more leaf window controllers electrically connected to the zone of the one or more optically switchable windows with reduced power, and
wherein the processor is further configured to perform the reduced power operations to determine the new tinting instructions for the zone of the one or more optically switchable windows with reduced power while performing standard operations to determine the new tinting instructions for the other of the one or more optically switchable windows at the site.

22. The window controller of claim 16, wherein it is determined that the reduced power event has occurred upon receiving one or more of a notification of a demand response, a request from a site manager for reduced power usage, a request from an end user for reduced power usage, a notification signal sent in response to an uninterruptable power supply at the site detecting a power outage, a notification signal from an operator or a site manager of a power outage, and a notification signal from a utility company.

23. The window controller of claim 16, wherein the processor is further configured to determine that the reduced power event has occurred upon receiving a notification signal from an uninterruptable power supply, and wherein the uninterruptible power supply sends the notification signal in response to detecting a power outage.

24. The window controller of claim 23, wherein the processor is further configured to determine the amount of power available at the site from feedback with an indication of a current charge remaining on the uninterruptible power supply.

25. The window controller of claim 16, wherein the processor is further configured to:
determine that a power reduction is of a known duration;
determine a required amount of power to continue standard operations during the known duration;
if the amount of power available at the site is greater than the determined required amount of power to continue standard operations, determine the new tinting instructions using standard operations; and
if the amount of power available at the site is less than the required amount of power to continue standard operations, determine the new tinting instructions for critical windows based on maximizing occupant comfort and determining the new tinting instructions for non-critical windows based on minimizing energy usage.

26. The window controller of claim 16,
wherein the reduced power event is determined by receiving a notification signal in advance of the reduced power event;
wherein the processor is further configured to implement the new tinting instructions at the one or more optically switchable windows in advance of the reduced power event.

27. The window controller of claim 16, wherein the processor is further configured to set a timer delay during which a predefined tinting instruction set is used to control the one or more optically switchable windows, and wherein the predefined tinting instruction set comprises instructions to float or hold at current tint state the one more optically switchable windows.

28. The window controller of claim 16,
wherein the reduced power event is a demand response for energy saving measures at the site; and
wherein it is determined that the reduced power event has occurred when a demand response is received from a utility company.

29. The window controller of claim 16, wherein the processor is further configured to:
receive sensor readings from one or more sensors at the site;
categorize each of the one or more optically switchable windows as critical or non-critical;
if it is nighttime or cloudy based on the sensor readings, determine the new tinting instructions as comprising floating all of the one or more optically switchable windows;
if an external temperature based on sensor readings is above an upper limit, determine the new tinting instructions as comprising increasing or holding tint levels of the critical optically switchable windows and floating the noncritical optically switchable windows;
if an internal temperature based on sensor readings is below a lower limit and it is sunny based on sensor readings, determine the new tinting instructions as comprising clearing the critical optically switchable windows and floating the non-critical optically switchable windows; and
for each window with safety or privacy concerns, determine the new tinting instructions as comprising increasing increase or holding current tint levels; and
wherein the reduced power event is of unknown duration.

30. The window controller of claim 16, wherein the processor is further configured to:
categorize each of the one or more optically switchable windows as critical or non-critical;
determine the new tinting instructions for critical windows that maximize occupant comfort and safety; and
determine the new tinting instructions for non-critical windows that minimize energy use.

31. The window controller of claim 29, wherein critical windows are windows of the one or more optically switchable windows selected from the group consisting of windows in occupied rooms, windows in rooms with high need occupants, windows facing the sun, and windows in an evacuation area, and wherein non-critical windows are windows of the one or more optically switchable windows selected from the group consisting of windows in unoccupied rooms and windows in shade.

32. The window controller of claim 16, wherein each of the one or more optically switchable windows is an electrochromic window having one or more electrochromic devices.

33. A system of electrochromic windows with an integrated uninterruptable power supply, the system comprising:
one or more networks of electrochromic windows; and
a window controller communication network comprising one or more window controllers in communication with the integrated uninterruptable power supply and in communication with the one or more networks of electrochromic windows,
wherein the integrated uninterruptable power supply is configured to detect a reduced power event and automatically provide power in response, and
wherein the one or more window controllers are configured to determine tinting instructions for the one or more networks of electrochromic windows to reduce power usage at a site upon receiving a trigger signal sent from the integrated uninterruptable power supply upon detecting the reduced power event, and configured to transition one or more of the electrochromic windows of the one or more networks of electrochromic windows to one or more tint levels based on the tinting instructions.

34. The system of claim 33, wherein the one or more window controllers comprises:
a master controller;
one or more network controllers in communication with the master controller; and
one or more leaf window controllers, each leaf window controller in communication with an electrochromic window of the one or more networks of the electrochromic windows,
wherein each network controller is also in communication with leaf window controllers in communication with a corresponding network of electrochromic windows of the one or more networks of electrochromic windows.

35. The system of claim 33, wherein each of the one or more window controllers comprises:
a computer readable medium storing control logic and zone data; and
a processor in communication with the computer readable medium, the processor configured to:
(a) determine a reduced power event has occurred;
(b) determine an amount of power available at the site;
(c) perform reduced power operations to determine the tinting instructions for the one or more networks of electrochromic windows based on the amount of power available at the site; and
(d) repeat (b) and (c) at intervals during a period of the reduced power event; and
a communication interface in communication with the processor to receive the tinting instructions and in communication with electrodes configured to apply power to the one or more electrochromic windows to implement the tinting instructions.

36. The system of claim 35, wherein the processor is further configured to:
use override values as the tinting instructions if an override exists; and
implement the tinting instructions at the one or more electrochromic windows.

37. The system of claim 35,
wherein the reduced power event is associated with locally reduced power at a network of the one or more networks of electrochromic windows at the site, and
wherein the communication interface is further in communication with one or more leaf window controllers electrically connected to the network of electrochromic windows with reduced power.

38. The system of claim 35, wherein the processor is further configured to determine the amount of power available at the site from feedback with an indication of a current charge remaining on the integrated uninterruptible power supply.

39. The system of claim 35, wherein the processor is further configured to:
determine that a power reduction is of a known duration;
determine a required amount of power to continue standard operations during the known duration;
if the amount of power available at the site is greater than the determined required amount of power to continue standard operations, determine the tinting instructions using standard operations; and
if the amount of power available at the site is less than the determined required amount of power to continue standard operations, determine the tinting instructions for critical windows based on maximizing occupant comfort and determine the tinting instructions for non-critical windows based on minimizing energy usage.

40. The system of claim 35,
wherein the reduced power event is determined by receiving a notification signal in advance of the reduced power event; and
wherein the processor is further configured to implement the tinting instructions at the one or more electrochromic windows in advance of the reduced power event.

41. The system of claim 35, wherein the processor is further configured to set a timer delay during which predefined tinting instructions are used to control the one or more electrochromic windows.

42. The system of claim of 35, wherein the processor is further configured to:
categorize each of the one or more electrochromic windows as critical or non-critical; and
determine the tinting instructions for critical electrochromic windows that maximize occupant comfort and safety and determine the tinting instructions for non-critical electrochromic windows that minimize energy use.

43. An uninterruptible power supply for determining tinting instructions for one or more optically switchable windows at a site, the uninterruptible power supply comprising:
a power supply;
a computer readable medium configured to store control logic and zone data;
a processor in communication with the computer readable medium, the processor configured to:
(a) detect a power outage;
(b) automatically provide power to the site upon detecting the power outage;
(c) determine power available at the site;
(d) perform reduced power operations to determine new tinting instructions for the one or more optically switchable windows based on the determined power available at the site and transition the one or more optically switchable windows to one or more new tint levels based on the new tinting instructions; and
(e) repeat (c) and (d) at intervals during the power outage; and
a communication interface in communication with the processor to receive the new tinting instructions and in communication with electrodes configured to apply power to the one or more optically switchable windows to implement the new tinting instructions.

44. The uninterruptible power supply of claim 43, wherein the communication interface is further in communication with one or more leaf window controllers electrically connected to the electrodes.

45. The uninterruptible power supply of claim 43, wherein the processor is further configured to:
use override values as the new tinting instructions if an override exists; and
implement the new tinting instructions at the one or more optically switchable windows.

46. The uninterruptible power supply of claim 43, wherein the power outage is associated with locally reduced power at the one or more optically switchable windows being powered by the uninterruptible power supply during the power outage.

47. The uninterruptible power supply of claim 43, wherein the processor determines the amount of power available at the site based on a current charge remaining on the uninterruptible power supply.

48. The uninterruptible power supply of claim 43, wherein the processor is further configured to set a timer delay during which standard operations continue.

49. The uninterruptible power supply of claim 43,
wherein the power outage is of unknown duration;
wherein the processor is further configured to:
receive sensor readings from one or more sensors at the site;
categorize each of the one or more optically switchable windows as critical or non-critical;
if it is nighttime or cloudy based on the sensor readings, determine the new tinting instructions to be float all the one or more optically switchable windows;
if an external temperature based on sensor readings is above an upper limit, determine the new tinting instructions as comprising increasing or holding tint levels of the critical optically switchable windows and floating the noncritical optically switchable windows;
if an internal temperature based on sensor readings is below a lower limit and it is sunny based on sensor readings, determine the new tinting instructions as comprising clearing the critical optically switchable windows and floating the non-critical optically switchable windows; and
for each window with safety or privacy concerns, determine the new tinting instructions as comprising increasing or holding current tint levels.

* * * * *